United States Patent
Maruyama et al.

(10) Patent No.: US 12,078,948 B2
(45) Date of Patent: Sep. 3, 2024

(54) PARAMETER DETERMINATION APPARATUS, IMAGE FORMING APPARATUS, POST-PROCESSING APPARATUS, SHEET FEEDING APPARATUS, AND PARAMETER DETERMINATION METHOD

(71) Applicant: Konica Minolta, Inc., Tokyo (JP)

(72) Inventors: Hiroyuki Maruyama, Toyokawa (JP); Yumiko Izumiya, Hachioji (JP)

(73) Assignee: KONICA MINOLTA, INC., Tokyo (JP)

( * ) Notice: Subject to any disclaimer, the term of this patent is extended or adjusted under 35 U.S.C. 154(b) by 195 days.

(21) Appl. No.: 17/541,388

(22) Filed: Dec. 3, 2021

(65) Prior Publication Data

US 2022/0179347 A1 Jun. 9, 2022

(30) Foreign Application Priority Data

Dec. 4, 2020 (JP) .................... 2020-201945

(51) Int. Cl.
G03G 15/00 (2006.01)
H04N 1/00 (2006.01)

(52) U.S. Cl.
CPC ..... G03G 15/5029 (2013.01); G03G 15/5016 (2013.01); G03G 15/657 (2013.01); G03G 15/6573 (2013.01); G03G 15/6591 (2013.01); G03G 15/6594 (2013.01); H04N 1/00726 (2013.01); H04N 1/00779 (2013.01); G03G 2215/00738 (2013.01); G03G 2215/00751 (2013.01)

(58) Field of Classification Search
CPC .......... G03G 15/5029; G03G 15/5016; G03G 15/657; G03G 15/6573; G03G 15/6591; G03G 15/6594; G03G 2215/00738; G03G 2215/0075; H04N 1/00726; H04N 1/00779
See application file for complete search history.

(56) References Cited

U.S. PATENT DOCUMENTS

| | | | |
|---|---|---|---|
| 2018/0257886 A1* | 9/2018 | Tsujita | ............ B65H 7/20 |
| 2019/0322476 A1* | 10/2019 | Miyazaki | ............ B65H 5/06 |
| 2020/0379688 A1* | 12/2020 | Sugiura | ............ G06F 3/1253 |
| 2021/0084191 A1* | 3/2021 | Ogawa | ............ H04N 1/00474 |

FOREIGN PATENT DOCUMENTS

| | | |
|---|---|---|
| JP | H02-1308805 | 5/1990 |
| JP | H04-366975 A | 12/1992 |
| JP | 2008-242026 | 10/2008 |
| JP | 2010-111025 A | 5/2010 |
| JP | 2010-217450 A | 9/2010 |
| JP | 2012-194445 | 10/2012 |
| JP | 2019-195887 A | 11/2019 |
| JP | 2019-200292 A | 11/2019 |
| JP | 2020-013174 A | 1/2020 |

* cited by examiner

Primary Examiner — Iriana Cruz
(74) Attorney, Agent, or Firm — BakerHostetler

(57) ABSTRACT

A parameter determination apparatus includes: a first hardware processor that acquires a value related to a plurality of types of sheet physical properties; a second hardware processor that specifies at least any of a sheet type or a basis weight based on an acquired value related to a sheet physical property; and a third hardware processor that specifies a parameter related to sheet processing without specifying at least any of the sheet type or the basis weight, based on an acquired value related to a sheet physical property.

22 Claims, 44 Drawing Sheets

FIG. 7

| PHYSICAL PROPERTY SENSOR TYPE | SURFACE PROPERTY 1 | BASIS WEIGHT | SHEET THICKNESS | SURFACE PROPERTY 2 | SURFACE PROPERTY 3 | WATER CONTENT 1 (FRONT SURFACE) | WATER CONTENT 2 (BACK SURFACE) | SHEET RESISTANCE | RIGIDITY | CHARGE AMOUNT | |
|---|---|---|---|---|---|---|---|---|---|---|---|
| PHYSICAL PROPERTY | SMOOTHNESS | BASIS WEIGHT | THICKNESS | GLOSSINESS | CONCAVE DEPTH | WATER CONTENT | WATER CONTENT | VOLUME RESISTANCE VALUE | BENDING STRENGTH | CHARGE AMOUNT | |
| ADOPTED TECHNOLOGY | OPTICAL REGULAR REFLECTION/ DIFFUSE REFLECTION | OPTICAL TRANSMISSION/ REFLECTION | MECHANICAL DISPLACEMENT AMOUNT | OPTICAL REFLECTION | OPTICAL + IMAGE PROCESSING | OPTICAL TRANSMISSION (OH GROUP ABSORPTION) | OPTICAL TRANSMISSION (OH GROUP ABSORPTION) | ELECTRIC CURRENT | MECHANICAL DISPLACEMENT AMOUNT | ELECTRIC ELECTRIC CHARGE AMOUNT | |
| FIXING QUALITY | ○ | ○ | ○ | ○ | ○ | ○ | ○ | | ○ | ○ | FIXING PROCESS |
| SECONDARY TRANSFER QUALITY | ○ | ○ | ○ | ○ | ○ | ○ | ○ | ○ | ○ | | TRANSFER PROCESS |
| CONVEYANCE QUALITY | ○ | ○ | ○ | ○ | | | | | ○ | ○ | CONVEYANCE PROCESS |
| SHEET DISCHARGING QUALITY | ○ | ○ | ○ | | | | | | ○ | ○ | DESTATICIZING PROCESS |

FIG. 8A

| PHYSICAL PROPERTY SENSOR TYPE | BASIS WEIGHT | SHEET THICKNESS | RIGIDITY | CHARGE AMOUNT | |
|---|---|---|---|---|---|
| PHYSICAL PROPERTY | BASIS WEIGHT | THICKNESS | BENDING STRENGTH | CHARGE AMOUNT | |
| QUALITY ITEM — PUNCH FAILURE | ○ | ○ | ○ | | POST-PROCESSING PROCESS |
| STAPLE FAILURE | ○ | ○ | ○ | | |
| STACK FAILURE | | | | ○ | |
| CUTTING FAILURE | ○ | ○ | | | |
| FOLDING FAILURE | ○ | ○ | ○ | | |
| PERFORATION FAILURE | ○ | ○ | ○ | | |
| BOOK BINDING GLUE APPLICATION FAILURE | | ○ | | | |

FIG. 8B

| POST-PROCESSING QUALITY | POST-PROCESSING CONTROL PARAMETER | PRODUCTION OF POST-PROCESSING, OR PROCESSING/WORK CONTENTS |
|---|---|---|
| PUNCH FAILURE | NUMBER OF PUNCHED SHEETS, PUNCH PRESSING AMOUNT | IN-HOUSE DISTRIBUTION MATERIAL WITH BINDING HOLE PROCESSING |
| STAPLE FAILURE | NUMBER OF STAPLED SHEETS | SADDLE STITCHED CATALOGUE, PAMPHLET, IN-HOUSE DISTRIBUTION MATERIAL WITH STAPLING PROCESSING |
| STACK FAILURE | SPEED IMMEDIATELY BEFORE COMPLETION OF PUSHING OUT BY SHEET DISCHARGING ROLLER | STACKING OF LARGE AMOUNT OF PRINTED MATTER (STACKER), DISCHARGING TRAY STACKING |
| CUTTING FAILURE | CUTTING CUTTER PRESSING AMOUNT, SLIT PRESSING AMOUNT | BORDERLESS PROCESSING (FULL BLEED PROCESSING), SHEET FLYER, CARD, NAME CARD, BANNER ADVERTISEMENT |
| FOLDING FAILURE | CREASING (LINE-MARKING) PRESSING AMOUNT, FOLDING ROLLER PRESSING AMOUNT | FOLDED CATALOGUE, PAMPHLET, BOOK COVER |
| PERFORATION FAILURE | PERFORATION ROLLER PRESSING AMOUNT | TICKET, COUPON |
| BOOK BINDING GLUE APPLICATION FAILURE | GLUE APPLICATION (APPLICATION THICKNESS) AMOUNT | GLUING AND WRAP BINDING (BOOK) |

FIG. 9A

| QUALITY ITEM | PHYSICAL PROPERTY SENSOR TYPE | SURFACE PROPERTY 1 | BASIS WEIGHT | SHEET THICKNESS | SURFACE PROPERTY 2 | RIGIDITY | |
|---|---|---|---|---|---|---|---|
| | PHYSICAL PROPERTY | SMOOTHNESS | BASIS WEIGHT | THICKNESS | GLOSSINESS | BENDING STRENGTH | |
| QUALITY ITEM | SHEET FEEDING QUALITY | ○ | ○ | ○ | ○ | ○ | SHEET FEEDING PROCESS |

FIG. 9B

| SHEET FEEDING QUALITY | CONTROL PARAMETER OF AIR SHEET FEEDING MECHANISM |
|---|---|
| SHEET FEEDING FAILURE | SEPARATION AIR VOLUME, SIDE AIR VOLUME |
| BELT SUCTION FAILURE | AIR SUCTION BELT SUCTION AIR VOLUME |

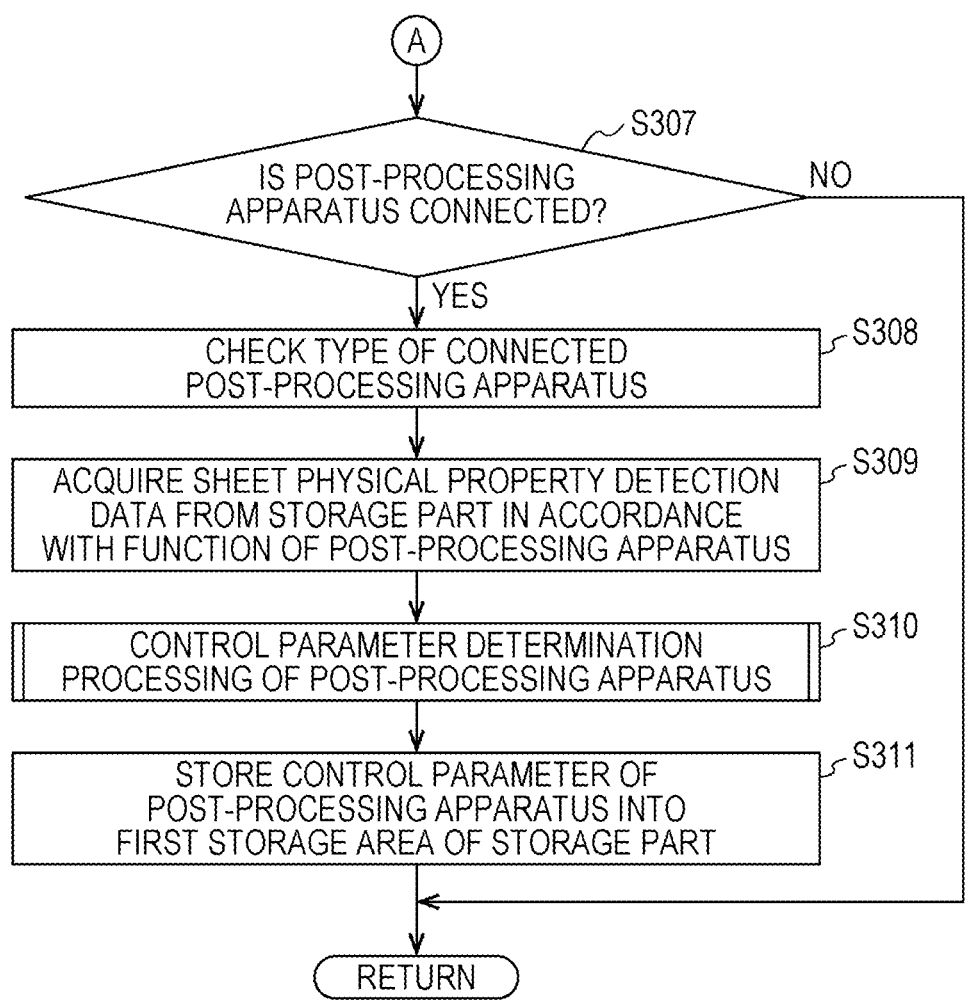

FIG. 19

DETERMINATION MODEL 1 DB

| RECORD | SHEET NAME | SURFACE PROPERTY 1 | | | SURFACE PROPERTY 2 | | | SURFACE PROPERTY 3 | | CONTROL PARAMETER VALUE |
|---|---|---|---|---|---|---|---|---|---|---|
| | | REGULAR REFLECTED LIGHT AMOUNT | DIFFUSE REFLECTED LIGHT AMOUNT | LED 1 REFLECTED LIGHT AMOUNT | LED 2 REFLECTED LIGHT AMOUNT | LED 3 REFLECTED LIGHT AMOUNT | | | ... | FRONT END SEPARATION FAN AIR VOLUME |
| 0 | A SHEET | 1516.2 | 234.5 | 386.2 | 245.5 | 289.6 | | ... | ... | 40 |
| 1 | B SHEET | 648.9 | 209.6 | 284.3 | 345.9 | 284.2 | | ... | ... | 50 |
| 2 | C SHEET | 562.3 | 255.8 | 102.8 | 27.6 | 313.6 | | | | 85 |
| 3 | D SHEET | .. | | | | | | | | .. |
| 4 | .. | .. | | | | | | | | .. |
| .. | .. | | | | | | | | | |

DETERMINATION MODEL 2 DB

| RECORD | SHEET NAME |
|---|---|
| 0 | A SHEET |
| 1 | B SHEET |
| 2 | C SHEET |
| 3 | D SHEET |
| 4 | .. |
| .. | .. |

DETERMINATION MODEL  DB**

| RECORD | SHEET NAME |
|---|---|
| 0 | A SHEET |
| 1 | B SHEET |
| 2 | C SHEET |
| 3 | D SHEET |
| 4 | .. |
| .. | .. |

FIG. 20

| DETERMINATION MODEL 1 WEIGHTING COEFFICIENT | | SURFACE PROPERTY 1 | | | SURFACE PROPERTY 2 | | | SURFACE PROPERTY 3 | ... | CONTROL PARAMETER VALUE |
|---|---|---|---|---|---|---|---|---|---|---|
| | | REGULAR REFLECTED LIGHT AMOUNT | DIFFUSE REFLECTED LIGHT AMOUNT | LED 1 REFLECTED LIGHT AMOUNT | LED 2 REFLECTED LIGHT AMOUNT | LED 3 REFLECTED LIGHT AMOUNT | | | | FRONT END SEPARATION FAN AIR VOLUME |
| RECORD | SHEET NAME | | | | | | | | | |
| 0 | A SHEET | 1 | 1 | 0.5 | 0.5 | 0.5 | | ... | ... | 40 |
| 1 | B SHEET | 1 | 1 | 0.5 | 0.5 | 0.5 | | ... | ... | 50 |
| 2 | C SHEET | 1 | 1 | 0.5 | 0.5 | 0.5 | | ... | ... | 85 |
| 3 | D SHEET | 1 | 1 | 0.5 | 0.5 | 0.5 | | | | ... |
| 4 | ... | | | | | | | | | ... |
| ... | ... | | | | | | | | | |

| DETERMINATION MODEL 2 WEIGHTING COEFFICIENT | |
|---|---|
| RECORD | SHEET NAME |
| 0 | A SHEET |
| 1 | B SHEET |
| 2 | C SHEET |
| 3 | D SHEET |
| 4 | ... |
| ... | ... |

| DETERMINATION MODEL ** WEIGHTING COEFFICIENT | |
|---|---|
| RECORD | SHEET NAME |
| 0 | A SHEET |
| 1 | B SHEET |
| 2 | C SHEET |
| 3 | D SHEET |
| 4 | ... |
| ... | ... |

FIG. 26

| MODE | ITEM | BEFORE CORRECTION | CORRECTION VALUE |
|---|---|---|---|
| | TRANSFER PROCESS CONTROL PARAMETER CORRECTION | | |
| FRONT | SECONDARY TRANSFER OUTPUT | ***** | 0 |
| BACK | SECONDARY TRANSFER OUTPUT | ***** | 0 |
| FRONT | SECONDARY TRANSFER OUTPUT FRONT END | ***** | +2 |
| BACK | SECONDARY TRANSFER OUTPUT FRONT END | ***** | 0 |
| FRONT | SECONDARY TRANSFER OUTPUT REAR END | ***** | 0 |
| BACK | SECONDARY TRANSFER OUTPUT REAR END | ***** | 0 |
| FRONT | SECONDARY TRANSFER VOLTAGE | ***** | −1 |
| BACK | SECONDARY TRANSFER VOLTAGE | ***** | 0 |

PARAMETER DETERMINATION APPARATUS, IMAGE FORMING APPARATUS, POST-PROCESSING APPARATUS, SHEET FEEDING APPARATUS, AND PARAMETER DETERMINATION METHOD

CROSS-REFERENCE TO RELATED APPLICATIONS

The entire disclosure of Japanese patent Application No. 2020-201945, which was filed on Dec. 4, 2020, is incorporated herein by reference in its entirety.

BACKGROUND

Technological Field

The present disclosure relates to a parameter determination apparatus, an image forming apparatus, a post-processing apparatus, a sheet feeding apparatus, and a parameter determination method.

Description of the Related Art

In recent years, image forming apparatuses such as electrophotographic printers have been widely used in a color printing industry. In a field of production printing (PP) corresponding to the color printing industry, adaptation to various sheets is required as compared with a case of being used in an office. Then, in order to perform high-quality printing on these various sheets, there is an image forming apparatus that sets characteristics of sheets stored in a sheet feeding tray in a plurality of items, and performs sheet processing such as printing under image forming conditions according to the set items.

In order to perform such a setting for various sheets, there is an image forming apparatus including a sensor that automatically detects a characteristic of a sheet used for printing (for example, JP H2-138805 A and JP 2012-194445 A). Furthermore, in recent years, there has also been proposed a technique of acquiring a plurality of types of physical property values related to sheets, applying the acquired plurality of types of physical property values to a determination table prepared in advance, and determining a control parameter, such as a transfer voltage, for controlling an image forming condition (for example, JP 2008-242026 A).

However, in conventional techniques such as JP H2-138805 A, JP 2012-194445 A, and JP 2008-242026 A, one control parameter is determined by calculating one sheet physical property value (dielectric thickness) related to a control parameter by computation from a plurality of sheet physical property values (dielectric constant, resistance value, sheet thickness, and the like) detected from the sheet, and applying the calculated value to a table prepared in advance. Since this technique secondarily obtains the sheet physical property value for determining the control parameter from a plurality of pieces of detection data, there is a problem that an error easily occurs in the value. Furthermore, in the above technique, since the control parameter is determined with reference to the table prepared in advance, the control parameter whose value varies stepwise for each predetermined section (range) is to be determined, which also causes a problem that an optimal control parameter value is unable to be determined.

SUMMARY

The present disclosure has been made in view of the above circumstances, and an object thereof is to provide a parameter determination apparatus, an image forming apparatus, a post-processing apparatus, a sheet feeding apparatus, and a parameter determination method for deriving an optimum control parameter for each sheet.

To achieve the abovementioned object, according to an aspect of the present disclosure, a parameter determination apparatus reflecting one aspect of the present disclosure may comprise: a first hardware processor that acquires a value related to a plurality of types of sheet physical properties; a second hardware processor that specifies at least any of a sheet type or a basis weight based on an acquired value related to a sheet physical property; and a third hardware processor that specifies a parameter related to sheet processing without specifying at least any of the sheet type or the basis weight, based on an acquired value related to a sheet physical property.

BRIEF DESCRIPTION OF THE DRAWINGS

The advantages and features provided by one or more embodiments of the disclosure will become more fully understood from the detailed description given hereinbelow and the appended drawings which are given by way of illustration only, and thus are not intended as a definition of the limits of the present disclosure:

FIG. 7 is a table for explaining quality items and sheet physical properties related to each quality item in image forming processing;

FIG. 8A is a table for explaining quality items and sheet physical properties related to each quality item in post-processing;

FIG. 8B is a table for explaining parameters related to the post-processing;

FIG. 9A is a table for explaining quality items and sheet physical properties related to each quality item in sheet feeding processing;

FIG. 9B is a table for explaining parameters related to the sheet feeding processing;

FIG. 13B is a flowchart following FIG. 13A;

FIG. 19 is a view illustrating an example of a teacher data database;

FIG. 20 is a view illustrating an example of a coefficient table;

FIG. 26 is an example of an operation screen to display a determined control parameter and to receive an instruction to change the control parameter from a user;

DETAILED DESCRIPTION OF EMBODIMENTS

Figure 1:
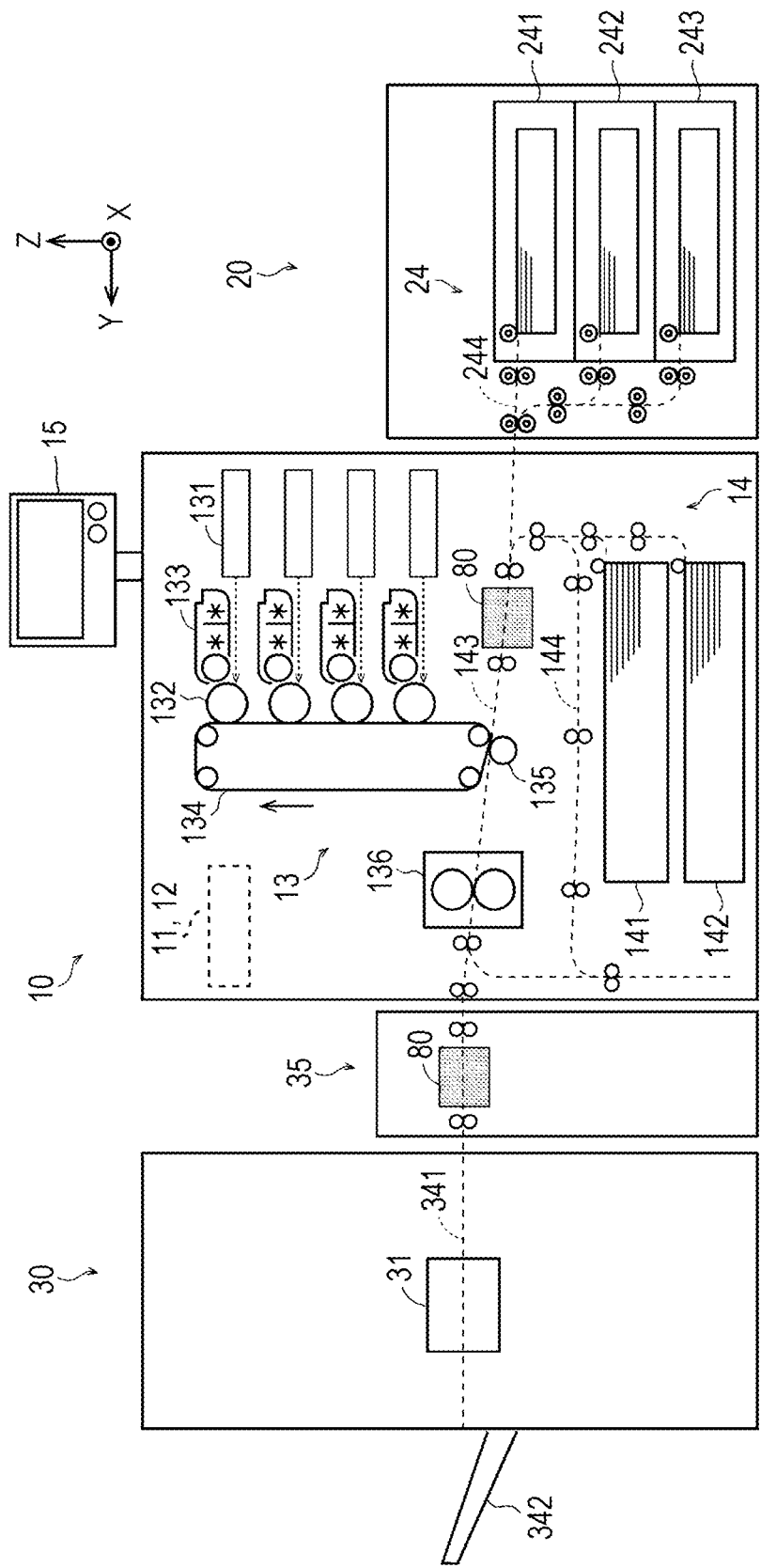
FIG. 1 is a view illustrating a schematic configuration of an image forming system according to an embodiment of the present embodiment.

Hereinafter, one or more embodiments of the present disclosure will be described with reference to the drawings. However, the scope of the disclosure is not limited to the disclosed embodiments. In the description of the drawings, the same elements are denoted by the same reference numerals, and redundant descriptions are omitted. Further, the dimensional ratios in the drawings are exaggerated for convenience of description, and may differ from the actual ratios. In the drawings, a vertical direction is set as a Z direction, a direction of a front surface and a back surface of an image forming apparatus is set as an X direction, and a direction orthogonal to the X and Z directions is set as a Y direction. The X direction is also referred to as a width direction or a rotation axis direction. Further, in the vicinity of a medium sensor (a medium sensor 80 to be described later), a conveyance direction of a recording medium, which is orthogonal to the X direction and is parallel to a plane of a conveyance path (conveyance path 143 to be described later) inclined with respect to a horizontal plane, is referred to as the Y' direction, and a direction orthogonal to the Y' direction is referred to as a Z' direction (see FIG. 2 and the like). In the present embodiment, the recording medium includes a printing sheet (hereinafter, simply referred to as a sheet) and various films. In particular, the sheet includes ones produced using plant-derived mechanical pulp and/or chemical pulp. In addition, a type of the recording medium includes gloss paper and matte paper of coated paper (gloss coated paper and matte coated paper), plain paper and high-quality paper of non-coated paper, and the like.

(Image Forming System 1)

FIG. 1 is a view illustrating a schematic configuration of an image forming system 1 including an image forming apparatus 10 according to an embodiment of the present embodiment. As illustrated in FIG. 1, the image forming system 1 includes the image forming apparatus 10, a sheet feeding apparatus 20, a post-processing apparatus 30, and an intermediate conveyance apparatus 35 that are mechanically and electrically connected to each other. Each of the image forming apparatus 10, the sheet feeding apparatus 20, the post-processing apparatus 30, and the intermediate conveyance apparatus 35 can constitute a sheet processing apparatus that performs sheet processing on a sheet S.

(Image Forming Apparatus 10)

Figure 2:
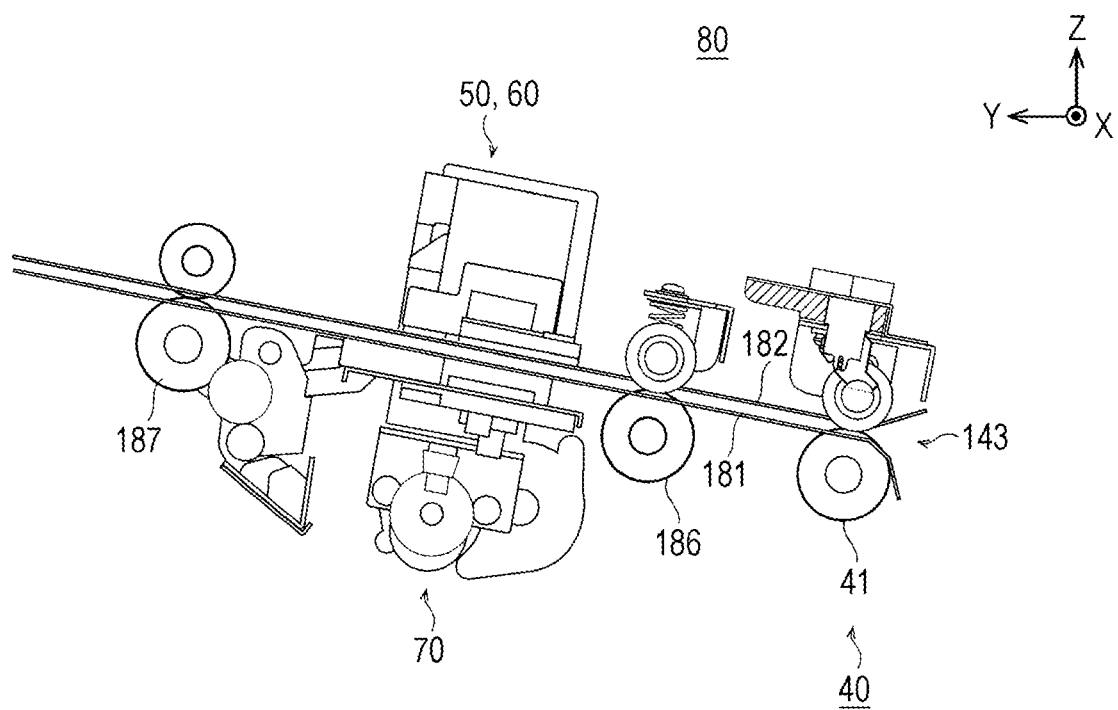
FIG. 2 is a side view illustrating a configuration of a medium sensor arranged on a conveyance path.

The image forming apparatus 10 includes a control part 11, a storage part 12, an image forming part 13, a sheet feeding conveyance part 14, the medium sensor 80, an operation panel 15, a communication part (not illustrated), and the like. These are connected to each other via a signal line such as a bus for exchanging signals. FIG. 2 is a side view illustrating a configuration of the medium sensor 80 arranged on the conveyance path 143. The medium sensor 80 includes a sheet thickness detection part 40 (sheet thickness sensor 40), a basis weight detection part 50 (basis weight sensor 50), a surface property detection part 60 (surface property sensor 60), and a sheet pressing mechanism 70, and measures sheet characteristics. The surface property sensor 60 functions as an optical sensor device, and detects sheet characteristics, particularly a surface property of a sheet. Details of the medium sensor 80 including the surface property sensor 60 will be described later. In the present embodiment, the medium sensor 80 functions as a detection part. Furthermore, the control part 11 functions as a parameter determination apparatus.

(Control Part 11)

The control part 11 includes a CPU, a ROM, a RAM, and the like, executes various types of processing by executing a program stored in the ROM or the storage part 12 to be described later, and performs control of each part of the apparatus and various types of arithmetic processing in accordance with the program.

(Storage Part 12)

The storage part 12 includes a ROM that stores various programs and various data in advance, a RAM that temporarily stores programs and data as a work area, a hard disk that stores various programs and various data, and the like. In addition, the storage part 12 stores information on sheets stored in each sheet feeding tray. The information on the sheets includes information on a sheet brand, a size (a sheet width and a sheet length), a basis weight (weight), and a sheet type (gloss coated paper, matte coated paper, plain paper, high-quality paper, rough paper, and the like). Furthermore, the storage part 12 may store a sheet brand, a determination model (determination model algorithm) to be used for determination of control parameters, and store a paper profile.

(Image Forming Part 13)

The image forming part 13 forms an image by, for example, an electrophotographic method. The image forming part 13 includes, corresponding to each of basic colors of yellow (Y), magenta (M), cyan (C), and black (K), a writing part 131, a photosensitive drum 132, a developing device 133 that stores two-component developer including toner and carrier of each color. Moreover, the image forming part 13 further includes an intermediate transfer belt 134, a secondary transfer part 135, and a fixing part 136. Toner images formed on the photosensitive drums 132 by the developing devices 133 of the respective colors are superimposed on each other on the intermediate transfer belt 134 and transferred to the sheet S conveyed in the secondary transfer part 135. The toner image on the sheet S is fixed on the sheet S by being heated and pressurized by the fixing part 136 on a downstream side.

(Sheet Feeding Conveyance Part 14)

The sheet feeding conveyance part 14 includes a plurality of sheet feeding trays 141 and 142, conveyance paths 143 and 144, and the like. The conveyance paths 143 and 144 include a plurality of conveyance roller pairs provided along these conveyance paths, and a drive motor (not illustrated) that drives these conveyance roller pairs. There is provided a feeding roller that feeds an uppermost sheet among the plurality of sheets S stacked and placed in the sheet feeding trays 141 and 142, and the sheets S in the sheet feeding tray are fed to a conveyance path on a downstream side one by one. On an upstream side of a resist roller on the conveyance path 143, the medium sensor 80 is disposed. As illustrated in FIG. 2, in the vicinity of the medium sensor 80, the conveyance path 143 includes an upper guide plate 182 and a lower guide plate 181 made with sheet metal, and the sheet S passes between these guides facing each other at a predetermined interval.

The sheet feeding conveyance part 14 conveys the sheet S fed from the sheet feeding tray 141 or the like. After an image is formed by the image forming part 13, the sheet S conveyed on the conveyance path 143 is discharged onto a sheet discharging tray 342 via the subsequent post-processing apparatus 30. In a case of performing double-sided printing for forming an image also on a back surface of the sheet S, the sheet S formed with an image on one side is conveyed to the conveyance path 144 for double-sided image formation in a lower part of an apparatus main body. After front and back sides of the sheet S conveyed to the conveyance path 144 are reversed in a switchback path, the sheet S joins the conveyance path 143 for one side, and an image is formed on another side of the sheet S again by the image forming part 13.

(Operation Panel 15)

The operation panel 15 includes a touch panel, a numerical key, a start button, a stop button, and the like, and displays a state of the image forming apparatus 10 or the image forming system 1, and is used for inputting a setting of a type of sheets placed on the sheet feeding tray 141 or the like and an instruction from a user. In the present embodiment, the operation panel 15 functions as a display part.

(Sheet Feeding Apparatus 20)

As illustrated in FIG. 1, the sheet feeding apparatus 20 includes a sheet feeding conveyance part 24. The sheet feeding conveyance part 24 functions as a sheet feeding part. In addition to the sheet feeding conveyance part 24, the sheet feeding apparatus 20 includes a control part, a storage part, and a communication part (all not illustrated), which are connected to each other via a signal line such as a bus for exchanging signals. The sheet feeding conveyance part 24 includes a plurality of sheet feeding trays 241, 242, and 243, and a conveyance path 244. The sheet S conveyed from each sheet feeding tray is conveyed to the image forming apparatus 10 on a downstream side, and a sheet characteristic is measured by the medium sensor 80 or an image is formed by the image forming part 13.

(Post-Processing Apparatus 30)

As illustrated in FIG. 1, the post-processing apparatus 30 includes a post-processing part 31, a conveyance path 341, and the sheet discharging tray 342. The post-processing part 31 performs processing such as stapling processing, cutting processing, punching processing (punching hole), creasing processing (line-marking), folding processing, perforation processing, and gluing and wrap binding processing, on the sheet S conveyed from the image forming apparatus 10. In addition to these components, the post-processing apparatus 30 includes a control part, a storage part, and a communication part (all not illustrated), which are connected to each other via a signal line such as a bus for exchanging signals.

As illustrated in FIG. 1, the intermediate conveyance apparatus 35 is connected between the image forming apparatus 10 and the post-processing apparatus 30, and relays the sheet S discharged from the image forming apparatus 10 to the post-processing apparatus 30. On the conveyance path of the intermediate conveyance apparatus 35, the medium sensor 80 is provided and is made to be able to detect sheet physical properties of the sheet S after the image fixing processing is performed. In addition to these components, the intermediate conveyance apparatus 35 includes a control part, a storage part, and a communication part (all not illustrated), which are connected to each other via a signal line such as a bus for exchanging signals. Detection data of sheet physical properties detected by the medium sensor 80 is transmitted to the control part 11 of the image forming apparatus 10.

(Medium Sensor 80)

FIG. 2 is a side view illustrating a configuration of a built-in medium sensor 80 arranged on the conveyance path 143. The medium sensor 80 includes various sensors (sensors 1 to 10 to be described later) including the sheet thickness detection part 40, the basis weight detection part 50, the surface property detection part 60, and the sheet pressing mechanism 70, and measures a plurality of sheet physical properties. The basis weight detection part 50 is a transmissive first optical sensor, and the surface property detection part 60 is a reflective second optical sensor. The sheet pressing mechanism 70 presses a sheet when the surface property detection part 60 detects the sheet physical properties of the sheet. Note that the medium sensor 80 provided in the intermediate conveyance apparatus 35 also has a configuration similar to the above.

As illustrated in FIG. 2, among these components, the sheet thickness detection part 40 is disposed on an upstream side in the conveyance direction, and the basis weight detection part 50, the surface property detection part 60, and the sheet pressing mechanism 70 are disposed on a downstream side. The basis weight detection part 50 and the surface property detection part 60 are arranged side by side in the width direction (X direction) at the same position in the conveyance direction. For example, the basis weight detection part 50 is disposed on a front side, and the surface property detection part 60 is disposed on a back side. The surface property detection part 60 is disposed on an upper side of the conveyance path 143 formed between the upper guide plate 182 and the lower guide plate 181, and the sheet pressing mechanism 70 is disposed on a lower side so as to be opposed. In the conveyance path 143, conveyance roller pairs 41, 186, and 187 are arranged in order from an upstream side.

(Sheet Thickness Detection Part 40)

In the sheet thickness detection part 40, a shaft position of a driven roller is displaced in accordance with a thickness of the sheet S, when the sheet S is conveyed to a nip of the conveyance roller pair 41. By measuring a height of this displaced shaft, the thickness of the sheet S is measured. In the conveyance roller pair 41, a lower roller of the two rollers is a driving roller that is fixed (an axial center is fixed), and an upper roller is a driven roller biased separably toward the driving roller. A height of the upper roller is detected by a displacement sensor. The displacement sensor includes an actuator (detection lever) that comes into contact with an upper roller shaft, and an encoder that measures a rotation amount of the actuator. For example, the sheet thickness (microns) is outputted from the sheet thickness detection part 40 as a measurement result of the sheet thickness.

(Basis Weight Detection Part 50)

The basis weight detection part 50 is a transmissive optical sensor that detects a physical property value corresponding to a basis weight of the sheet S. The basis weight detection part 50 includes a light emitter disposed below the conveyance path and a light receiver disposed above the conveyance path 143, and measures an attenuation amount (transmittance) of light transmitted through the sheet S. For example, the transmittance is outputted as a measurement result of the basis weight from the basis weight detection part 50.

(Surface Property Detection Part 60)

The surface property detection part 60 includes a housing, a light emitter, a collimating lens, and a plurality of light receivers, and optically detects regular reflected light and diffuse reflected light from a sheet surface as described below. The upper guide plate 182 is provided with an opening (measurement region), and the opening serves as an irradiation region of the light receiver. The sheet S conveyed to the opening is temporarily stopped. In this state, the sheet S is pressed by the sheet pressing mechanism 70 from a lower side, to be positioned. A reference surface in the opening is a virtual surface including a lower surface of the upper guide plate 182. At the time of measurement, a surface of the positioned sheet S, which is an object to be measured, is arranged on the reference surface. From the light emitter, irradiation light made substantially parallel by the collimating lens is emitted at an incident angle of 75° with respect to the reference surface. A wavelength of the irradiation light is, for example, 465 nm. The plurality of light receivers receive regular reflected light and diffuse reflected light. For example, the plurality of light receivers are disposed at three places with a reflection angle of 30 degrees (for diffuse reflected light), 60 degrees (for diffuse reflected light), and 75 degrees (for regular reflected light), or two places with 60 degrees and 75 degrees. From the surface property detection part 60, a signal of the light receiver is outputted as a measurement result of smoothness (surface property 1). In this case, the surface property detection part 60 functions as a surface property sensor 1.

(Sheet Pressing Mechanism 70)

The sheet pressing mechanism 70 is disposed below the lower guide plate 181. The sheet pressing mechanism 70 includes a pressing part, a drive motor, a cam mechanism, and the like. An upper surface of the pressing part is a plane that is parallel to the lower guide plate 181 and moves up and down by driving of the drive motor. The upper surface has substantially the same plane as the lower guide plate 181 at a time of normal sheet passing, but is raised to press the sheet S against the surface property detection part 60 at a time of measurement. In the pressed state, the conveyance of the sheet S is stopped.

(Details of Image Forming Apparatus 10)

Figure 3:
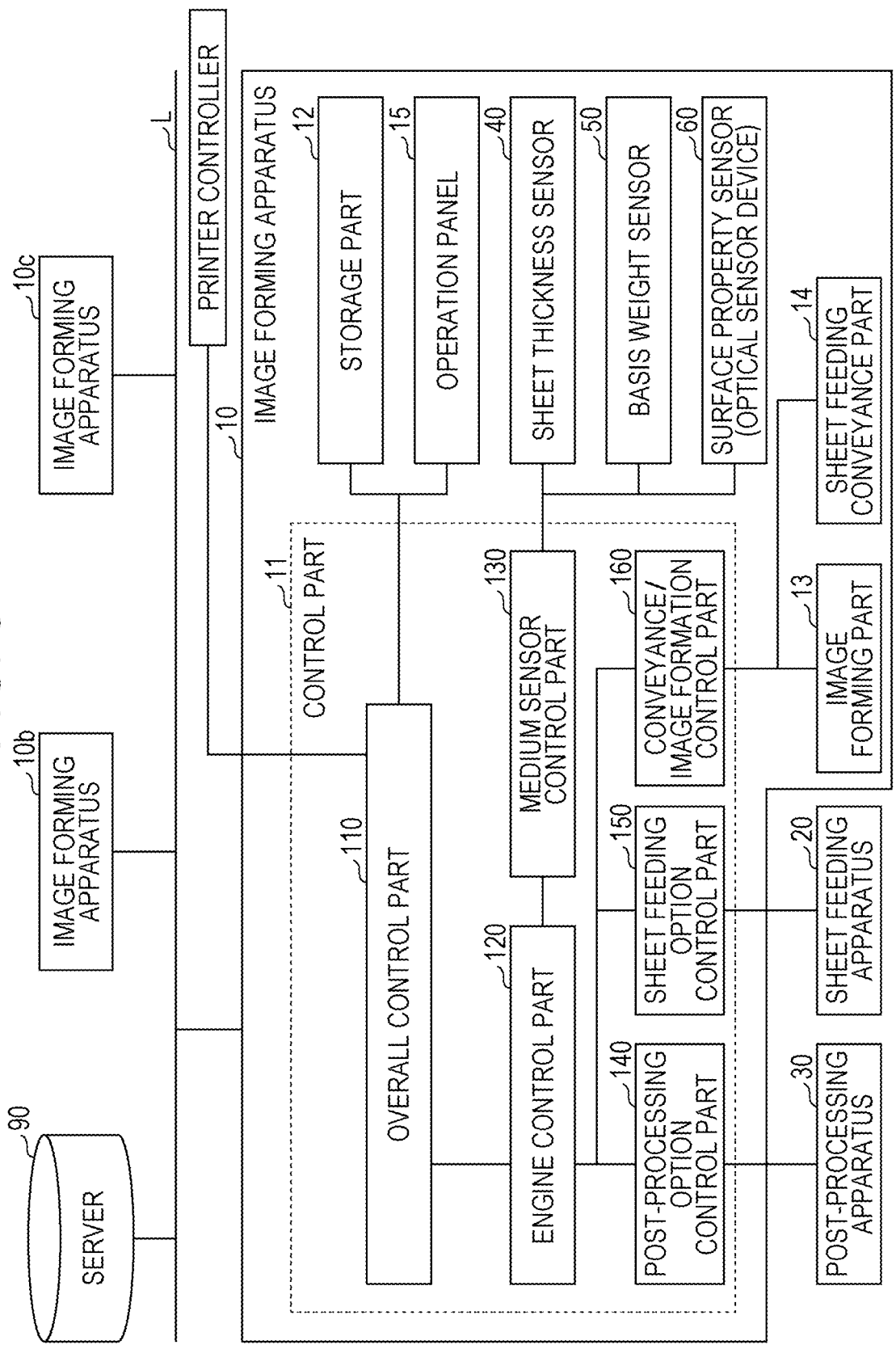
FIG. 3 is a block diagram illustrating a configuration of an image forming apparatus.
Figure 4A:
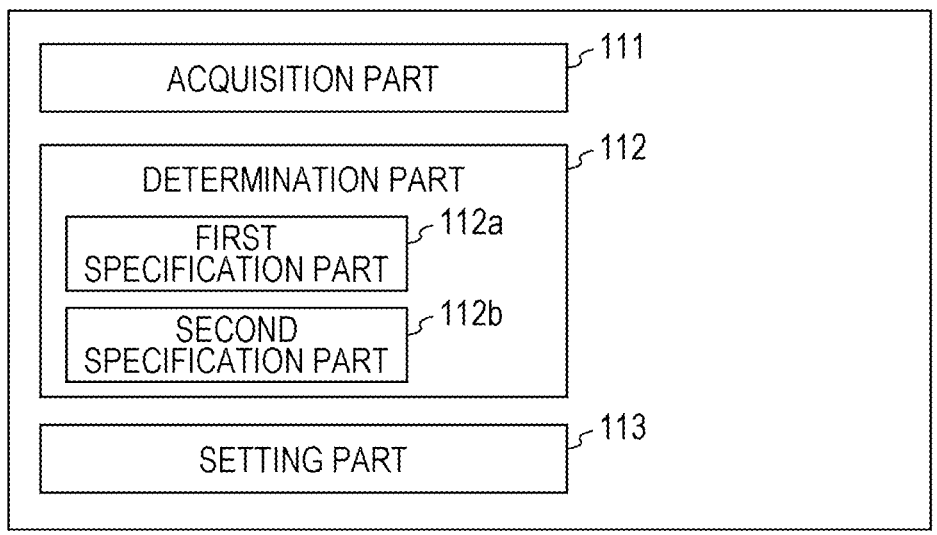
FIG. 4A is a block diagram illustrating a functional configuration of a control part of the image forming apparatus.
Figure 4B:
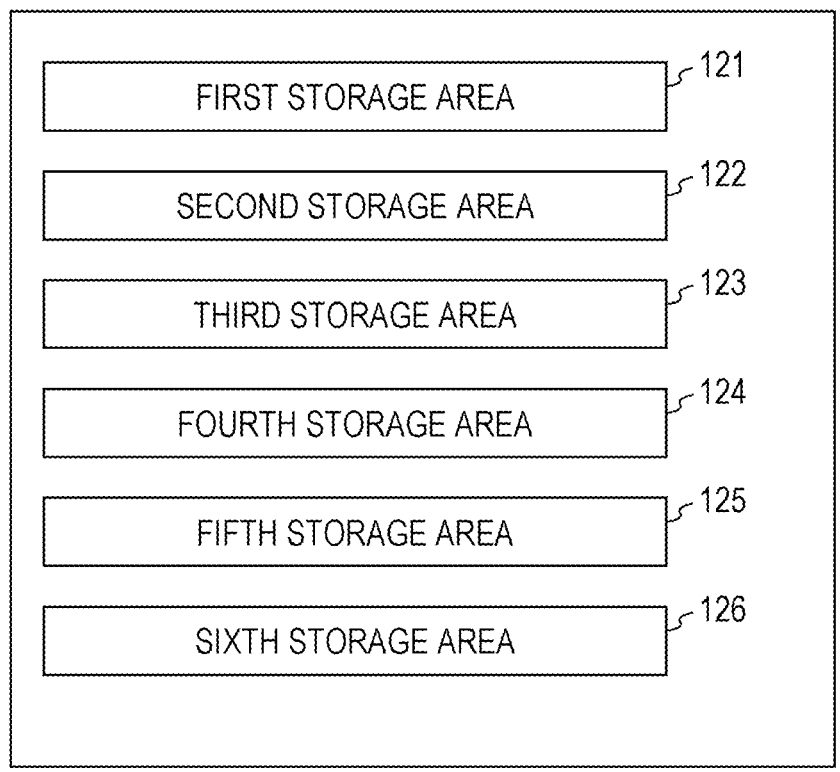
FIG. 4B is a block diagram illustrating a configuration of a storage part of the image forming apparatus.

Next, details of a configuration and a function of the image forming apparatus 10 will be described with reference to FIGS. 3, 4A, and 4B. FIG. 3 is a block diagram illustrating a configuration of the image forming apparatus. FIG. 4A is a block diagram illustrating a functional configuration of an overall control part of the image forming apparatus. FIG. 4B is a block diagram illustrating a configuration of a storage part of the image forming apparatus.

As illustrated in FIG. 3, the image forming apparatus 10 is connected to a server 90 and other image forming apparatuses 10b and 10c via a network L. Since the configuration of the image forming apparatus 10 other than the control part 11 has been already described with reference to FIG. 1 and the like, the same reference numerals are given and description thereof is omitted in this figure.

The control part 11 functions as an overall control part 110, an engine control part 120, a medium sensor control part 130, a post-processing option control part 140, a sheet feeding option control part 150, and a conveyance/image formation control part 160.

When a print job is inputted in response to an instruction sent from the operation panel 15, an external terminal such as a PC connected to the network and operated by a user or a printer controller, the overall control part 110 causes the engine control part 120 to execute the print job on the basis of print setting information of the inputted print job.

The engine control part 120 controls the post-processing option control part 140, the sheet feeding option control part 150, and the conveyance/image formation control part 160 to perform processing related to image formation. The post-processing option control part 140 controls the post-processing apparatus 30. Specifically, the post-processing option control part 140 transmits a sheet conveyance timing, setting information of post-processing of a sheet to be conveyed, and the like, to the post-processing apparatus 30. The sheet feeding option control part 150 controls the sheet feeding apparatus 20. Specifically, the sheet feeding option control part 150 transmits and receives information regarding a sheet feeding tray to be used, a sheet conveyance timing, and the like, by communicating with the sheet feeding apparatus 20.

The conveyance/image formation control part 160 controls the sheet feeding conveyance part 14 (a drive motor of the conveyance paths 143 and 144 and the fixing part 136) to control sheet feeding and conveyance of the sheet S. Furthermore, the conveyance/image formation control part 160 controls the image forming part 13 to control image forming conditions and an image forming timing according to a sheet position.

In response to an execution instruction request from the engine control part 120, the medium sensor control part 130 controls various sensors including the sheet thickness sensor 40, the basis weight sensor 50, and the surface property sensor 60 to execute measurement of sheet characteristics. Furthermore, the medium sensor control part 130 controls an operation of the sheet pressing mechanism 70.

As illustrated in FIG. 4A, the control part 11 functions as an acquisition part 111, a determination part 112, and a setting part 113.

The acquisition part 111 acquires a value related to a plurality of types of sheet physical properties.

The determination part 112 determines a parameter related to sheet processing on the basis of the value related to the sheet physical properties and acquired by the acquisition part 111. For example, the determination part 112 executes first processing of specifying at least any of a sheet type or a basis weight on the basis of the value related to the sheet physical properties and acquired by the acquisition part 111. On the basis of the specified sheet type or basis weight, the parameter related to the sheet processing is determined. At this time, the determination part 112 functions as a first specification part 112a. Further, the determination part 112 executes second processing of specifying a parameter related to the sheet processing without specifying at least any of the sheet type or the basis weight from the value related to the plurality of types of sheet physical properties and acquired by the acquisition part 111, on the basis of a program using at least any of a learning function including artificial intelligence or a statistical method. At this time, the determination part 112 functions as a second specification part 112b. The first specification part 112a and the second specification part 112b may function in combination with each other or may function independently of each other, on the basis of an instruction from the control part 11.

The setting part 113 receives a setting related to which of the first specification part 112a and the second specification part 112b is used to specify the parameter related to the sheet processing. The above-described setting is received, for example, on the basis of an instruction from the user via the operation panel 15.

The control part 11 executes parameter determination processing using a parameter determination model (parameter determination model algorithm) stored in the storage part 12. The parameter determination model is configured by a program using a learning function including artificial intelligence or a statistical method, and determines the parameter related to the sheet processing from the value related to the plurality of types of sheet physical properties. The above-described program is, for example, a program based on an algorithm that changes dynamically, such as a learned model continuously machine-learned and updated as in artificial intelligence, or a model configured using a statistical method such as a multiple regression model.

A learning function in a parameter determination engine is configured by, for example, ensemble learning that generates one learning device by fusing a plurality of learning devices. As a learning method, for example, gradient boosting can be adopted. In machine learning, learning using teacher data is performed with a detection output of the sheet S by the medium sensor 80 as an input value and a parameter related to the sheet processing as a correct label. As the teacher data, data of other image forming apparatuses 10b and 10c and the like connected to the network L may be aggregated by the server 90. Furthermore, as the learning method, a neural network, a support vector machine (SVM), a Bayesian network linear discrimination method, a nonlinear discrimination method, or the like may be adopted. Furthermore, as the learning device that executes machine learning, it is possible to use a stand-alone high-performance computer using processors of a CPU and a graphics processing unit (GPU), or a cloud computer. Details of a creation method of the parameter determination model will be described later.

In addition, the acquisition part 111 further acquires information regarding apparatus states of the image forming apparatus 10, the post-processing apparatus 30, and the like that perform the sheet processing. In this case, the determination part 112 determines the parameter related to the sheet processing from the value related to the plurality of types of sheet physical properties and the information regarding the apparatus state. Note that the determination part 112 may determine the parameter related to the sheet processing on the basis of the acquired information regarding the apparatus state and at least any of the specified sheet type or basis weight.

In addition, the acquisition part 111 acquires the information regarding the apparatus state at a predetermined timing. The determination part 112 can determine the parameter related to the sheet processing for a plurality of sheets. Furthermore, at a time of an initial setting of actual printing preparation, the determination part 112 can determine the parameter related to the sheet processing for every sheet passing or for every predetermined sheet passing interval, during the actual printing.

In addition, priority is given to each value related to the plurality of types of sheet physical properties used by the determination part 112 by weighting or the like, and the determination part 112 can determine the parameter related to the sheet processing on the basis of a given priority. Further, the priority to be given may be different between the first processing and the second processing.

The value related to the plurality of types of sheet physical properties includes at least two of: a value related to a sheet surface state; a value related to a sheet basis weight; a value related to a sheet thickness; a value related to sheet gloss; a value related to emboss processing; a value related to a sheet moisture amount; a value related to sheet volume resistance; a value related to sheet bending strength; or a value related to a sheet charge amount.

the parameter related to the sheet processing includes a parameter related to image formation in the image forming apparatus 10. The parameter related to image formation includes at least any of: a parameter related to a fixing process; a parameter related to a destaticizing process; a parameter related to a transfer process; or a parameter related to a conveyance process.

In addition, the parameter related to the sheet processing includes a parameter related to post-processing in the post-processing apparatus 30 or a parameter related to sheet feeding processing in the sheet feeding apparatus 20. The parameter related to the post-processing includes at least any of: a parameter related to punch processing; a parameter related to stack processing; a parameter related to stapling processing at a time of creating a distribution material; a parameter related to cutting processing of creating a borderless pamphlet or a card; a parameter related to folding processing and creasing processing at a time of creating a two-page pamphlet; a parameter related to perforation processing of creating a ticket, a coupon, or the like; or a parameter related to bookbinding processing. The parameter related to the sheet feeding processing includes at least any of: a parameter related to a suction air volume by a suction belt in sheet feeding and related to an assist air volume; or a parameter related to a separation roller pressure and an operating speed of a separation roller.

As illustrated in FIG. 4B, the storage part 12 includes a first storage area 121 to a sixth storage area 126. The first storage area 121 is a control parameter storage area in sheet physical property detection before actual printing. The second storage area 122 is a control parameter storage area with a correction before actual printing. The third storage area 123 is a control parameter storage area in previous sheet physical property detection during actual printing. The fourth storage area 124 is a control parameter storage area in current sheet physical property detection during actual printing. The fifth storage area 125 is a storage area for printing condition setting information and apparatus state information. The sixth storage area 126 is a storage area of a teacher database. As will be described later, in each storage area, each piece of corresponding information is stored and updated, and read by the control part 11 as necessary. Note that necessary information other than the above-described information is also appropriately stored in the storage part 12.

(Control Parameter Determination Scheme)

Figure 5:
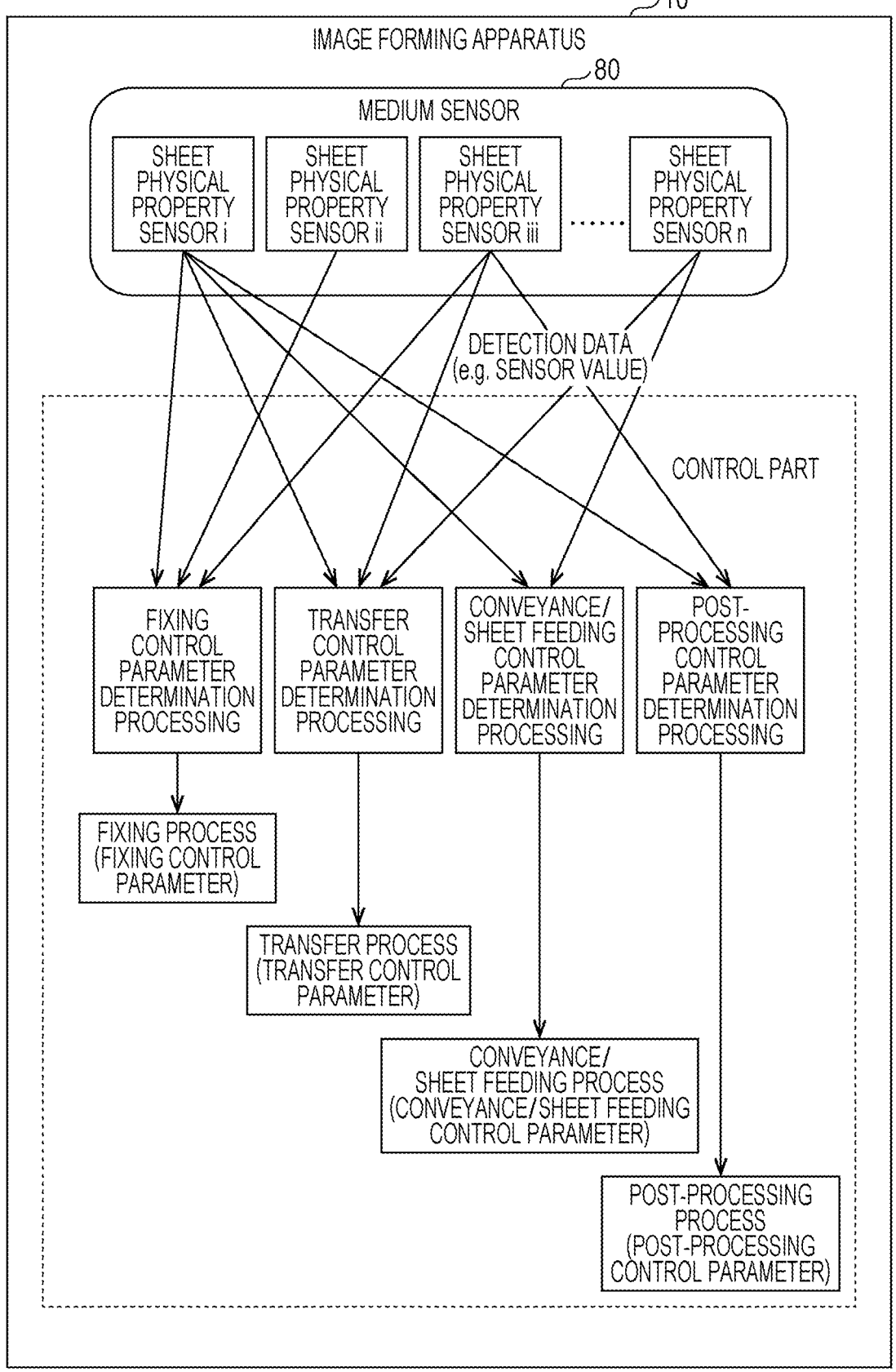
FIG. 5 is a schematic diagram illustrating a control parameter determination scheme.

FIG. 5 is a schematic diagram illustrating a control parameter determination scheme. In a conventional control parameter determination scheme, detection data is once converted into a paper type and a basis weight and classified, and then a control parameter is determined. However, in the control parameter determination scheme in the present embodiment, each control parameter is directly determined from detection data of sheet physical properties. For example, the control part 11 of the image forming apparatus 10 determines a fixing control parameter from detection data of sheet physical property sensors i to iii, and determines a transfer control parameter from detection data of the sheet physical property sensors i, iii, and n.

Figure 6:
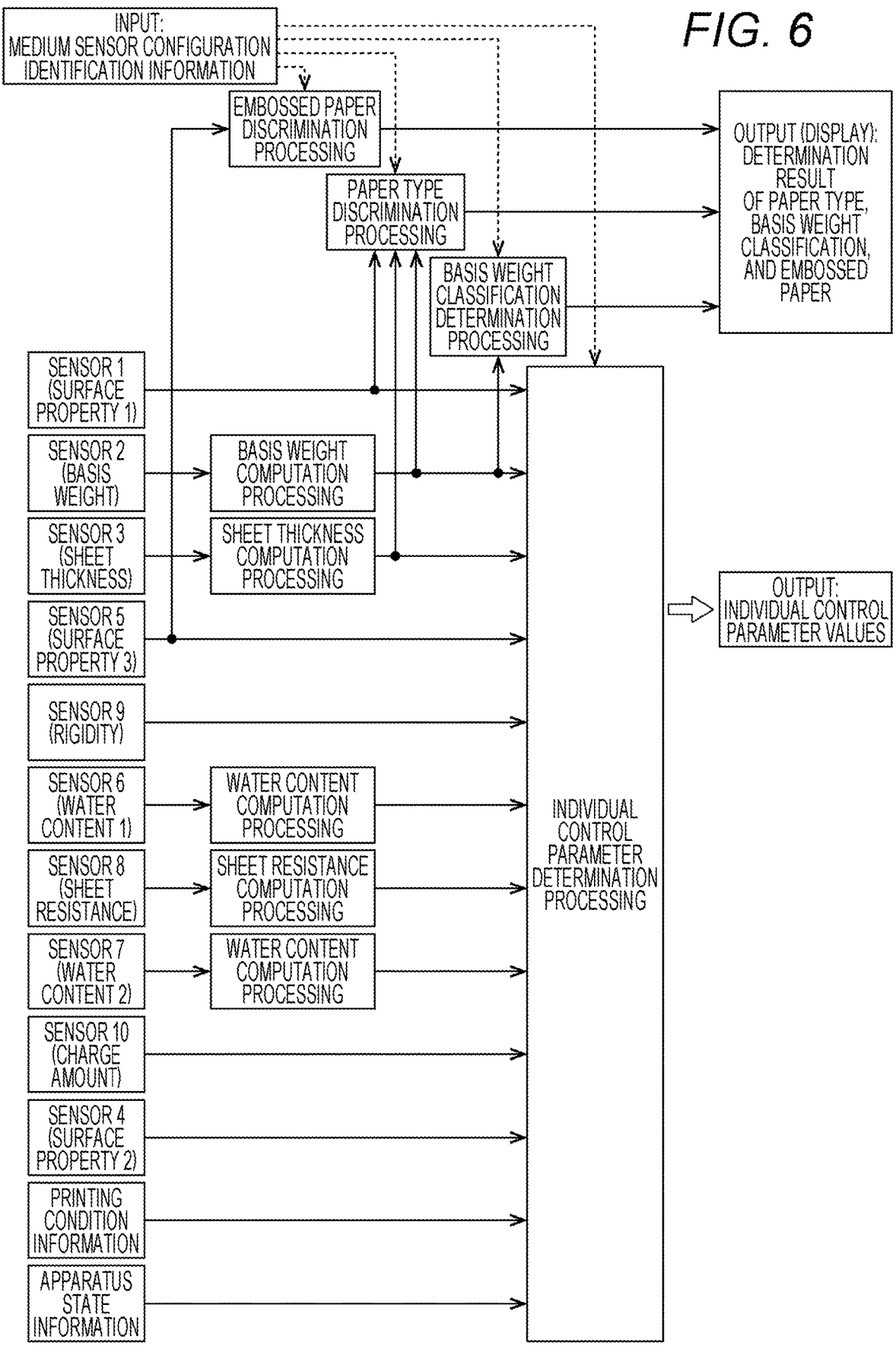
FIG. 6 is a diagram for explaining a processing flow of the control parameter determination scheme.

FIG. 6 is a diagram for explaining a processing flow of the control parameter determination scheme. In accordance with the processing flow as illustrated in FIG. 6, the control part 11 of the image forming apparatus 10 determines emboss, a paper type, and basis weight classification for information provision to a user, and displays a determination result on the operation panel or the like. That is, the control part 11 executes the first processing of specifying a sheet type from the acquired value related to the sheet physical properties. The determination result of the emboss, the paper type, and the basis weight classification is not basically used for control such as image formation, but is provided to the user in order to correspond to the conventional control parameter determination scheme. Furthermore, the control part 11 directly determines each control parameter from detection data of sheet physical properties. That is, the control part 11 executes the second processing of determining a parameter related to the sheet processing without specifying the sheet type from the acquired value related to the sheet physical properties. The control part 11 may execute the first processing and the second processing in combination, or may separately execute the first processing and the second processing by appropriately switching.

FIG. 7 is a table for explaining quality items and sheet physical properties related to each quality item in each process of image forming processing.

FIG. 7 illustrates a relationship of quality items such as fixing quality, secondary transfer quality, conveyance quality, and sheet discharging quality that are present in respective processes such as the fixing process, the transfer process, the conveyance process, and the destaticizing process included in the image forming processing, with sheet physical properties related to each quality item. Examples of the sheet physical properties detected by each sheet physical property sensor include smoothness, a basis weight, a thickness, glossiness, a concave depth, a water content 1, a water content 2, a volume resistance value, bending strength, and a charge amount.

The "smoothness" is acquired by detecting a physical property according to smoothness of a surface property of a sheet by a surface property sensor 1 (sensor 1). The "smoothness" is acquired by the surface property detection part 60 to be described later, and acquired by, for example, irradiating a sheet surface with light at an incident angle of 75 degrees, and optically detecting regular reflected light and diffuse reflected light from the surface of the sheet by two sensors. The "smoothness" constitutes a value related to a sheet surface state.

The "basis weight" is acquired by detecting a physical property according to a basis weight of a sheet by a basis weight sensor (sensor 2). The "basis weight" is acquired by the basis weight detection part 50 to be described later, and is acquired by measuring an attenuation amount (transmittance) of light transmitted through the sheet by, for example, transmissive and reflective optical sensors.

The "sheet thickness" is acquired by detecting a physical property according to a thickness of a sheet by a sheet thickness sensor (sensor 3). The "sheet thickness" is acquired by the sheet thickness detection part 40 to be described later, and is acquired, for example, by sandwiching the sheet by two members and measuring a distance between the two members.

The "glossiness" is acquired by detecting a physical property according to glossiness of a surface property of a sheet by a surface property sensor 2 (sensor 4). The "glossiness" is acquired by irradiating a sheet surface with light at a predetermined incident angle and optically detecting regular reflected light from the surface of the sheet.

The "concave depth" is acquired by detecting a degree of unevenness of a surface property of a sheet by a surface property sensor 3 (sensor 5). The "concave depth" is acquired by, for example, irradiating a sheet surface with light at a large incident angle (80 degrees or more and less than 90 degrees), capturing an image of this state, and performing image processing on the obtained image data, to measure an index related to a depth amount according to an uneven state of the surface. The "concave depth" constitutes a value related to emboss processing.

The "water content 1" is acquired by detecting a physical property according to a water content of a sheet by a water content sensor (sensor 6). The "water content 1" is acquired by, for example, a water content sensor that optically detects a light absorption amount of a near-infrared OH group by transmitted light of the sheet. The "water content 1" constitutes a value related to a sheet moisture amount.

The "water content 2" is acquired by detecting a physical property according to a water content of a sheet by a water content sensor (sensor 7). The sensor 7 is the same type of sensor as the sensor 6 to acquire the water content 1, and is disposed at a position different from that of the sensor 6. The "water content 1" is acquired by measuring a sheet before passing through a fixing device (device for heating and pressurizing processing of the sheet) of the image forming apparatus 10, and the "water content 2" is acquired by measuring the sheet after passing through the fixing device. The "water content 2" constitutes a value related to a sheet moisture amount.

The "sheet resistance" is acquired by detecting a physical property according to an electric resistance of an inside or a surface of a sheet by the sensor 8. The "sheet resistance" is acquired by, for example, measuring a voltage and a flowing current when a high voltage is applied to the sheet. The "sheet resistance" constitutes a value related to a sheet volume resistance.

"Rigidity" is acquired by detecting a physical property according to a rigidity of a sheet by the sensor 9. The "rigidity" is acquired by, for example, mechanically measuring, in a curved conveyance path when a sheet is conveyed to the curved conveyance path, a force or a displacement amount by which the sheet pushes one outer guide plate constituting the conveyance path. The "rigidity" constitutes a value related to a sheet bending strength.

The "charge amount" is acquired by detecting a physical property according to charging characteristics of a sheet surface by the sensor 10. The "charge amount" is acquired by, for example, using a non-contact potential sensor as the sensor 10.

The sheet physical properties related to each quality item are indicated by circles in FIG. 7. Therefore, for example, various control parameters in the fixing process are directly determined from detection data of smoothness, a basis weight, a thickness, glossiness, a concave depth, a water content 1, a water content 2, bending strength, and a charge amount of the sheet S. Similarly, various control parameters in other processes are also directly determined from detection data of related sheet physical properties.

FIG. 8A is a table for explaining quality items and sheet physical properties related to each quality item in post-processing. FIG. 8B is a table for explaining parameters related to the post-processing.

FIG. 8A illustrates a relationship of quality items such as punch failure, staple failure, stack failure, cutting failure, folding failure, perforation failure, and application failure in gluing and wrap binding processing in a post-processing process, with sheet physical properties related to each quality item. The sheet physical properties related to each quality item are indicated by circles in FIG. 8A. FIG. 8B illustrates a relationship of individual quality items with various control parameters related to the post-processing. For example, the sheet physical properties related to the quality item of the punch failure are a basis weight, a thickness, and bending strength of the sheet S as illustrated in FIG. 8A. In addition, control parameters related to the quality item of the punch failure are a number of punched sheets and a punch pressing amount as illustrated in FIG. 8B. Therefore, the control parameters of the number of punched sheets and the punch pressing amount in the post-processing process are directly determined from detection data of the basis weight, the thickness, and the bending strength of the sheet S. Similarly, other control parameters are also directly determined from the detection data of sheet physical properties corresponding to the related quality item.

Figure 10A:
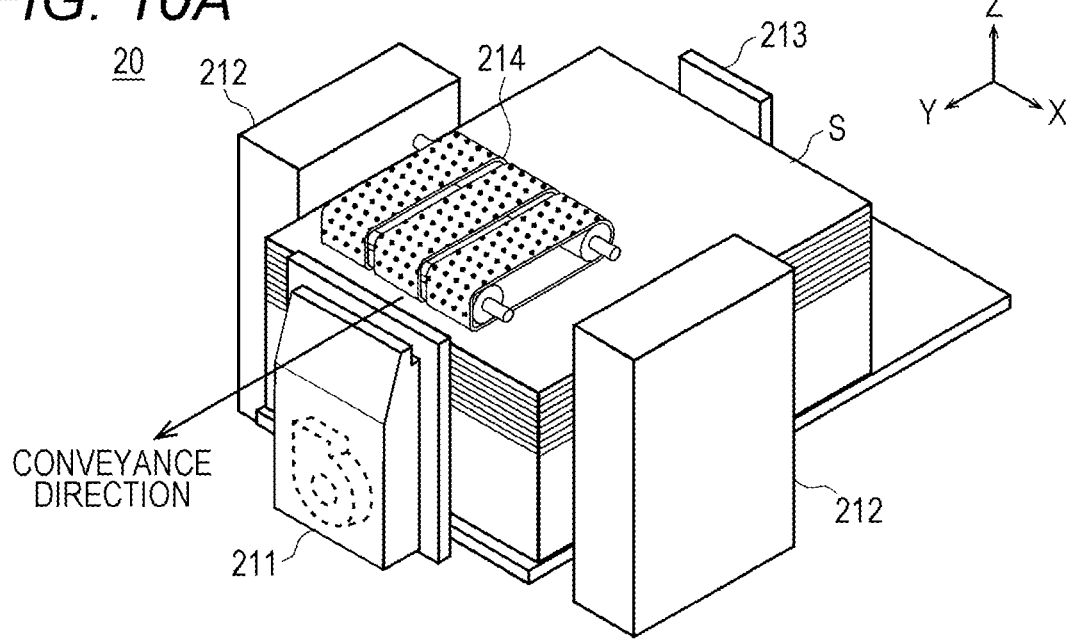
FIG. 10A is a view for explaining a schematic configuration of the sheet feeding processing.
Figure 10B:
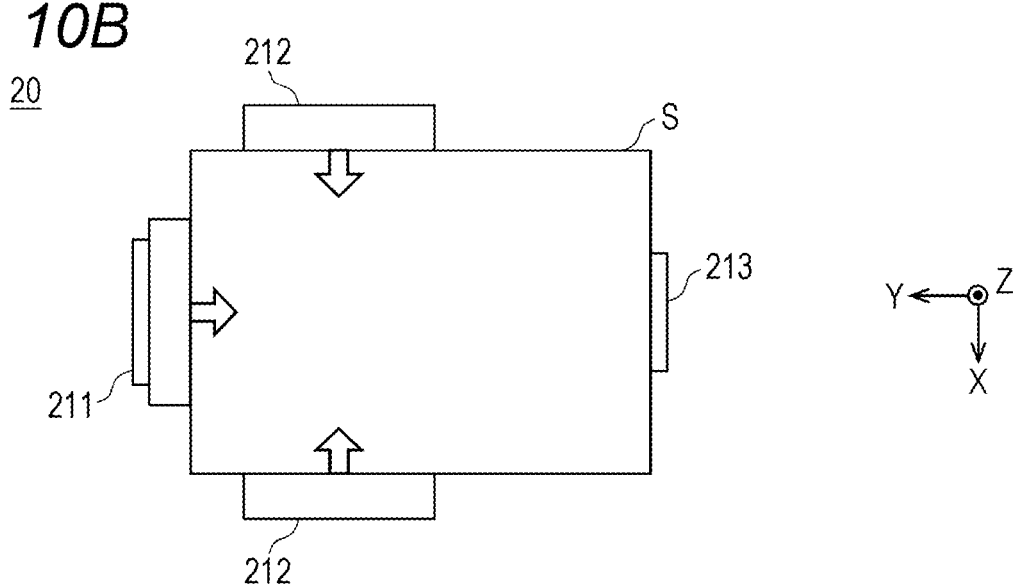
FIG. 10B is a view for explaining a schematic configuration of the sheet feeding processing.
Figure 10C:
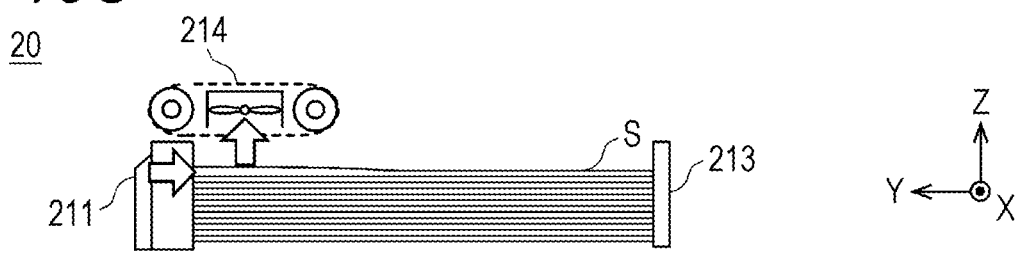
FIG. 10C is a view for explaining a schematic configuration of the sheet feeding processing.

FIG. 9A is a table for explaining a quality item and sheet physical properties related to each quality item in sheet feeding processing. FIG. 9B is a table for explaining parameters related to sheet feeding processing of an air sheet feeding type. FIGS. 10A to 10C are views for explaining a schematic configuration of a sheet feeding apparatus.

FIG. 9A illustrates a relationship of sheet feeding quality in the sheet feeding process with sheet physical properties related to the sheet feeding quality. The sheet physical properties related to the sheet feeding quality are indicated by circles in FIG. 9A. FIG. 9B illustrates a relationship of sheet feeding failure and belt suction failure, which are quality items of sheet feeding quality, with various control parameters related to sheet feeding processing by an air sheet feeding mechanism.

As illustrated in FIGS. 10A to 10C, the sheet feeding apparatus 20 includes: a front end regulating member 211, a side end regulating member 212, and a rear end regulating member 213, to stack and accommodate the sheet S at a predetermined position; and an air suction belt (suction belt) 214 to suction and feed the sheet S in the conveyance direction. The front end regulating member 211 sends front air toward a front end portion in the conveyance direction (Y direction) of the sheet S stacked uppermost. The side end regulating member 212 sends side air toward both side end portions in the conveyance direction (Y direction) of the sheet S stacked uppermost. The air suction belt (suction belt) 214 sends suction air so as to suction the sheet S stacked uppermost toward a stacking direction (Z direction). Hereinafter, an air volume of the front air, an air volume of the side air, and an air volume of the suction air are referred to as a separation air volume, a side air volume, and a suction air volume, respectively. The separation air volume and the side air volume are also referred to as an assist air volume.

For example, the sheet physical properties related to the sheet feeding quality are smoothness, a basis weight, a thickness, glossiness, and bending strength of the sheet S as illustrated in FIG. 9A. Further, the control parameters related to the quality item of the sheet feeding failure are the separation air volume and the side air volume as illustrated in FIG. 9B. Therefore, the control parameters of the separation air volume and the side air volume in the sheet feeding process are directly determined from detection data of the smoothness, the basis weight, the thickness, the glossiness, and the bending strength of the sheet S. Similarly, other control parameters are also directly determined from the detection data of sheet physical properties corresponding to the related quality item. Note that, as a parameter related to sheet feeding, it is also possible to use a parameter related to a pressure (separation roller pressure) of a separation roller that is a roller to come into contact with the sheet S stacked uppermost and convey the sheet S, and an operating speed of the separation roller.

<Outline of Processing in Image Forming Apparatus>

Figure 11:
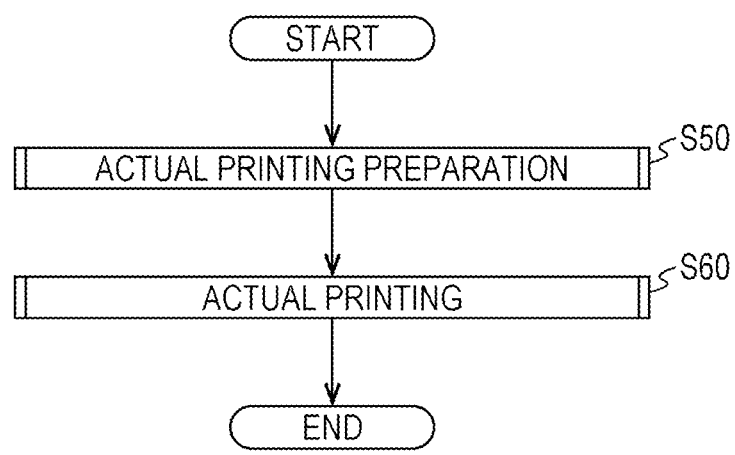
FIG. 11 is a flowchart illustrating printing processing of the image forming apparatus.

FIG. 11 is a flowchart illustrating printing processing of the image forming apparatus. The processing of the image forming apparatus 10 illustrated in the flowchart of FIG. 11 is stored as a program in the storage part 12, and is executed by the control part 11 controlling each part. The same applies to each piece of processing illustrated in each flowchart below.

(Step S50)

The control part 11 executes actual printing preparation processing in response to an instruction or the like from the user. The actual printing preparation processing is processing of setting various control parameters necessary for performing printing, performing trial printing (test printing), and confirming quality of printing. Details of the actual printing preparation processing will be described later.

(Step S60)

Using the control parameter set in the actual printing preparation processing, the control part 11 executes, for example, actual printing processing that is processing of printing a large amount of printed matter, and ends the processing. Details of the actual printing processing will be described later.

<Actual Printing Preparation Processing>

Figure 12:
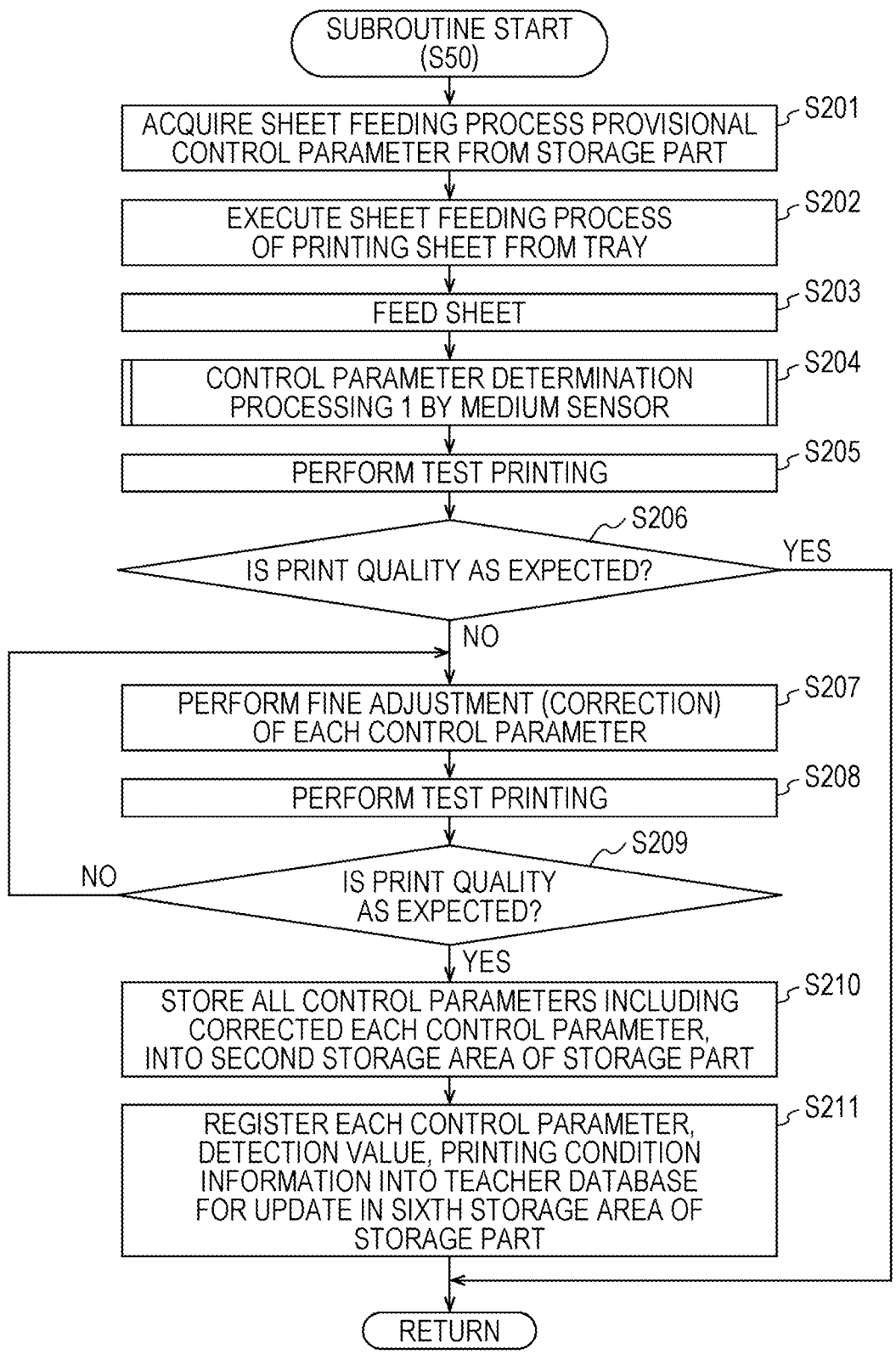
FIG. 12 is a flowchart illustrating actual printing preparation processing.

FIG. 12 is a flowchart illustrating the actual printing preparation processing.

(Step S201)

The control part 11 acquires a provisional control parameter related to the sheet feeding process from the storage part 12.

(Step S202)

The control part 11 controls the sheet feeding conveyance part 14 and the sheet feeding apparatus 20 to execute the sheet feeding process for feeding the sheet S from a tray.

(Step S203)

The control part 11 conveys the sheet S to the medium sensor 80 by executing the sheet feeding process.

(Step S204)

The control part 11 executes control parameter determination processing 1 by the medium sensor 80. The control parameter determination processing 1 is processing of determining an initial control parameter for the sheet S to be used in an operation of a sheet setting in a preparation stage before actual printing. Details of the control parameter determination processing 1 will be described later.

(Step S205)

The control part 11 controls each part by using the control parameter determined in step S204, and executes test printing on the sheet S. The test printing is an operation of confirming quality of final printed matter before entering the actual printing, including front and back positions of the sheet S, an image position with respect to the sheet, and the like, in addition to determined control parameters of imaging conditions.

(Step S206)

The control part 11 receives, from the user, an input regarding whether or not print quality as expected by the user has been achieved. If the print quality is as expected (step S206: YES), the control part 11 ends the actual printing preparation processing. If the print quality is not as expected (step S206: NO), the control part 11 proceeds to the processing of step S207. That is, the processing in step S206 is processing for executing correction of a value of a control parameter when the result of the test printing is not satisfactory.

(Step S207)

The control part 11 receives an instruction of fine adjustment (correction) of each control parameter.

(Step S208)

The control part 11 controls each part by using the control parameter corrected in step S207, and executes test printing on the sheet S again.

(Step S209)

The control part 11 receives again, from the user, an input regarding whether or not print quality as expected by the user has been achieved. If the print quality is not as expected (step S209: NO), the control part 11 returns to the processing of step S207. If the print quality is as expected (step S209: YES), the control part 11 proceeds to the processing of step S210.

(Step S210)

The control part 11 stores all the control parameters including the control parameters corrected in step S207, in the second storage area 122 of the storage part 12.

(Step S211)

The control part 11 registers each of the control parameters, the detection data, and the printing condition information into a teacher database for update in the sixth storage area 126 of the storage part 12 in association with each other, and ends the actual printing preparation processing.

<Control Parameter Determination Processing 1>

Figure 13A:
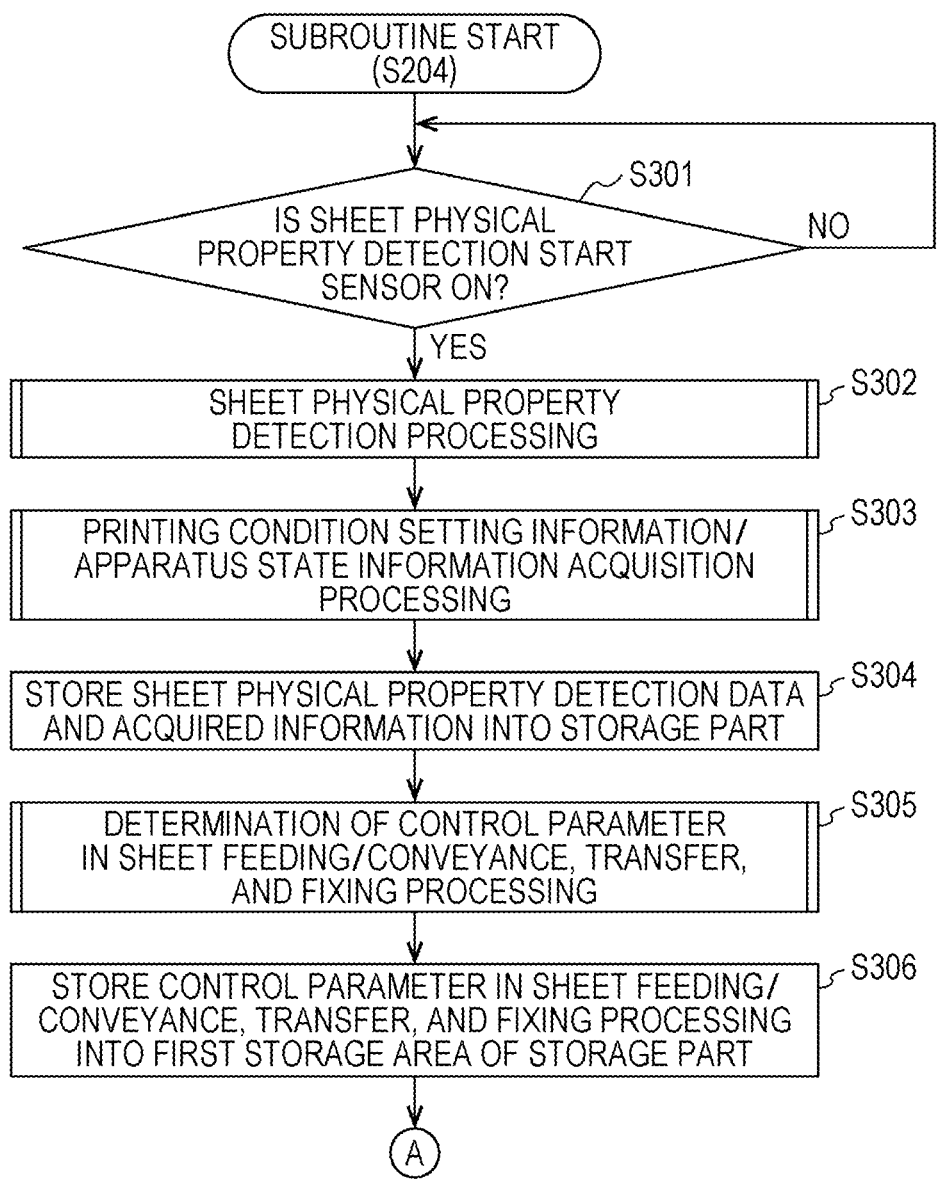
FIG. 13A is a flowchart illustrating control parameter determination processing.

FIGS. 13A and 13B are flowcharts illustrating the control parameter determination processing 1.

(Step S301)

When a sheet feeding tray to be used for printing is selected, the sheet S loaded in the sheet feeding tray is conveyed. If a sheet sensor to start detection processing of a sheet physical property is OFF (step S301: NO), the control part 11 waits until the sheet sensor is turned ON. When the sheet sensor is turned ON (step S301: YES), the processing proceeds to step S302.

(Step S302)

The control part 11 detects a sheet physical property value of the sheet S by each sheet physical property sensor on the sheet feeding/conveyance path. Details of the processing in step S302 will be described later.

(Step S303)

The control part 11 acquires printing condition setting information (double-sided/single-sided printing, color printing/single-color printing, a sheet width, and the like) and apparatus state information (machine environmental information including a temperature, a humidity, a standby time, and the like). Details of the processing in step S303 will be described later.

(Step S304)

The control part 11 stores, in the storage part 12, detection data of the sheet physical properties acquired in the processing of step S302 and various types of information acquired in the processing of step S303.

(Step S305)

The control part 11 determines various control parameters in individual processes of sheet feeding/conveyance, transfer, and fixing of the sheet S. Details of the processing in step S305 will be described later.

(Step S306)

The control part 11 stores the various control parameters determined in the processing of step S305, in the first storage area 121 of the storage part 12.

(Step S307)

The control part 11 determines whether or not the post-processing apparatus 30 is connected to the image forming apparatus 10. If the post-processing apparatus 30 is connected (step S307: YES), the control part 11 proceeds to the processing of step S308. If the post-processing apparatus 30 is not connected (step S307: NO), the control part 11 ends the processing of step S204 and proceeds to the processing of step S205 in FIG. 12.

(Step S308)

The control part 11 checks a type of the connected post-processing apparatus 30.

(Step S309)

The control part 11 reads and acquires related detection data of sheet physical properties from the storage part 12 in accordance with the type (function) of the connected post-processing apparatus 30.

(Step S310)

The control part 11 executes control parameter determination processing according to the function of the connected post-processing apparatus 30. Details of the processing in step S310 will be described later.
(Step S311)
The control part 11 stores the control parameters of the post-processing apparatus determined in the processing of step S310 into the first storage area 121 of the storage part 12, and ends the control parameter determination processing 1.

<Sheet Physical Property Detection Processing>

Figure 14:
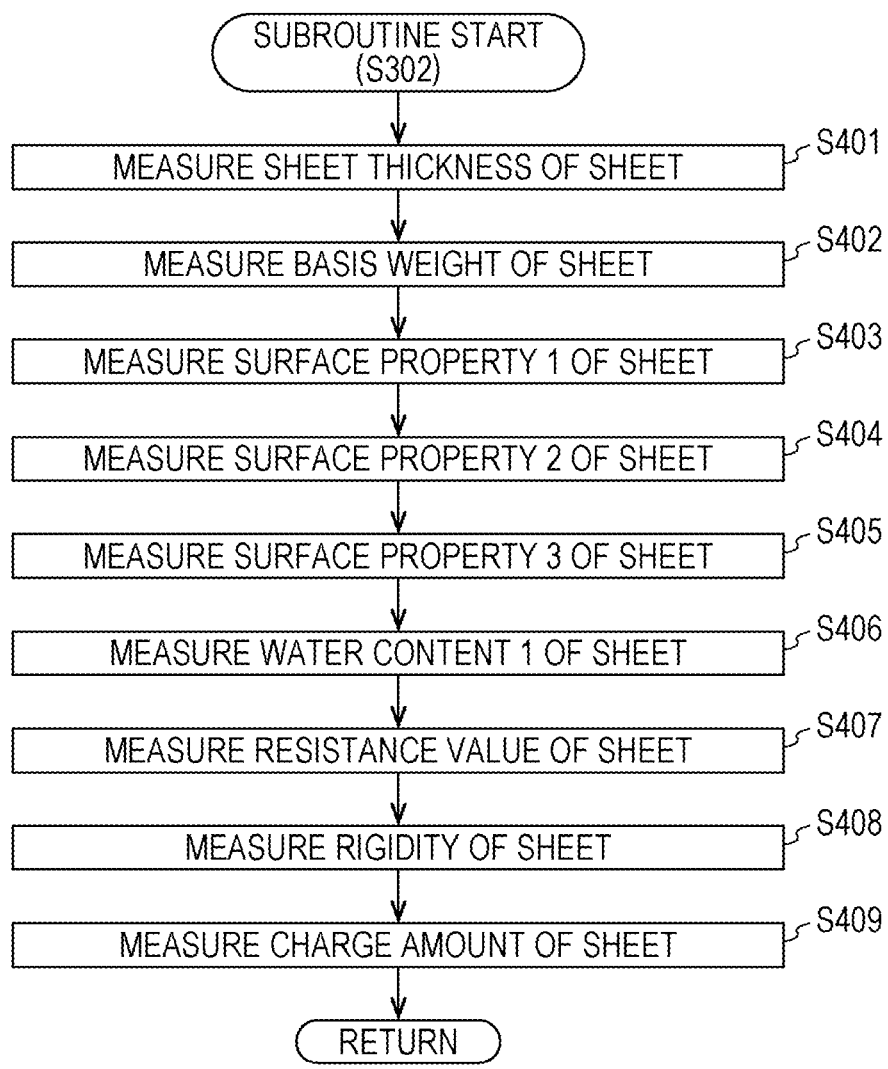
FIG. 14 is a flowchart illustrating sheet physical property detection processing.

FIG. 14 is a flowchart illustrating sheet physical property detection processing.
(Step S401)
The control part 11 controls the medium sensor 80 to measure a sheet thickness of the sheet S, and acquires a measurement result as detection data.
(Step S402)
The control part 11 controls the medium sensor 80 to measure a basis weight of the sheet S, and acquires a measurement result as detection data.
(Step S403)
The control part 11 controls the medium sensor 80 to measure a surface property 1 (smoothness) of the sheet S, and acquires a measurement result as detection data.
(Step S404)
The control part 11 controls the medium sensor 80 to measure a surface property 2 (glossiness) of the sheet S, and acquires a measurement result as detection data.
(Step S405)
The control part 11 controls the medium sensor 80 to measure a surface property 3 (concave depth) of the sheet S, and acquires a measurement result as detection data.
(Step S406)
The control part 11 controls the medium sensor 80 to measure a water content 1 of the sheet S, and acquires a measurement result as detection data.
(Step S407)
The control part 11 controls the medium sensor 80 to measure a resistance value of the sheet S, and acquires a measurement result as detection data.
(Step S408)
The control part 11 controls the medium sensor 80 to measure rigidity of the sheet S, and acquires a measurement result as detection data.
(Step S409)
The control part 11 controls the medium sensor 80 to measure a charge amount of the sheet S, and acquires a measurement result as detection data.

<Printing Condition Setting Information/Apparatus State Information Acquisition Processing>

Figure 15:
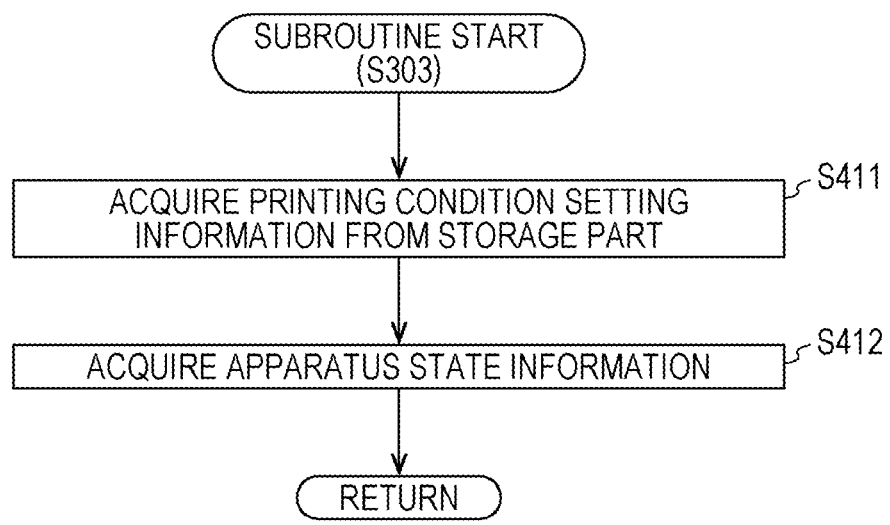
FIG. 15 is a flowchart illustrating printing condition setting information/apparatus state information acquisition processing.

FIG. 15 is a flowchart illustrating printing condition setting information/apparatus state information acquisition processing.
(Step S411)
The control part 11 reads and acquires printing condition setting information such as a printing mode and a sheet width, from the fifth storage area 125 of the storage part 12.
(Step S412)
The control part 11 acquires apparatus state information such as an internal temperature, an internal humidity, a total number of printed sheets (durability information), and a standby time, from a temperature sensor, a humidity sensor, a timer, and the like.

<Details of Control Parameter Determination Processing>

Figure 16:
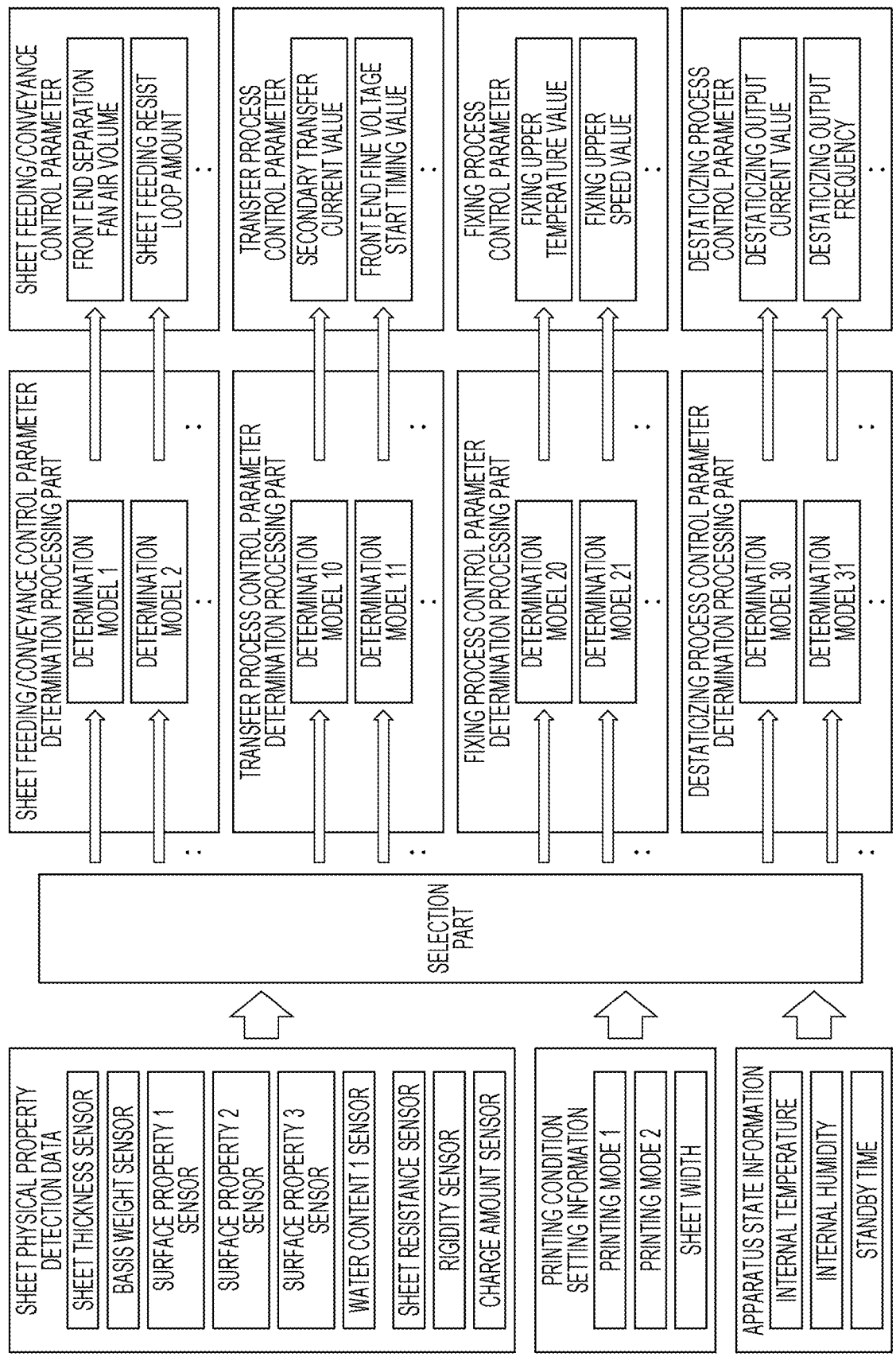
FIG. 16 is a view for explaining processing of determining an initial control parameter at a time of a sheet setting.

FIG. 16 is a view for explaining processing (parameter determination processing 1) of determining an initial control parameter at a time of a sheet setting.

As illustrated in FIG. 16, as a selection part, the control part 11 selects information regarding each process from detection data of sheet physical properties, printing condition setting information, and apparatus state information. Each piece of information is information newly detected or updated when this processing is executed.

As a sheet feeding/conveyance process control parameter determination processing part, the control part 11 uses the selected information, determination models 1 and 2, and the like, to determine various parameters related to the sheet feeding/conveyance process, such as a separation air volume value and a sheet feeding resist loop amount.

As a transfer process control parameter determination processing part, the control part 11 uses the selected information, determination models 10 and 11, and the like, to determine various parameters related to the transfer process, such as a secondary transfer current value and a front end fine voltage start timing value.

As a fixing process control parameter determination processing part, the control part 11 uses the selected information, determination models 20 and 21, and the like, to determine various parameters related to the fixing process, such as a fixing upper temperature value and a fixing upper speed value.

As a destaticizing process control parameter determination processing part, the control part 11 uses the selected information, determination models 30 and 31, and the like, to determine various parameters related to the destaticizing process, such as a destaticizing output current value and a destaticizing output frequency.

Next, for convenience of description, description will be given to control parameter determination processing (parameter determination processing 2 and 3) at a time of actual printing to be described later.

Figure 17:
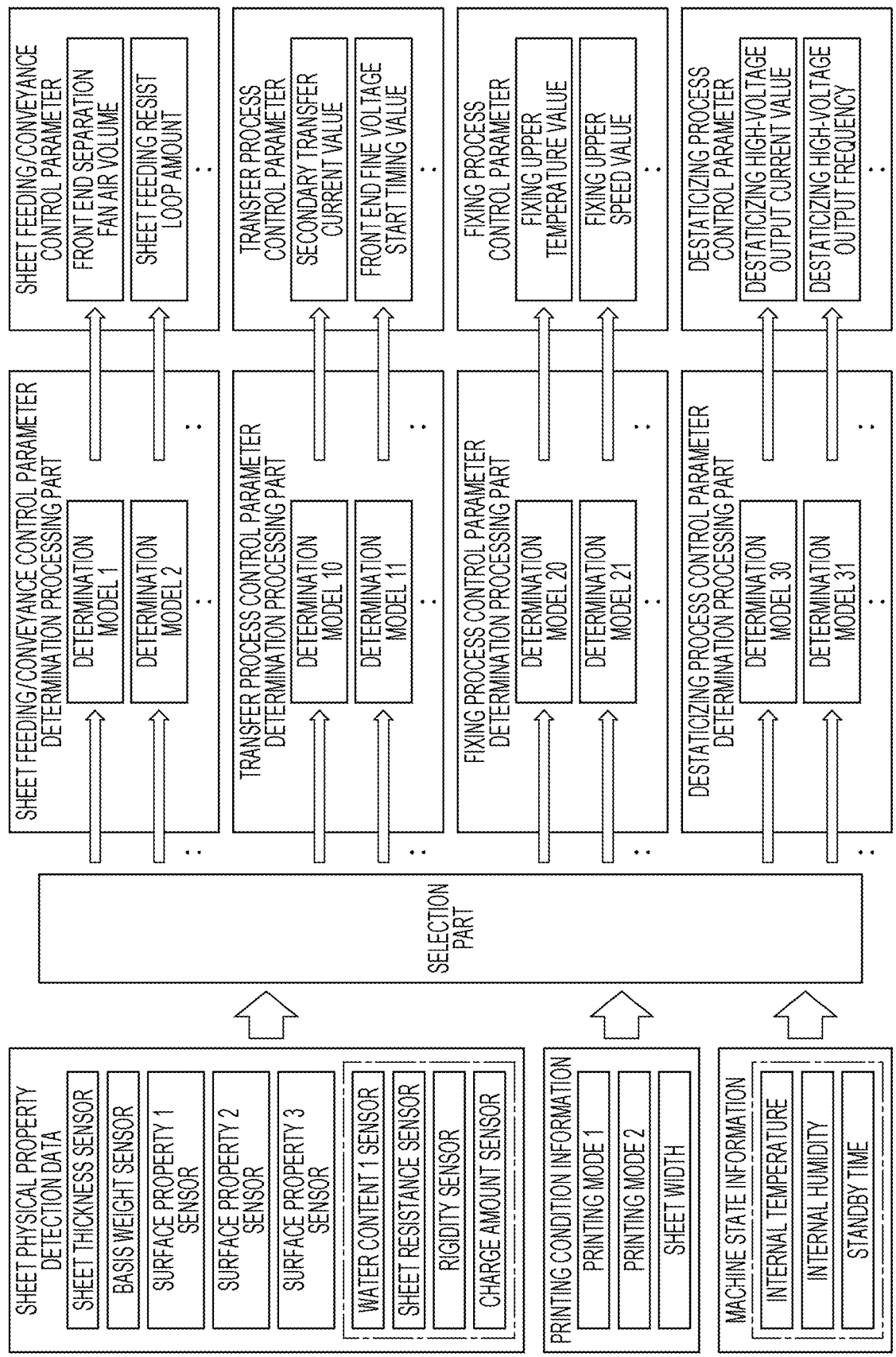
FIG. 17 is a view for explaining processing of determining a control parameter by using a sheet physical property value detected for each sheet at a time of actual printing.

FIG. 17 is a diagram for explaining processing of determining a control parameter using a sheet physical property value detected for each sheet at a time of actual printing.

As illustrated in FIG. 17, as a selection part, the control part 11 selects information regarding each process from detection data of sheet physical properties, printing condition setting information, and apparatus state information. Here, among the individual pieces of information, information surrounded by a broken line may be regarded as information newly detected or updated when this processing is executed, and other information may be regarded as information already acquired and stored in the storage part 12. Information that changes before and after execution of the fixing processing or changes depending on an internal temperature may be newly detected or updated, and information at a time of a sheet setting may be used as it is as information that does not change.

Similarly to the processing in FIG. 16, the control part 11 uses the selected information and corresponding determination models, to determine control parameters in individual processes, such as the sheet feeding/conveyance process, the transfer process, the fixing process, and the destaticizing process.

Next, control parameter determination processing of the post-processing apparatus will be described.

Figure 18:
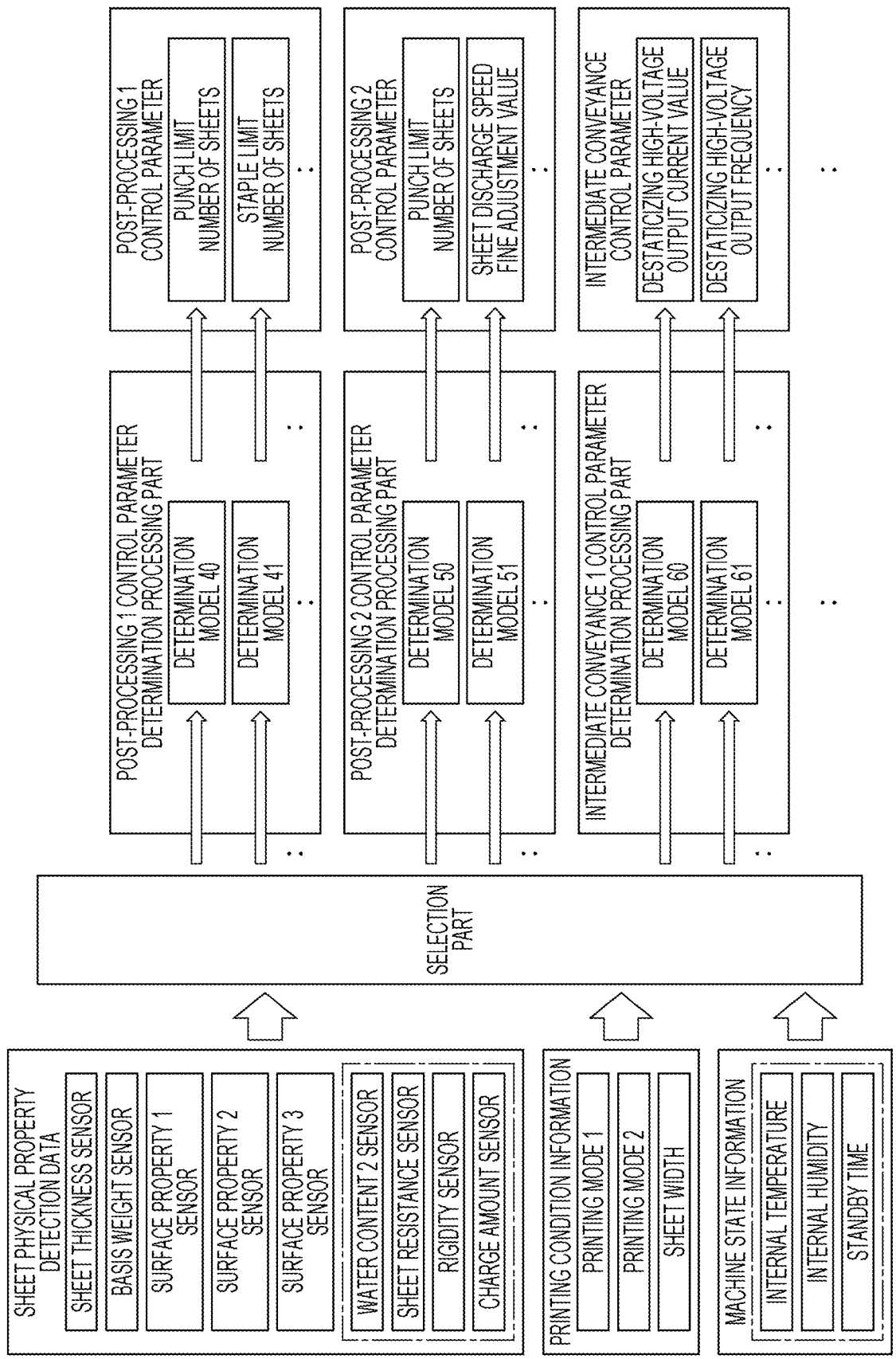
FIG. 18 is a view for explaining processing of determining a control parameter related to post-processing.

FIG. 18 is a view for explaining processing of determining a control parameter related to post-processing.

As illustrated in FIG. 18, as a selection part, the control part 11 selects information regarding each process from detection data of sheet physical properties, printing condition setting information, and apparatus state information. Here, among the individual pieces of information, information surrounded by a broken line may be regarded as information newly detected or updated when this processing is executed, and other information may be regarded as information already acquired and stored in the storage part 12.

As a post-processing 1 control parameter determination processing part, the control part 11 uses the selected information, determination models 40 and 41, and the like, to determine various parameters related to post-processing 1, such as a punch limit number of sheets and a staple limit number of sheets.

As a post-processing 2 control parameter determination processing part, the control part 11 uses the selected information, determination models 50 and 51, and the like to determine various parameters related to post-processing 2, such as a punch limit number of sheets and a sheet discharge speed fine adjustment value.

As a post-processing 3 control parameter determination processing part, the control part 11 uses the selected information, determination models 60 and 61, and the like, to determine various parameters related to post-processing 3, such as a destaticizing high-voltage output current value and a destaticizing high-voltage output frequency.

<Creation of Determination Model>

The creation method for the determination model described above will be described in detail below. Hereinafter, a description is given to, as an example, a case where an algorithm obtained by machine learning is used as the determination model.

In the present embodiment, in order to determine a control parameter, a model for determining (predicting) the control parameter by using teacher data is created by machine learning. In the present embodiment, an algorithm of a determination model (prediction model) is created using gradient boosting modeling (GBM), which is one of machine learning methods.

The GBM described above is a model creation method of further performing weak learning on an error outputted as a result of model creation, to increase prediction accuracy. Therefore, the accuracy of the value of the control parameter obtained as prediction by the model can be further improved.

Specifically, a database (DB) to be used as teacher data is prepared, and a determination model algorithm file by the GBM is created in advance (default determination model algorithm). A file format is created as a binary format. Note that the file format may be created as another format, for example, may be created as a PMML format generally used for conversion from a determination model to a determination model algorithm.

FIG. 19 is a view illustrating an example of a teacher data database. FIG. 20 is a view illustrating an example of a coefficient table.

As illustrated in FIG. 19, a teacher data database is created for each control parameter. Therefore, the database is provided for an amount of the control parameters to be determined. In each database, a sheet name, a detection value (detection data) of a sensor that has read each sheet physical property for each sheet, or a physical property value computed from the detection value, and an appropriate control parameter value obtained by an experiment or the like are recorded.

Here, in creating the determination model, a file capacity of the determination model algorithm can be reduced or a processing time can be minimized by obtaining a degree of contribution of a factor (the detection value or the computation value of each sensor) to be inputted, and deleting an input factor having a small influence on prediction accuracy. Furthermore, the predicted value can be appropriately corrected by appropriately weighting a value of the input factor.

Therefore, for example, a coefficient table as illustrated in FIG. 20 is provided, and each input factor is multiplied by a weighting coefficient such as 0 to 2. For example, "0" indicates that the input factor is to be deleted. "1" indicates that the value of the input factor is to be used as it is. A value larger than 1, such as "2", indicates that weighting is performed to increase the influence of the value of the input factor. A value smaller than 1, such as "0.5", indicates that weighting is performed to reduce the influence of the value of the input factor. Performing weighting in this manner makes it possible to give priority to each value related to the plurality of types of sheet physical properties, and the control part 11 can determine various control parameters on the basis of the priority. Note that this weighting can be used by setting different values for each of the processing of determining various parameters (second processing) and the processing of specifying the sheet type (first processing).

Figure 21:
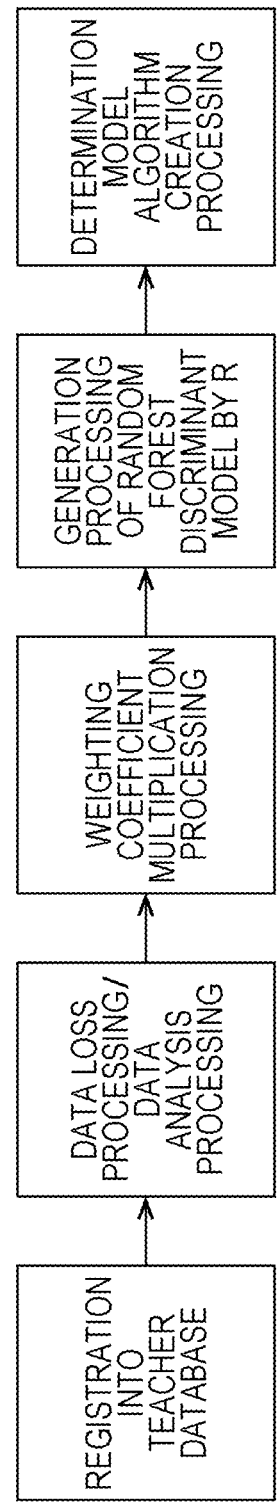
FIG. 21 is a view for explaining generation processing of a control parameter determination model algorithm.

FIG. 21 is a view for explaining creation processing of a control parameter determination model algorithm.

The processing illustrated in FIG. 21 is processing for creating the above-described default determination model algorithm, and can be executed by operating R on Linux (registered trademark) by using a CPU in which a Linux (registered trademark) OS is installed, for example. Note that various types of processing may be executed using Python instead of R.

As illustrated in FIG. 21, teacher data is registered in a database, data loss processing and data analysis processing are performed, and then multiplication processing of a weighting coefficient is performed on each piece of data. Thereafter, generation processing of a random forest discriminant model by R is executed, and a determination model algorithm is created. When the control parameter can be computed by a statistical method such as a multiple regression equation depending on the type of the control parameter, the control parameter may be determined by the statistical method such as the multiple regression equation. In this manner, the determination method by machine learning and the determination method by a statistical method may be used in combination.

Figure 22:
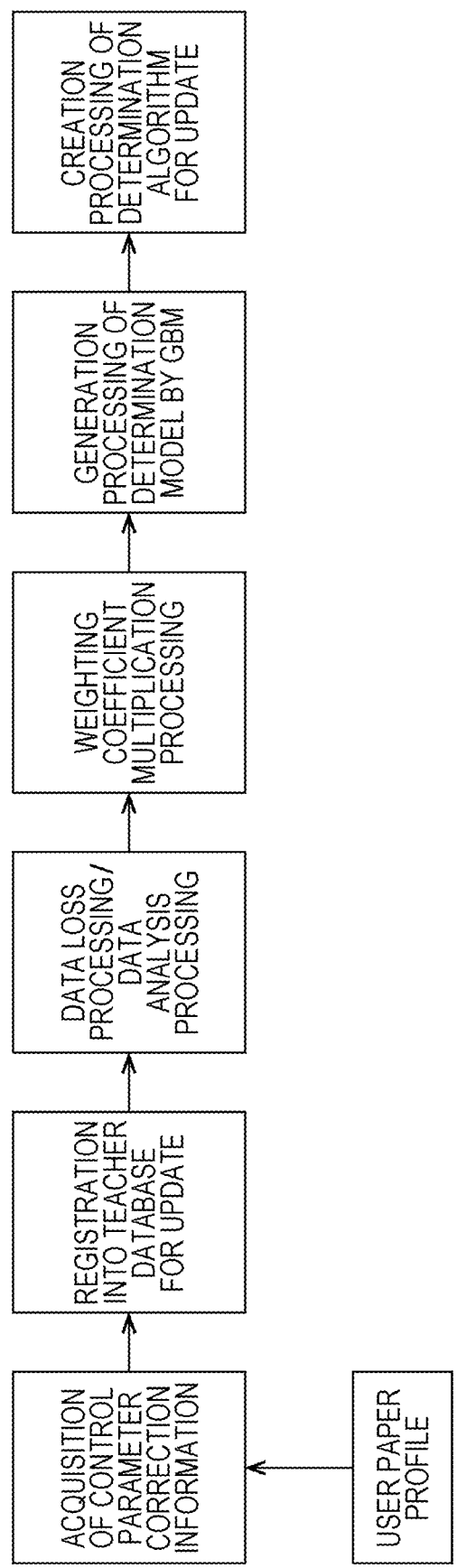
FIG. 22 is a view for explaining generation processing of a determination model algorithm for update.

FIG. 22 is a view for explaining creation processing of a determination model algorithm for update.

The processing illustrated in FIG. 22 is processing for providing a teacher database in the image forming apparatus 10, adding corrected information to the teacher database when a user (operator) corrects a control parameter, and continuously updating the determination model algorithm file. This makes it possible to determine a control parameter more suitable for output quality preferred by the user. Note that it is also possible to return the updated determination model algorithm file to a previous version or a default state.

As illustrated in FIG. 22, control parameter correction information is acquired, which is information regarding a control parameter corrected by an input to the operation panel 15 from the user or the like. The control parameter correction information is registered in the teacher database for update, the data loss processing and the data analysis processing are performed, and then the multiplication processing of the weighting coefficient is performed on each piece of data. Thereafter, generation processing of the determination model by the GBM is executed, and a determination model algorithm for update is created.

Figure 23:
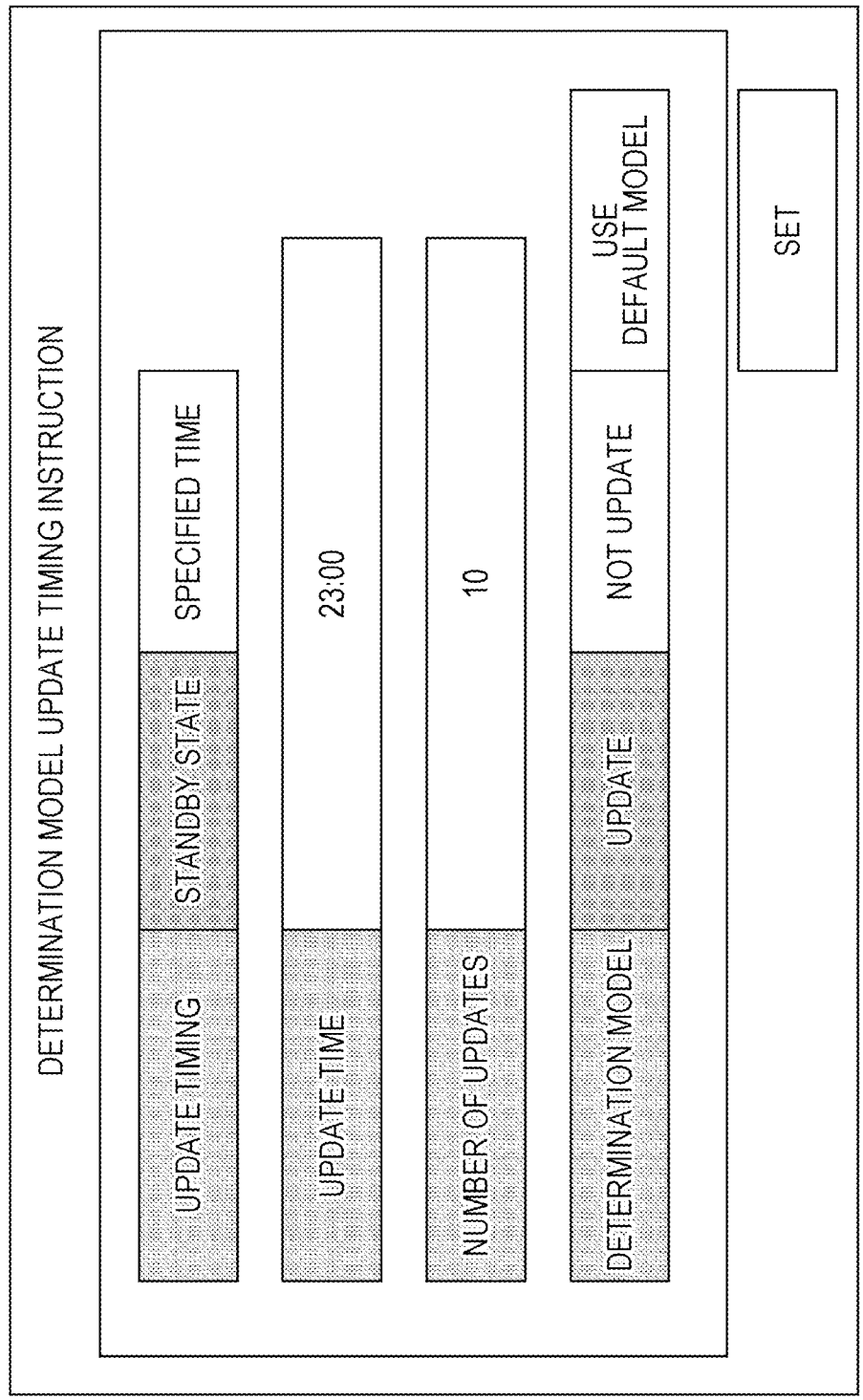
FIG. 23 is an example of a screen to receive a setting of an execution condition for updating the determination model algorithm.

FIG. 23 is an example of a screen to receive a setting of an execution condition for updating the determination model algorithm.

The image forming apparatus 10 displays, for example, a screen as illustrated in FIG. 23 on the operation panel 15, and receives, from the user, a setting of an execution condition for updating the determination model algorithm.

On the screen in FIG. 23, the user can select a "standby state" or a "specified time" for an update timing as an execution condition, by operating a touch panel button. When the "specified time" is selected as the update timing, the user presses up and down buttons of "Δ" and "∇" of the touch panel button or uses a numerical key, a soft key, or the like (not illustrated), to specify an update time (time when the update is performed). As the update time, a day of the week, a date, or the like may be set in addition to the time. Alternatively, an elapsed time from the previous update may be set as the update time. In addition, the user can set a number of times of processing related to a number of updates N1 of the teacher data, which is an execution condition, by the same setting method as the setting of the update time. In the example of FIG. 23, a predetermined number of times is set to 10, and when 10 sets of new teacher data are added, the execution condition regarding the number of updates of the teacher data is satisfied. Further, by selecting a button in a determination model field on the screen of FIG. 23, the user can specify whether or not to update the determination model algorithm or to select a previous version such as the default determination model algorithm or the like.

Note that the creation processing of the determination model algorithm described above may be executed by machine learning using a neural network such as deep learning.

Figure 24:
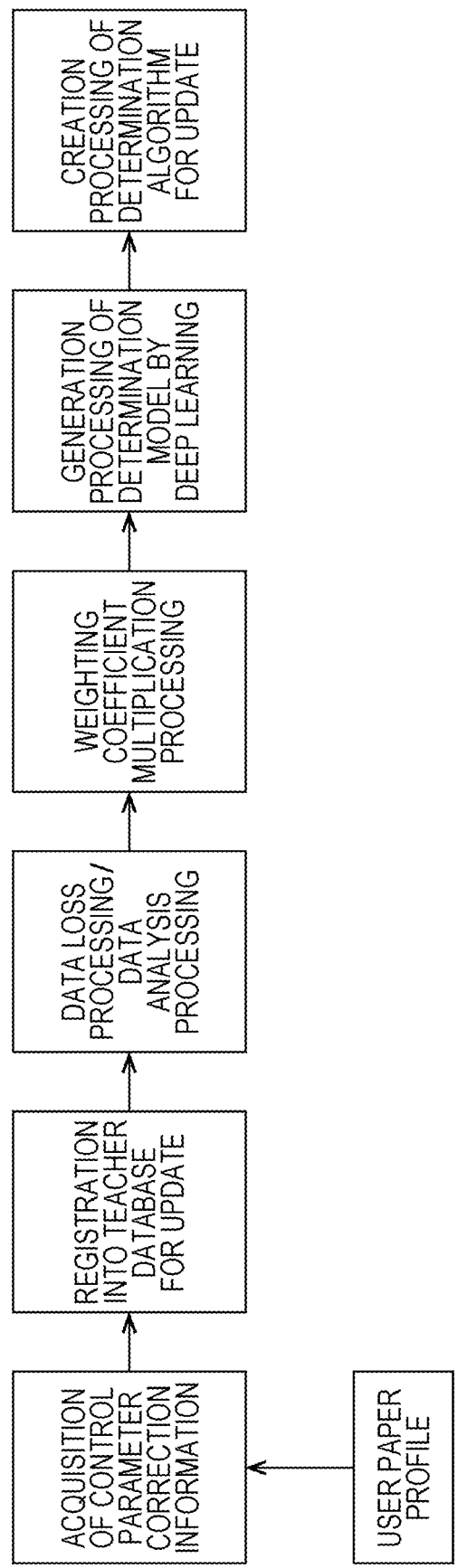
FIG. 24 is a view for explaining another example of generation processing of the determination model algorithm for update.

FIG. 24 is a view for explaining another example of creation processing of the determination model algorithm for update.

As illustrated in FIG. 24, control parameter correction information is acquired, which is information regarding a control parameter corrected by an input to the operation panel 15 from the user or the like. The control parameter correction information is registered in the teacher database for update, the data loss processing and the data analysis processing are performed, and then the multiplication processing of the weighting coefficient is performed on each piece of data. Thereafter, generation processing of the determination model by deep learning is executed, and a determination model algorithm for update is created.

<Display for User>

The information determined by the control parameter determination processing as described above is displayed on a screen, for example, to be provided to the user.

Figure 25:
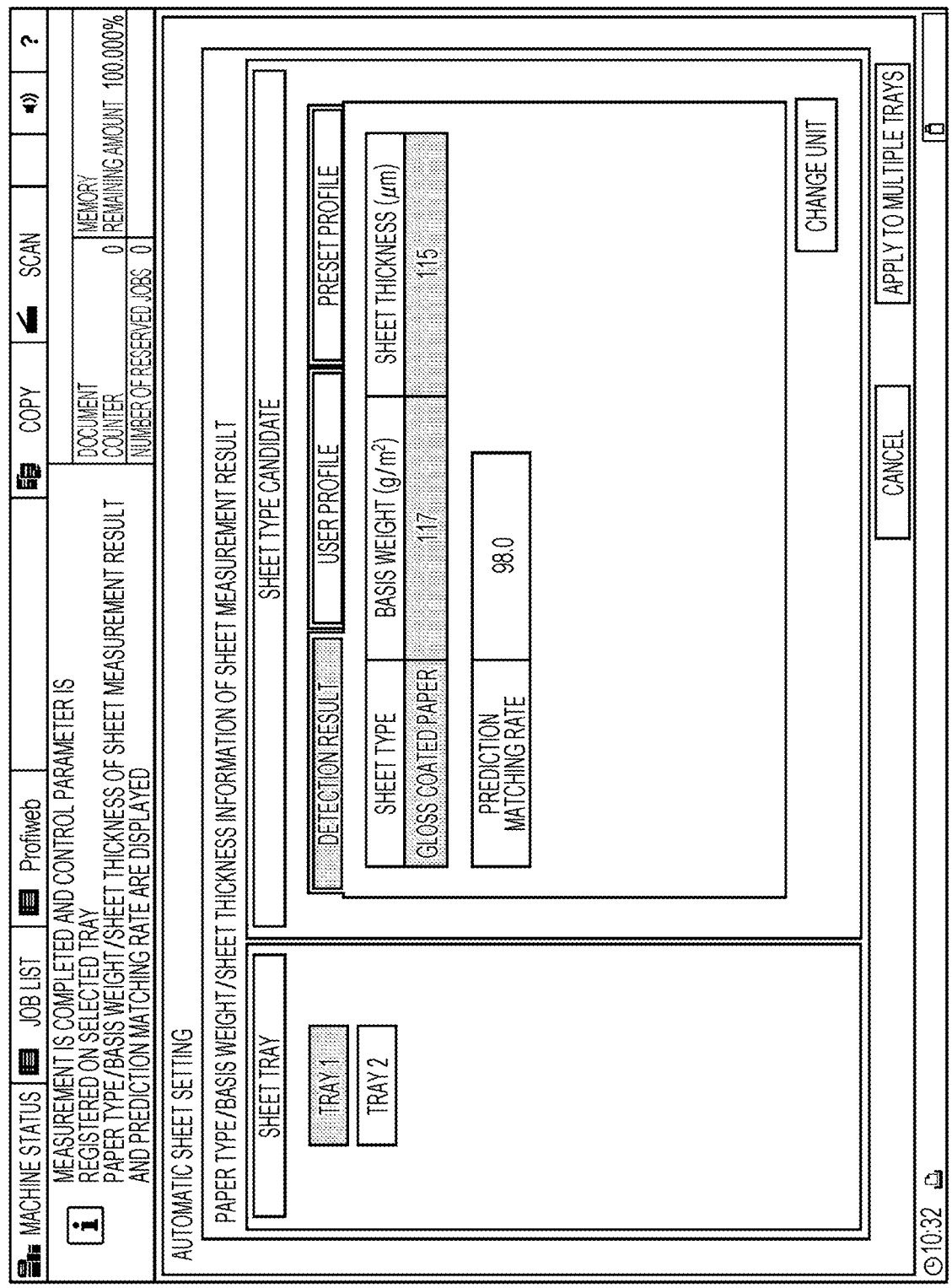
FIG. 25 is an example of a screen indicating information regarding a specified sheet type.

FIG. 25 is an example of a screen indicating information regarding a specified sheet type.

As illustrated in FIG. 25, information regarding the specified sheet type is displayed on the operation panel 15 as, for example, an automatic sheet setting screen. In accordance with a conventional display method, the screen of FIG. 25 displays a specified paper type, a basis weight value, and a sheet thickness, and displays a prediction matching rate. This allows the user to confirm a result of the determination processing of the control parameter as the familiar sheet type and the matching rate, and obtain a sense of security for the automatic determination processing.

FIG. 26 is an example of an operation screen to display a determined control parameter and to receive an instruction to change the control parameter from a user.

As illustrated in FIG. 26, value of control parameters automatically determined by the control parameter determination processing are displayed on the operation panel 15, in an expert adjustment screen for a sheet setting, for example. The values of the various control parameters automatically determined by the control parameter determination processing are displayed on the screen of FIG. 26, and the user can confirm the determined control parameters or make a change as necessary. In the example of FIG. 26, control parameters of the transfer process and values before correction are displayed. The user can change the control parameters, for example, by inputting a correction value of a predetermined step such as "+2". In addition, for example, by pressing an up/down key or the like, control parameters of other processes such as the sheet feeding process other than the transfer process are displayed, and a change by the user can be received.

<Actual Printing Processing>

Figure 27:
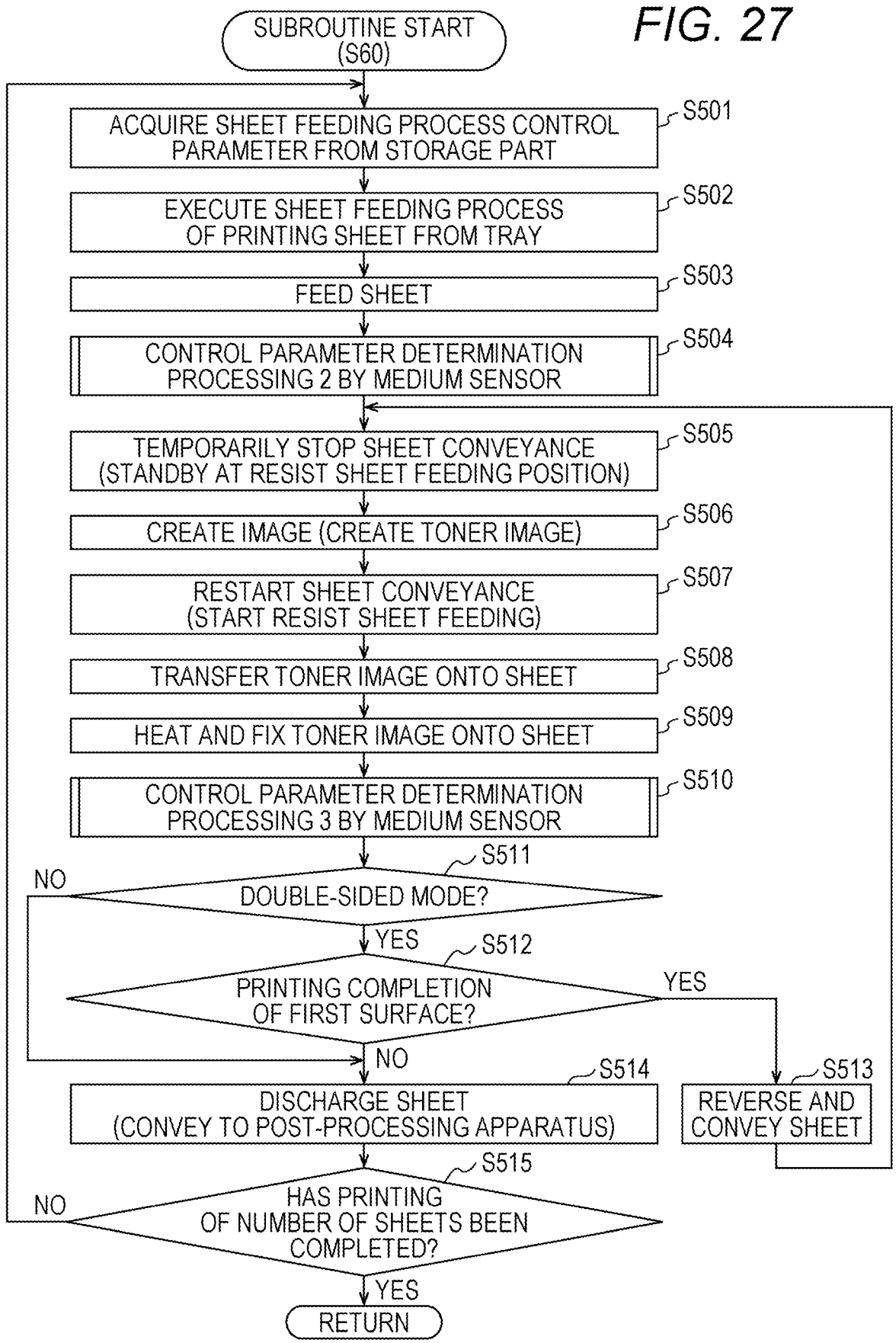
FIG. 27 is a flowchart illustrating actual printing processing.

FIG. 27 is a flowchart illustrating actual printing processing.

(Step S501)

The control part 11 acquires a control parameter related to the sheet feeding process from the storage part 12. Except for the control parameter related to the sheet feeding process, a value of a control parameter determined each time of the printing processing is used. As the control parameter related to the sheet feeding process, a value determined in previous printing processing is used. When the same type of sheet is fed from a tray, the value of the control parameter does not greatly change, and thus there is no problem in the sheet feeding quality.

(Step S502)

The control part 11 controls the sheet feeding conveyance part 14 and the sheet feeding apparatus 20 to execute the sheet feeding process for feeding the sheet S from a tray.

(Step S503)

The control part 11 conveys the sheet S to the medium sensor 80 by executing the sheet feeding process.

(Step S504)

The control part 11 executes control parameter determination processing 2 by the medium sensor 80. Details of the control parameter determination processing 2 will be described later.

(Step S505)

The control part 11 temporarily stops conveyance of the sheet S and stands by at a resist sheet feeding position.

(Step S506)

The control part 11 controls the image forming part 13 to start image creation (toner image creation).

(Step S507)

The control part 11 restarts the conveyance of the sheet S and starts resist sheet feeding.

(Step S508)

The control part 11 controls the image forming part 13 to transfer the toner image onto the sheet S.

(Step S509)

The control part 11 controls the image forming part 13 to heat and fix the toner image onto the sheet S.

(Step S510)

The control part 11 executes control parameter determination processing 3 by the medium sensor 80. Details of the control parameter determination processing 3 will be described later.

(Step S511)

The control part 11 determines whether or not printing is in the double-sided mode. If the printing is not in the double-sided mode (step S511: NO), the control part 11 proceeds to the processing of step S514. If the printing is in the double-sided mode (step S511: YES), the control part 11 proceeds to the processing of step S512.

(Step S512)

The control part 11 determines whether or not to be printing completion of a first surface (front surface). In a case of not the printing completion of the first surface, that is, if the printing up to a second surface is completed (step S512: NO), the control part 11 proceeds to the processing of step S514. In a case of the printing completion of the first surface (step S512: YES), the control part 11 proceeds to the processing of step S513.

(Step S513)

The control part 11 controls a sheet reversing mechanism of the sheet feeding conveyance part 14 to convey the sheet S to the conveyance path 144 for double-sided image formation, reverses the sheet S by a switchback path, and returns to the processing of step S505.

(Step S514)

The control part 11 discharges the sheet S on which image formation has been completed, and conveys the sheet S to the post-processing apparatus 30.

(Step S515)

The control part 11 determines whether or not printing of a predetermined number of sheets has been completed, returns to the processing of step S501 if the processing has not been completed (step S 515: NO), and ends the actual printing processing if the processing has been completed (step S515: YES).

In the above processing, when the control parameter is corrected in the actual printing preparation processing before the actual printing, the printing processing may be executed using the corrected value of the control parameter without using the value of the control parameter obtained during printing. This can provide print quality more suitable for user's preference. Furthermore, in order to reduce a processing time, a control parameter automatic determination operation during printing may be stopped, and a control parameter determined in advance may be used as a fixed value. In addition, during printing, the printing processing may be executed using control parameter values automatically determined during printing, except for the corrected control parameter values. This can provide print quality suitable for user's preference while using a value of an appropriate control parameter for the sheet. Details of processing of these will be described later as Modifications 1 and 2 of the actual printing processing.

<Control Parameter Determination Processing 2 and 3>

Figure 28A:
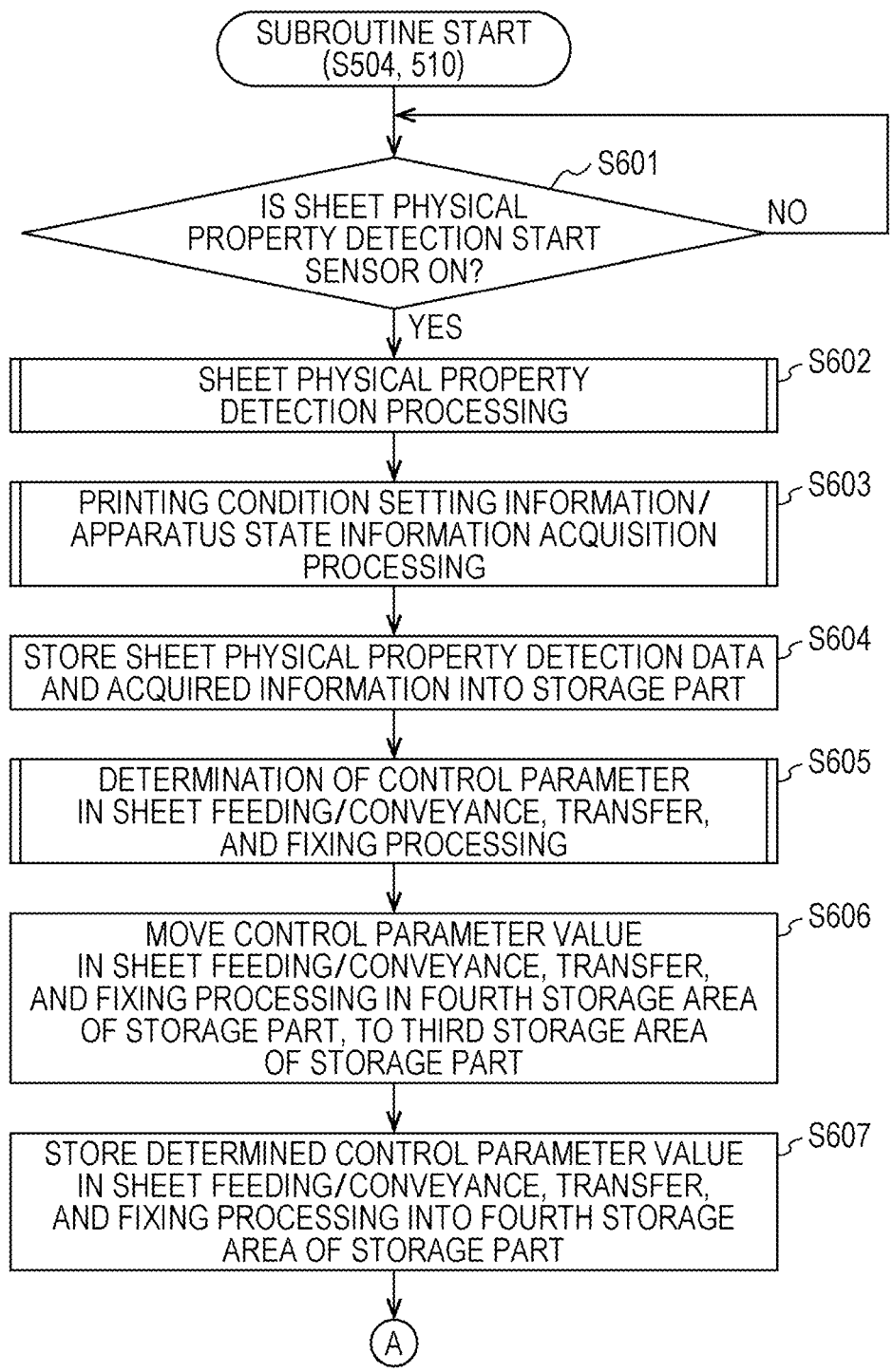
FIG. 28A is a flowchart illustrating control parameter determination processing.
Figure 28B:
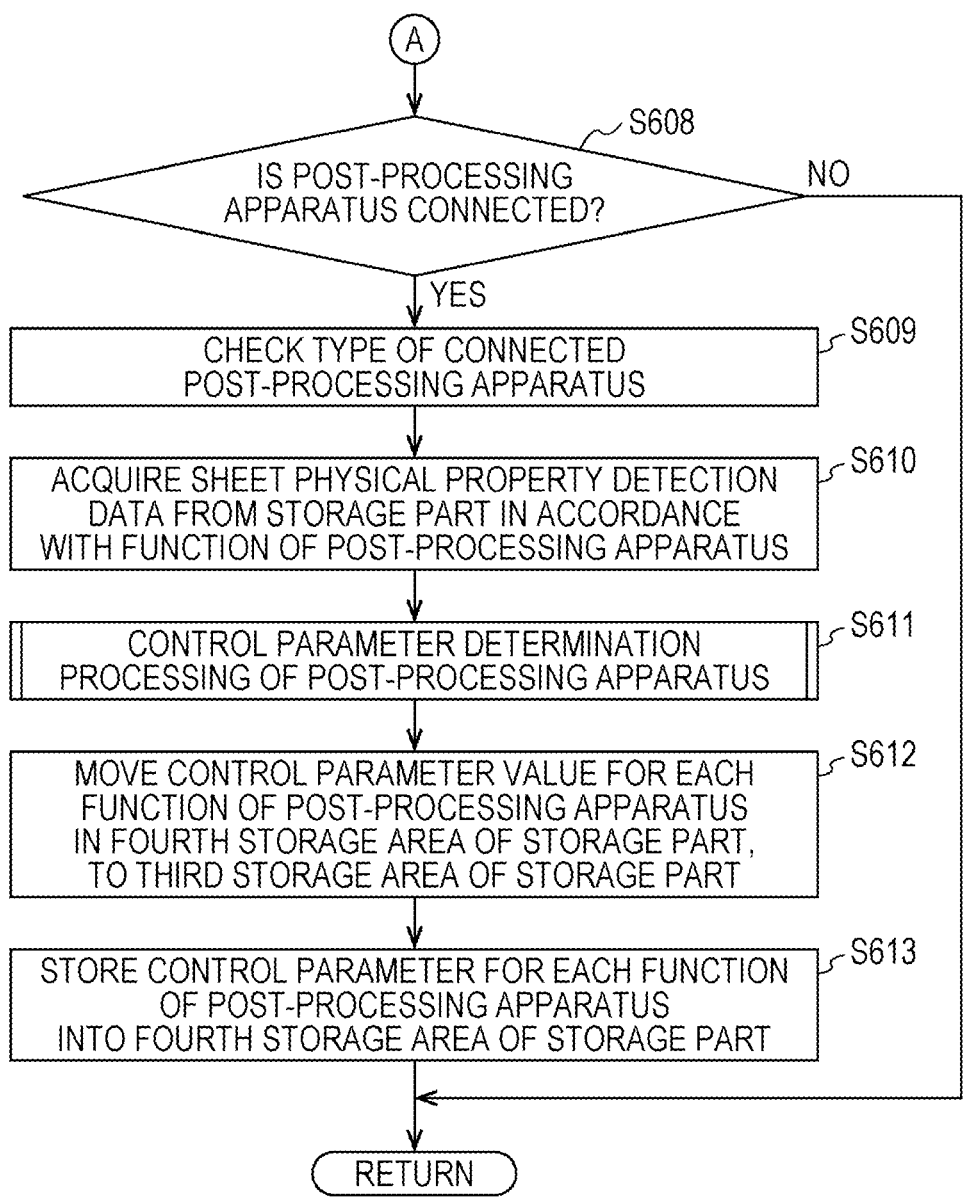
FIG. 28B is a flowchart following FIG. 28A.

FIGS. 28A and 28B are flowcharts illustrating control parameter determination processing 2 and 3.

(Step S601)

If a sheet sensor to start detection processing of a sheet physical property is OFF (step S601: NO), the control part 11 stands by until the sheet sensor is turned ON. When the sheet sensor is turned ON (step S601: YES), the processing proceeds to step S602.

(Step S602)

The control part 11 detects a sheet physical property value of the sheet S by each sheet physical property sensor on the sheet feeding/conveyance path. The processing of step S602 is similar to the processing of step S302 illustrated in FIG. 13A.

(Step S603)

The control part 11 acquires printing condition setting information (double-sided/single-sided printing, color printing/single-color printing, a sheet width, and the like) and apparatus state information (machine environmental information including a temperature, a humidity, a standby time, and the like). The processing of step S603 is similar to the processing of step S303 illustrated in FIG. 13A.

(Step S604)

The control part 11 stores, in the storage part 12, detection data of the sheet physical properties acquired in the processing of step S602 and various types of information acquired in the processing of step S603.

(Step S605)

The control part 11 determines various control parameters in individual processes of sheet feeding/conveyance, transfer, and fixing of the sheet S. The processing in step S605 is the processing described above with reference to FIG. 17.

(Step S606)

The control part 11 moves, to the third storage area 123 of the storage part 12, various control parameters in the sheet feeding/conveyance, transfer, and fixing processes stored in the fourth storage area 124 of the storage part 12 as control parameters in current sheet physical property detection during actual printing, and stores as control parameters in previous sheet physical property detection during the actual printing.

(Step S607)

The control part 11 stores various control parameters in the sheet feeding/conveyance, transfer, and fixing processes determined in step S605 into the fourth storage area 124 of the storage part 12, as control parameters in current sheet physical property detection during actual printing.

(Step S608)

The control part 11 determines whether or not the post-processing apparatus 30 is connected to the image forming apparatus 10. If the post-processing apparatus 30 is connected (step S608: YES), the control part 11 proceeds to the processing of step S609, and if the post-processing apparatus 30 is not connected (step S608: NO), the control part 11 returns to the flow of FIG. 27.

(Step S609)

The control part 11 checks a type of the connected post-processing apparatus 30.

(Step S610)

The control part 11 reads and acquires related detection data of sheet physical properties from the storage part 12 in accordance with the type (function) of the connected post-processing apparatus 30.

(Step S611)

The control part 11 executes control parameter determination processing according to the function of the connected post-processing apparatus 30. The processing in step S611 is the processing described above with reference to FIG. 18.

(Step S612)

The control part 11 moves, to the third storage area 123 of the storage part 12, various control parameters of the post-processing apparatus 30 stored in the fourth storage area 124 of the storage part 12 as control parameters in current sheet physical property detection during actual printing, and stores as control parameters in previous sheet physical property detection during the actual printing.

(Step S613)

The control part 11 stores the various control parameters of the post-processing apparatus 30 determined in step S611 into the fourth storage area 124 of the storage part 12, as control parameters in current sheet physical property detection during actual printing.

<Modification 1 of Actual Printing Processing>

As Modification 1 of the actual printing processing, a description will be given to an example in which the printing processing is executed using a corrected value of the control parameter without using a value of the control parameter obtained during printing when the control parameter is corrected in the actual printing preparation processing before actual printing.

Figure 29A:
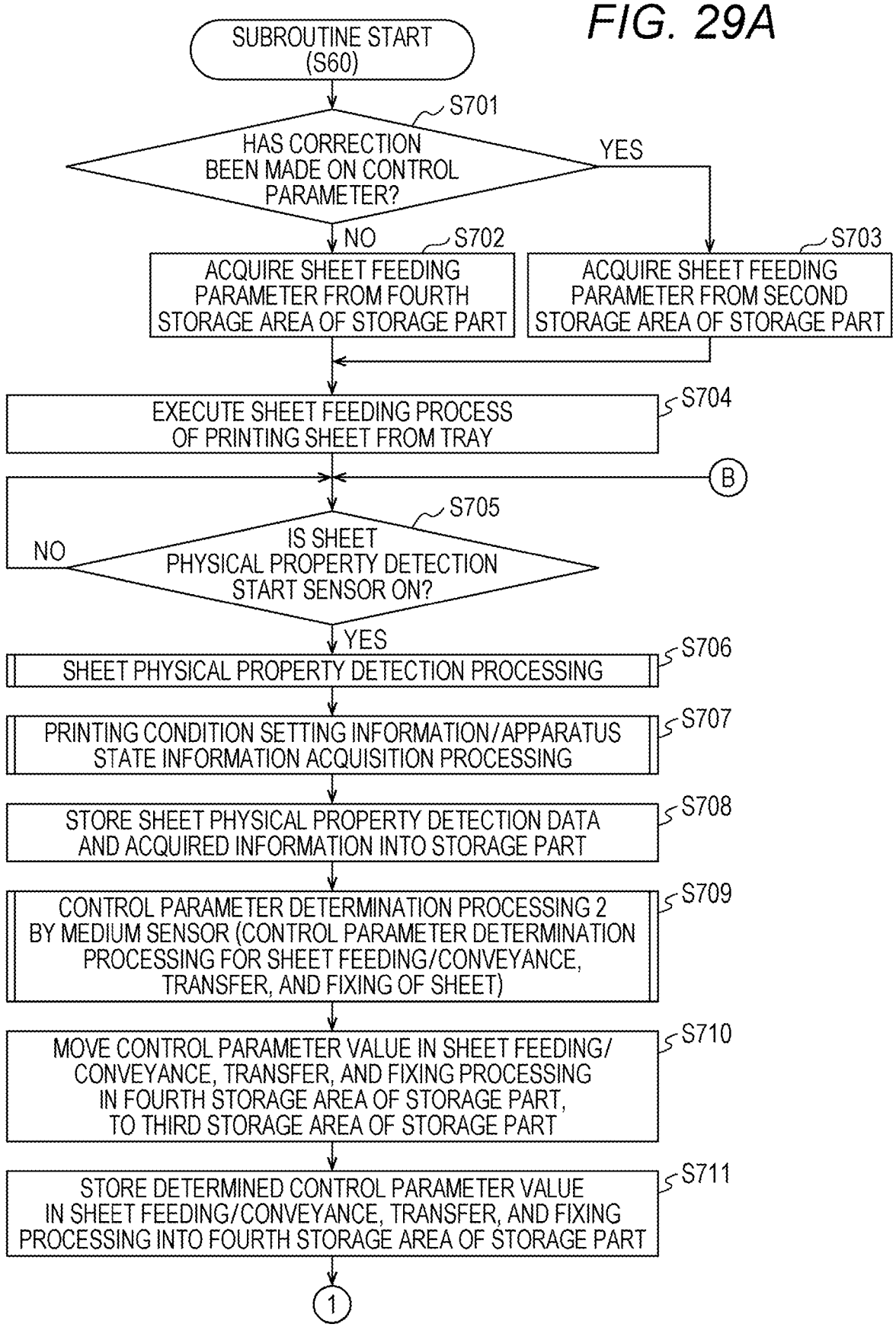
FIG. 29A is a flowchart illustrating Modification 1 of the actual printing processing.
Figure 29B:
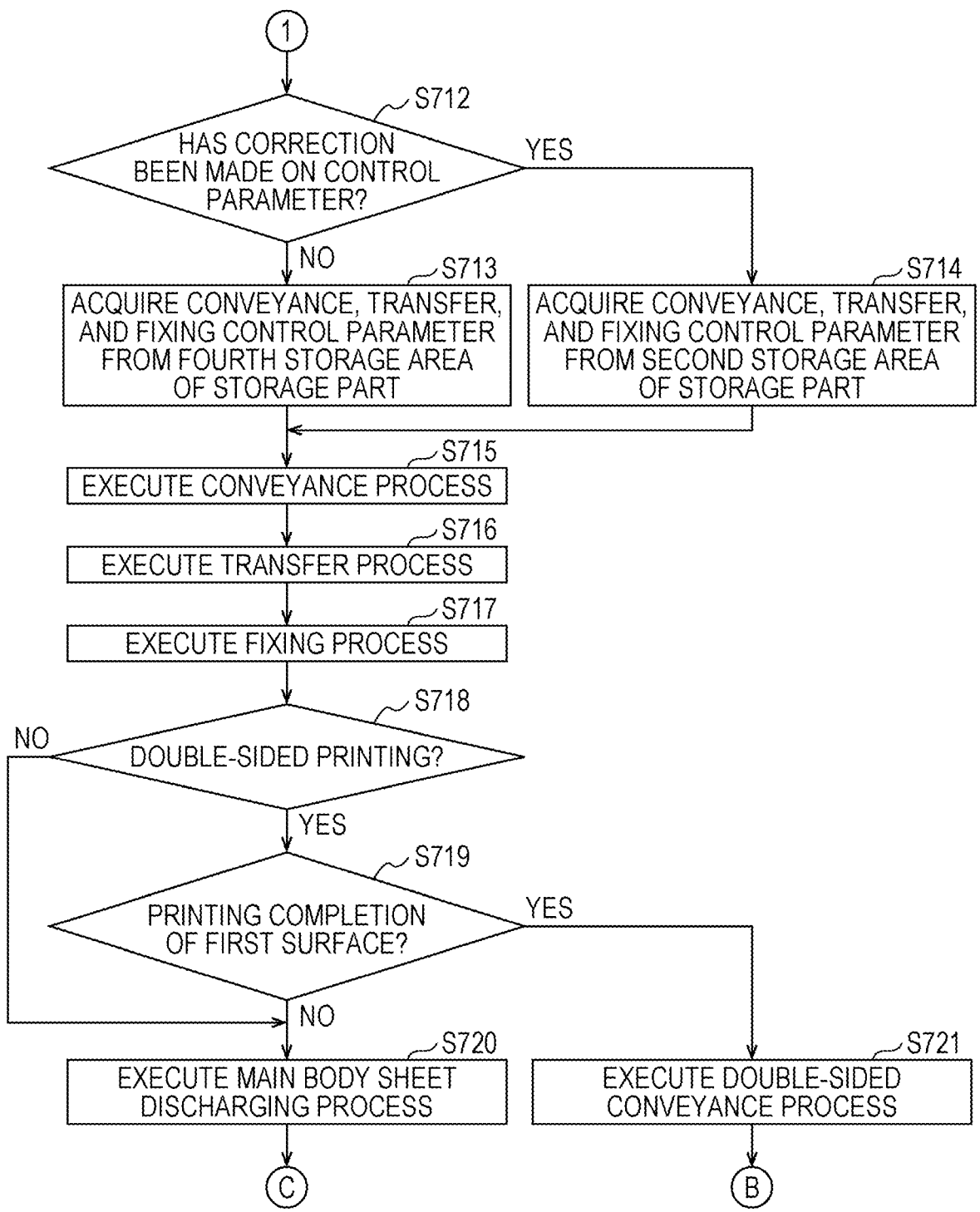
FIG. 29B is a flowchart following FIG. 29A.
Figure 29C:
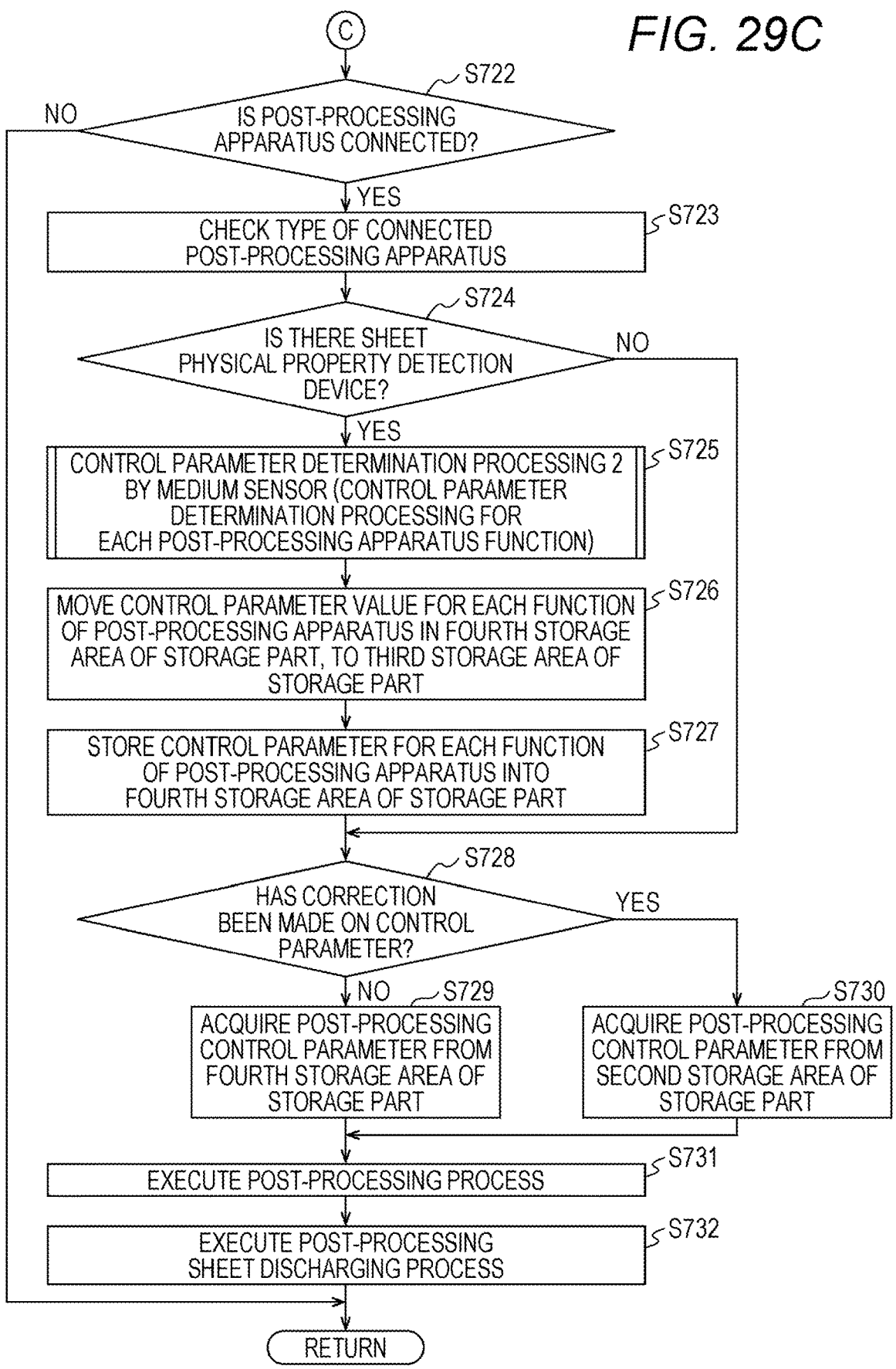
FIG. 29C is a flowchart following FIG. 29B.
Figure 30A:
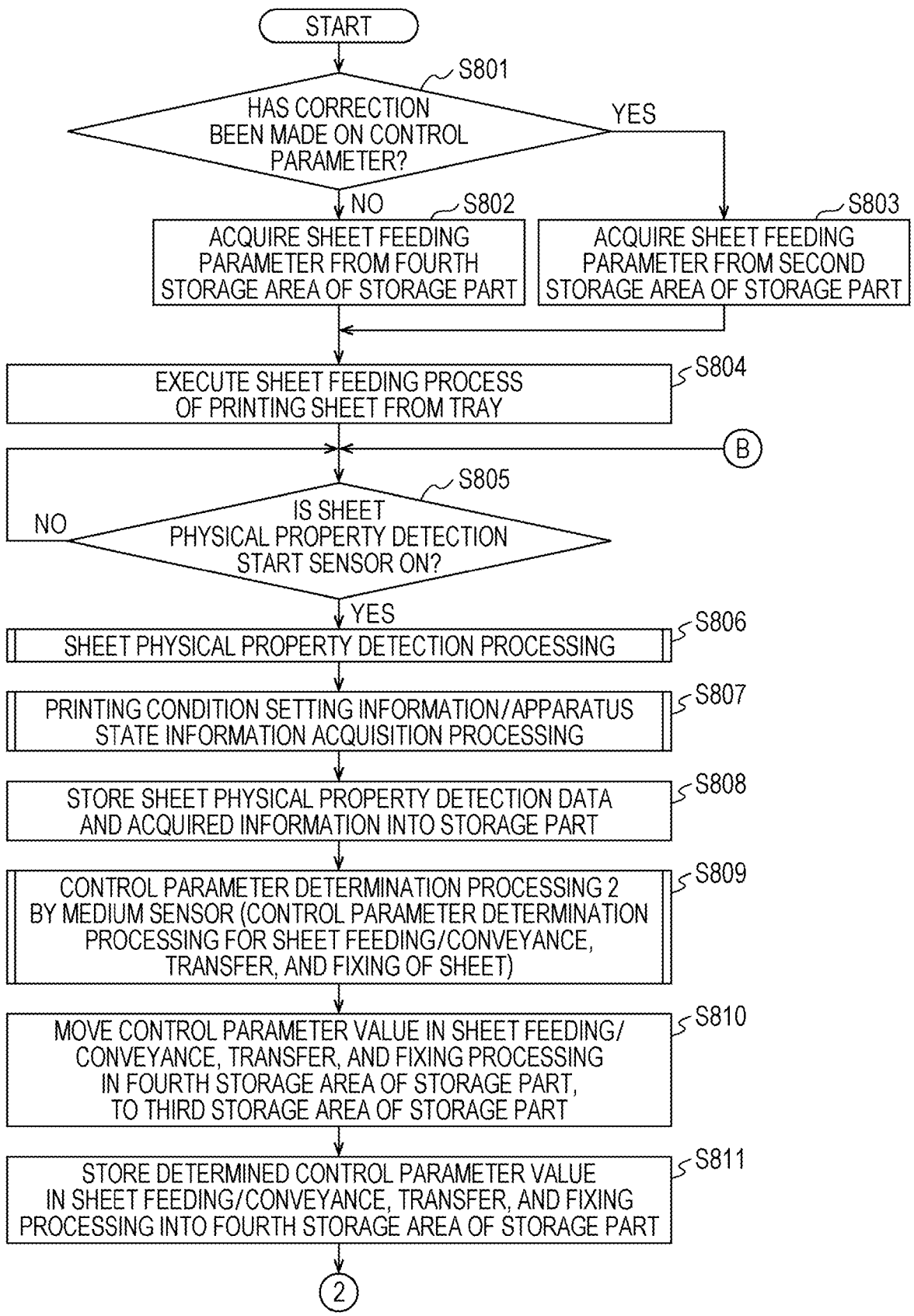
FIG. 30A is a flowchart illustrating Modification 2 of the actual printing processing.
Figure 30B:
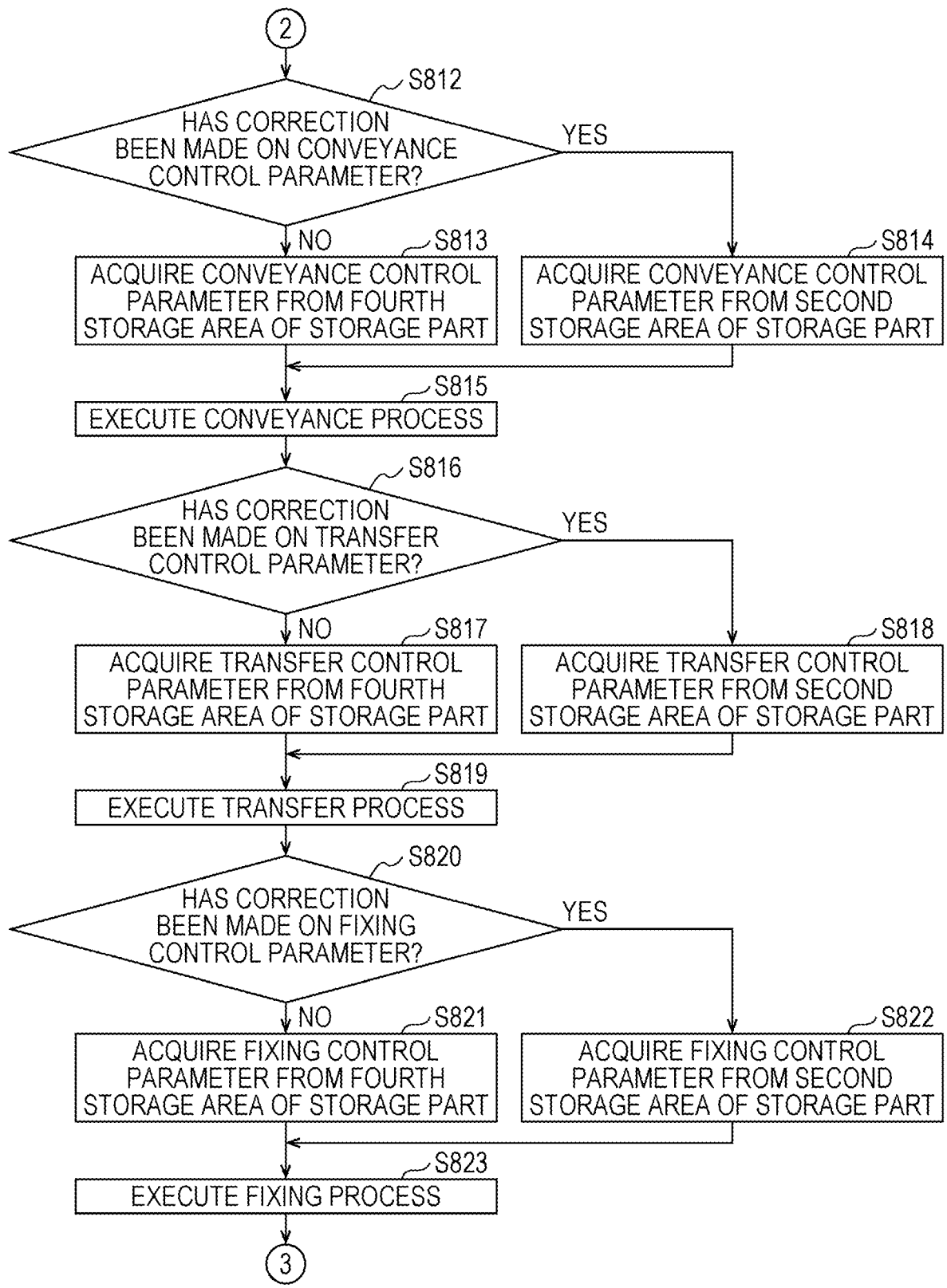
FIG. 30B is a flowchart following FIG. 30A.
Figure 30C:
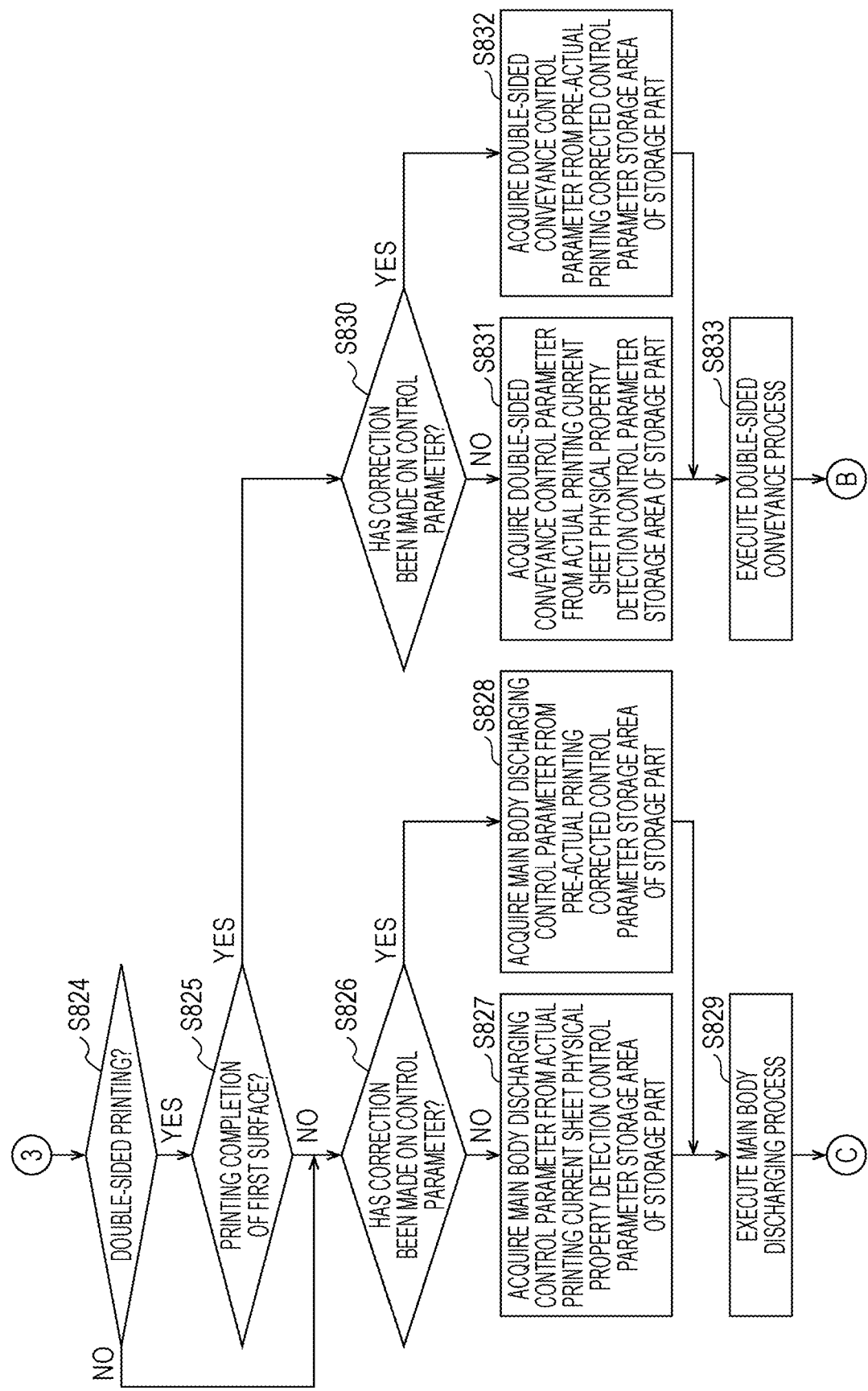
FIG. 30C is a flowchart following FIG. 30B.
Figure 30D:
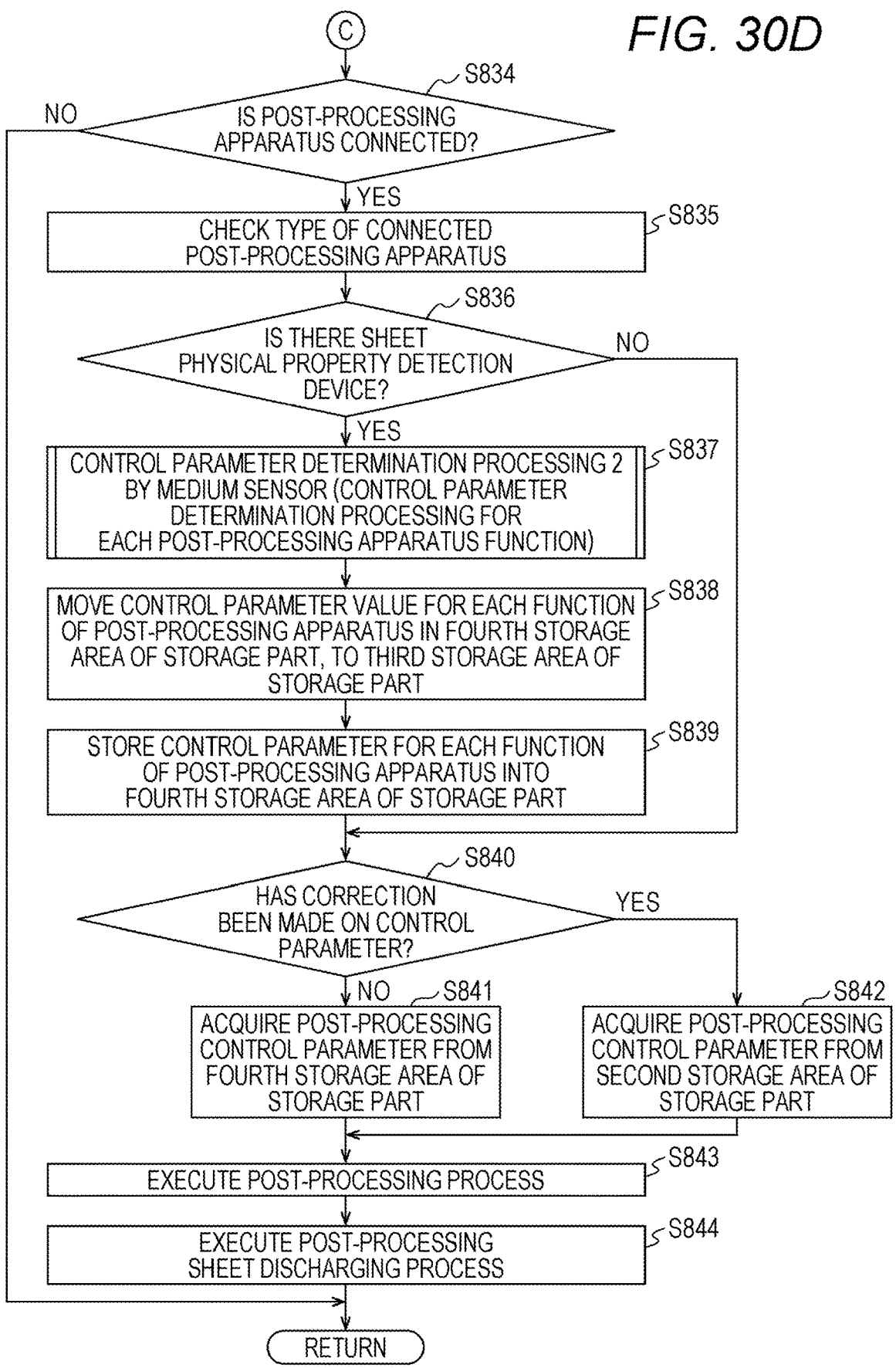
FIG. 30D is a flowchart following FIG. 30C.

FIGS. 29A, 29B, and 29C are flowcharts illustrating Modification 1 of the actual printing processing.

(Step S701)

The control part 11 determines whether or not correction has been made on a control parameter determined by the determination model. If the correction has not been made (step S701: NO), the control part 11 proceeds to the processing in step S702, and if the correction has been made (step S701: YES), the control part 11 proceeds to the processing in step S703.

(Step S702)

The control part 11 acquires, from the fourth storage area 124 of the storage part 12, a current control parameter during actual printing related to the sheet feeding processing.

(Step S703)

The control part 11 acquires, from the second storage area 122 of the storage part 12, a control parameter with correction before actual printing related to the sheet feeding processing.

(Step S704)

The control part 11 controls the sheet feeding conveyance part 14 and the sheet feeding apparatus 20 to execute the sheet feeding process for feeding the sheet S from a tray.

(Step S705)

If a sheet sensor to start detection processing of a sheet physical property is OFF (step S705: NO), the control part 11 stands by until the sheet sensor is turned ON. When the sheet sensor is turned ON (step S705: YES), the processing proceeds to step S706.

(Step S706)

The control part 11 detects a sheet physical property value of the sheet S by each sheet physical property sensor on the sheet feeding/conveyance path. The processing of step S706 is similar to the processing of step S302 illustrated in FIG. 13A.

(Step S707)

The control part 11 acquires printing condition setting information (double-sided/single-sided printing, color printing/single-color printing, a sheet width, and the like) and apparatus state information (machine environmental information including a temperature, a humidity, a standby time, and the like). The processing of step S707 is similar to the processing of step S303 illustrated in FIG. 13A.

(Step S708)

The control part 11 stores, in the storage part 12, detection data of the sheet physical properties acquired in the processing of step S706 and various types of information acquired in the processing of step S707.

(Step S709)

The control part 11 determines various control parameters in individual processes of sheet feeding/conveyance, transfer, and fixing of the sheet S. The processing in step S709 is the processing described above with reference to FIG. 17.

(Step S710)

The control part 11 moves, to the third storage area 123 of the storage part 12, various control parameters in the sheet feeding/conveyance, transfer, and fixing processes stored in the fourth storage area 124 of the storage part 12 as control parameters in current sheet physical property detection during actual printing, and stores as control parameters in previous sheet physical property detection during the actual printing.

(Step S711)

The control part 11 stores various control parameters in the sheet feeding/conveyance, transfer, and fixing processes determined in step S709 into the fourth storage area 124 of the storage part 12, as control parameters in current sheet physical property detection during actual printing.

(Step S712)

The control part 11 determines whether or not correction has been made on a control parameter determined by the determination model. If the correction has not been made (step S712: NO), the control part 11 proceeds to the processing in step S713, and if the correction has been made (step S712: YES), the control part 11 proceeds to the processing in step S714.

(Step S713)

The control part 11 acquires, from the fourth storage area 124 of the storage part 12, current control parameters during actual printing related to the conveyance, transfer, and fixing processing.

(Step S714)

The control part 11 acquires, from the second storage area 122 of the storage part 12, control parameters with correction before actual printing related to conveyance, transfer, and fixing processing.

(Step S715)

The control part 11 executes the conveyance process of conveying the sheet S.

(Step S716)

The control part 11 executes the transfer process of transferring a toner image onto the sheet S.

(Step S717)

The control part 11 executes the fixing process of fixing the toner image onto the sheet S.

(Step S718)

The control part 11 determines whether or not to be double-sided printing. In a case of double-sided printing (step S718: YES), the control part 11 proceeds to step S719, and in a case of not double-sided printing (step S718: NO), the control part 11 proceeds to step S720.

(Step S719)

The control part 11 determines whether or not to be printing completion of a first surface (front surface). In a case of not the printing completion of the first surface, that is, if the printing up to a second surface is completed (step S719: NO), the control part 11 proceeds to the processing of step S720. In a case of the printing completion of the first surface (step S719: YES), the control part 11 proceeds to the processing of step S721.

(Step S720)

The control part 11 executes a main body sheet discharging process of discharging the sheet S on which image formation has been completed, from the main body of the image forming apparatus 10.

(Step S721)

The control part 11 controls the sheet reversing mechanism of the sheet feeding conveyance part 14 to convey the sheet S to the conveyance path 144 for double-sided image formation, reverses the sheet S by a switchback path, and returns to the processing of step S705.

(Step S722)

The control part 11 determines whether or not the post-processing apparatus 30 is connected to the image forming apparatus 10. If the post-processing apparatus 30 is connected (step S722: YES), the control part 11 proceeds to the processing of step S723, and if the post-processing apparatus 30 is not connected (step S722: NO), the control part 11 ends the actual printing processing.

(Step S723)

The control part 11 checks a type of the connected post-processing apparatus 30.

(Step S724)

The control part 11 determines whether or not a device for detection of sheet physical properties is provided. If the device is provided (step S724: YES), the control part 11 proceeds to the processing of step S725, and if the device is not provided (step S724: NO), the control part 11 proceeds to the processing of step S728.

(Step S725)

The control part 11 executes control parameter determination processing according to the function of the connected post-processing apparatus 30. The processing in step S725 is similar to the processing in steps S601 to S604 and steps S610 to S611 in FIGS. 28A and 28B.

(Step S726)

The control part 11 moves, to the third storage area 123 of the storage part 12, various control parameters of the post-processing apparatus 30 stored in the fourth storage area 124 of the storage part 12 as control parameters in current sheet physical property detection during actual printing, and stores as control parameters in previous sheet physical property detection during the actual printing.

(Step S727)

The control part 11 stores the various control parameters of the post-processing apparatus 30 determined in step S725 into the fourth storage area 124 of the storage part 12, as control parameters in current sheet physical property detection during actual printing.

(Step S728)

The control part 11 determines whether or not correction has been made on a control parameter determined by the determination model. If the correction has not been made (step S728: NO), the control part 11 proceeds to the processing in step S729, and if the correction has been made (step S728: YES), the control part 11 proceeds to the processing in step S730.

(Step S729)

The control part 11 acquires, from the fourth storage area 124 of the storage part 12, a current control parameter during actual printing related to post-processing.

(Step S730)

The control part 11 acquires, from the second storage area 122 of the storage part 12, a control parameter with correction before actual printing related to post-processing.

(Step S731)

The control part 11 executes a post-processing process of performing post-processing on the sheet S.

(Step S732)

The control part 11 executes a post-processing sheet discharging process of discharging the sheet S subjected to post-processing, and ends the actual printing processing.

By the above processing, print quality more suitable for user's preference can be obtained. Note that, in order to reduce a processing time, a control parameter automatic determination operation during printing may be stopped, and a control parameter determined in advance may be used as a fixed value.

<Modification 2 of Actual Printing Processing>

As Modification 2 of the actual printing processing, a description will be given to an example in which printing processing is executed using a control parameter value automatically determined during printing, except for a value of a corrected control parameter during printing.

FIGS. 30A, 30B, 30C, and 30D are flowcharts illustrating Modification 2 of the actual printing processing.

(Steps S801 to S811)

Since the processing of steps S801 to S811 is similar to the processing of steps S701 to S711 of FIG. 29A, the description thereof will be omitted.

(Step S812)

The control part 11 determines whether or not correction has been made on a control parameter related to the conveyance processing and determined by the determination model. If the correction has not been made (step S812: NO), the control part 11 proceeds to the processing in step S813, and if the correction has been made (step S812: YES), the control part 11 proceeds to the processing in step S814.

(Step S813)

The control part 11 acquires, from the fourth storage area 124 of the storage part 12, a current control parameter during actual printing related to the conveyance processing.

(Step S814)

The control part 11 acquires, from the second storage area 122 of the storage part 12, a control parameter with correction before actual printing related to the conveyance processing.

(Step S815)

The control part 11 executes the conveyance process of conveying the sheet S.

(Step S816)

The control part 11 determines whether or not correction has been made on a control parameter related to the transfer processing and determined by the determination model. If the correction has not been made (step S816: NO), the control part 11 proceeds to the processing in step S817, and if the correction has been made (step S816: YES), the control part 11 proceeds to the processing in step S818.

(Step S817)

The control part 11 acquires, from the fourth storage area 124 of the storage part 12, a current control parameter during actual printing related to the transfer processing.

(Step S818)

The control part 11 acquires, from the second storage area 122 of the storage part 12, a control parameter with correction before actual printing related to the transfer processing.

(Step S819)

The control part 11 executes the transfer process of transferring a toner image onto the sheet S.

(Step S820)

The control part 11 determines whether or not correction has been made on a control parameter related to the fixing processing and determined by the determination model. If the correction has not been made (step S820: NO), the control part 11 proceeds to the processing in step S821, and if the correction has been made (step S820: YES), the control part 11 proceeds to the processing in step S822.

(Step S821)

The control part 11 acquires, from the fourth storage area 124 of the storage part 12, a current control parameter during actual printing related to the fixing processing.

(Step S822)

The control part 11 acquires, from the second storage area 122 of the storage part 12, a control parameter with correction before actual printing related to the fixing processing.

(Step S823)

The control part 11 executes the fixing process of fixing the toner image onto the sheet S.

(Step S824)

The control part 11 determines whether or not to be double-sided printing. In a case of double-sided printing (step S824: YES), the control part 11 proceeds to step S825, and in a case of not double-sided printing (step S824: NO), the control part 11 proceeds to step S826.

(Step S825)

The control part 11 determines whether or not to be printing completion of a first surface (front surface). In a case of not the printing completion of the first surface, that is, if the printing up to a second surface is completed (step S825: NO), the control part 11 proceeds to the processing of step S826. In a case of the printing completion of the first surface (step S825: YES), the control part 11 proceeds to the processing of step S830.

(Step S826)

The control part 11 determines whether or not correction has been made on a control parameter related to the sheet discharging processing (sheet discharging processing from the main body of the image forming apparatus 10) and determined by the determination model. If the correction has not been made (step S826: NO), the control part 11 proceeds to the processing in step S827, and if the correction has been made (step S826: YES), the control part 11 proceeds to the processing in step S828.

(Step S827)

The control part 11 acquires, from the fourth storage area 124 of the storage part 12, a current control parameter during actual printing related to the sheet discharging processing.

(Step S828)

The control part 11 acquires, from the second storage area 122 of the storage part 12, a control parameter with correction before actual printing related to the sheet discharging processing.

(Step S829)

The control part 11 executes the main body sheet discharging process of discharging the sheet S on which image formation has been completed, from the main body of the image forming apparatus 1, and proceeds to the processing of step S834.

(Step S830)

The control part 11 determines whether or not correction has been made on a control parameter related to the double-sided conveyance processing (reverse conveyance processing of the sheet S using a reverse conveyance mechanism of the image forming apparatus 10) and determined by the determination model. If the correction has not been made (step S830: NO), the control part 11 proceeds to the processing in step S831, and if the correction has been made (step S830: YES), the control part 11 proceeds to the processing in step S832.

(Step S831)

The control part 11 acquires, from the fourth storage area 124 of the storage part 12, a current control parameter during actual printing related to the double-sided conveyance processing.

(Step S832)

The control part 11 acquires, from the second storage area 122 of the storage part 12, a control parameter with correction before actual printing related to the double-sided conveyance processing.

(Step S833)

The control part 11 controls the sheet reversing mechanism of the sheet feeding conveyance part 14 to convey the sheet S to the conveyance path 144 for double-sided image formation, reverses the sheet S by a switchback path, and returns to the processing of step S805.

(Steps S834 to S844)

Since the processing of steps S834 to S844 is similar to the processing of steps S722 to S732 of FIG. 29C, the description thereof will be omitted.

The processing described above can provide print quality suitable for user's preference while using a value of an appropriate control parameter for the sheet.

<Modification of Image Forming System>

In the above embodiment, a case where the medium sensor 80 is provided inside the image forming apparatus 10 has been described as an example, but the system configuration of the image forming system 1 of the present embodiment is not limited thereto. Hereinafter, a modification of the image forming system 1 will be described as an example.

Figure 31A:
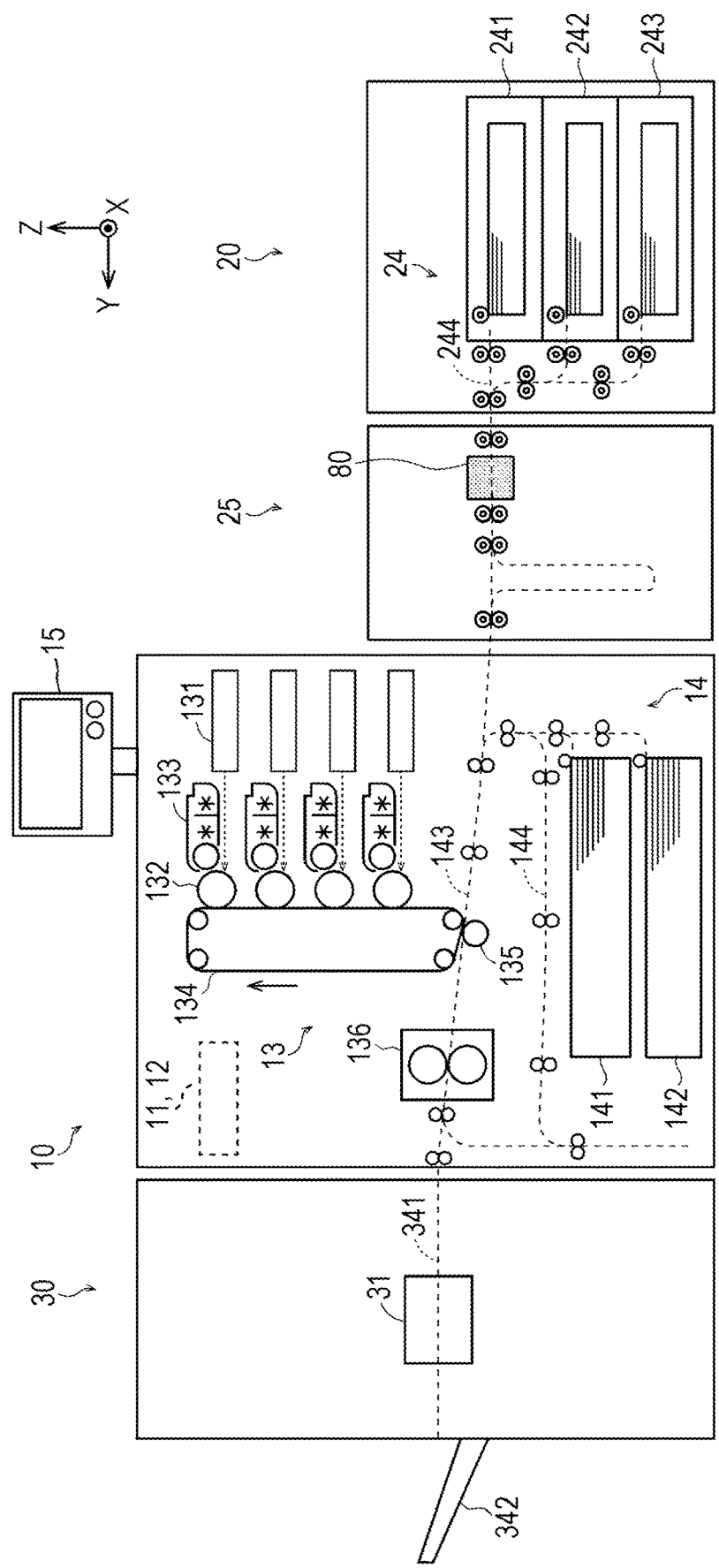
FIG. 31A is a view illustrating a schematic configuration of an image forming system according to Modification 3.

FIG. 31A is a view illustrating a schematic configuration of an image forming system according to Modification 3.

As illustrated in FIG. 31A, in an image forming system 1 according to Modification 3, an intermediate conveyance apparatus 25 is connected between the image forming apparatus 10 and the sheet feeding apparatus 20, and the medium sensor 80 is provided in the intermediate conveyance apparatus 25.

This can achieve the processing of the present embodiment without adding the medium sensor 80 inside the main body of the image forming apparatus 10.

Figure 31B:
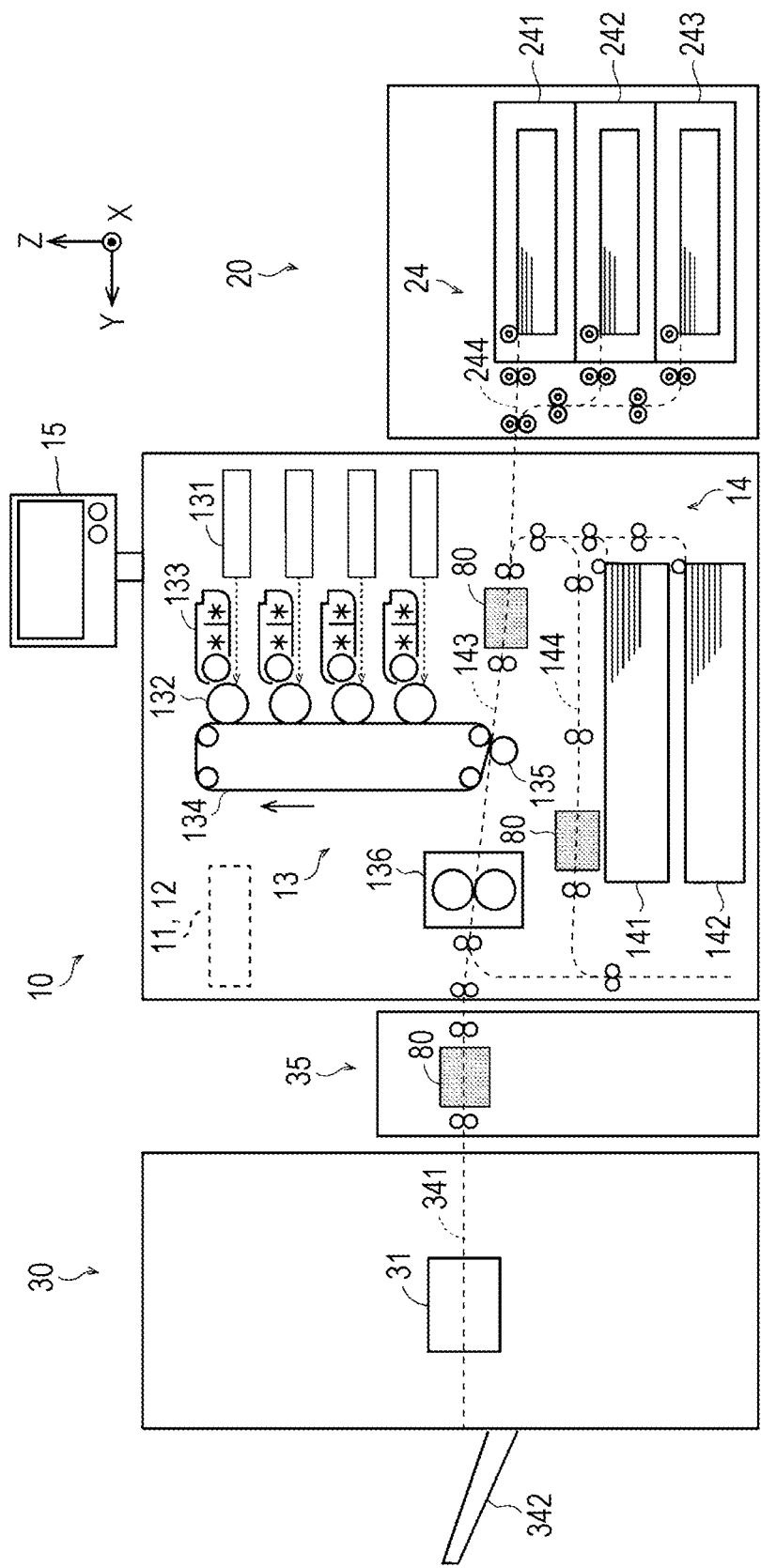
FIG. 31B is a view illustrating a schematic configuration of an image forming system according to Modification 4.

FIG. 31B is a view illustrating a schematic configuration of an image forming system according to Modification 4.

As illustrated in FIG. 31B, in an image forming system 1 according to Modification 4, the medium sensor 80 is provided on the conveyance path 144 for double-sided image formation of the image forming apparatus 10.

As a result, when double-sided printing is performed, it is possible to determine a control parameter by detecting sheet physical properties of the sheet S after an image is fixed on one side of the sheet S.

Note that, in the image forming system 1, a number of the medium sensors 80 to be provided and positions at which the medium sensors 80 are provided are not limited to the above examples, and any number of medium sensors 80 may be provided at any positions. For example, the medium sensor 80 may be provided in the sheet feeding apparatus 20 or the post-processing apparatus 30. Alternatively, the medium sensor 80 may be provided stand-alone outside the image forming system 1. In this case, detection data by the medium sensor 80 is inputted to the determination model algorithm of the image forming apparatus 10 by any method such as input by a network, a storage medium, or a user.

Further, FIG. 1 and the like have illustrated that the image forming system 1 has a configuration in which optional devices such as the sheet feeding apparatus 20, the post-processing apparatus 30, and the intermediate conveyance apparatus 35 are connected to the image forming apparatus 10, but may be configured by a single image forming apparatus 10 without these options. In each embodiment described above, each piece of processing described as being executed by the control part 11 of the image forming apparatus 10 may be executed by a control part of another configuration other than the image forming apparatus 10, such as the sheet feeding apparatus 20, the post-processing apparatus 30, the intermediate conveyance apparatus 35, the server 90, a printer controller, or a PC, connected to the image forming apparatus 10.

<Comparative Example>

Hereinafter, as a comparative example, a control parameter determination scheme in a conventional image forming apparatus will be described.

(Conventional Control Parameter Determination Scheme I)

Figure 32:
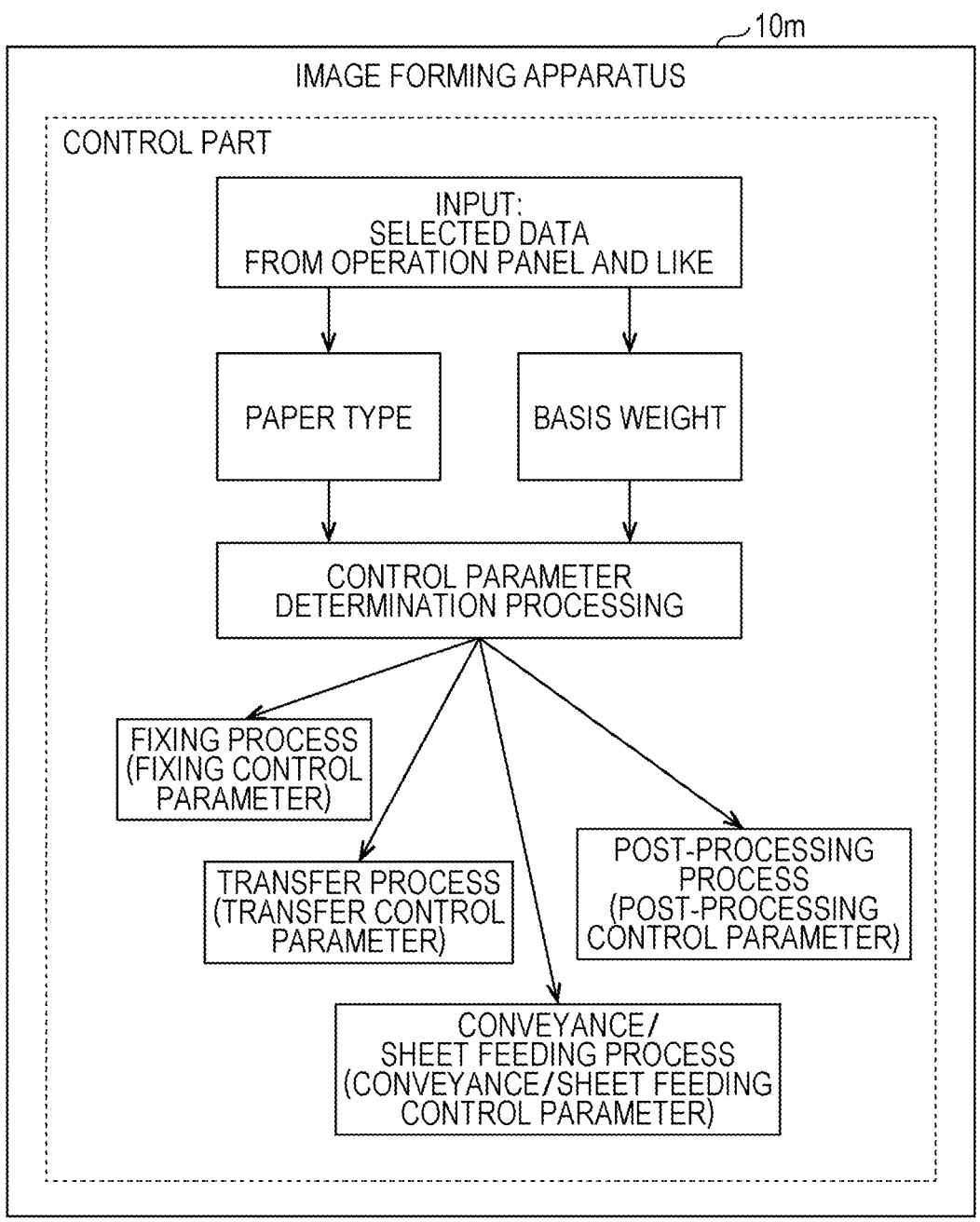
FIG. 32 is a schematic diagram illustrating a control parameter determination scheme I of an image forming apparatus according to Comparative Example 1.
Figure 33:
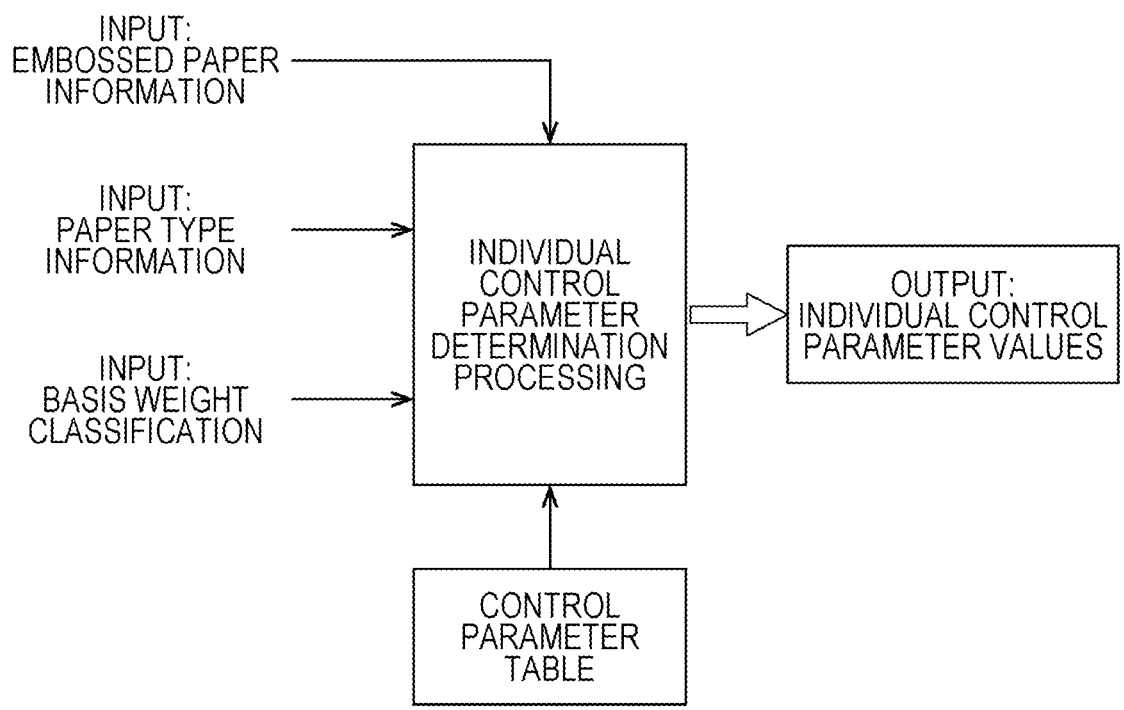
FIG. 33 is a diagram illustrating the control parameter determination scheme I according to Comparative Example 1.

FIG. 32 is a schematic diagram illustrating a control parameter determination scheme I of an image forming apparatus according to Comparative Example 1. FIG. 33 is a diagram illustrating the control parameter determination scheme I according to Comparative Example 1.

In the conventional determination scheme I, a user inputs a paper type and a basis weight (weight) of a sheet to be used, from an operation panel or the like of an image forming apparatus 10m. A control part of the image forming apparatus 10m determines control parameters for the fixing process, the transfer process, and the conveyance/sheet feeding process, by referring to each control parameter table stored in advance in a storage part depending on a combination of the paper type and the basis weight of the sheet. Here, the control parameters of the conveyance/sheet feeding process are, in accordance with the paper type/basis weight of the sheet, a feeding timing of the sheet from a sheet feeding tray, a rotation speed of a roller at the time of conveyance, or a restart timing in a resist roller disposed immediately before a transfer position. The control parameter of the transfer process is output of voltage and current when toner on a secondary transfer belt is transferred to a sheet in an electrophotographic method. The control parameter in the fixing process is a setting of a control temperature and pressure of a fixing member or a sheet conveyance speed when the toner is fixed to the sheet by heating and pressurization of a fixing device.

In the example of FIG. 33, embossed paper information is inputted separately from the paper type and the basis weight. On the basis of the embossed paper information, the paper type information, and the basis weight information inputted by the user, the control part of the image forming apparatus 10m controls, with the determined control parameter value, functional members in the image forming apparatus 10m, that is, the fixing device, a transfer part, and a sheet feeding conveyance part.

(Conventional Control Parameter Determination Scheme II)

Figure 34:
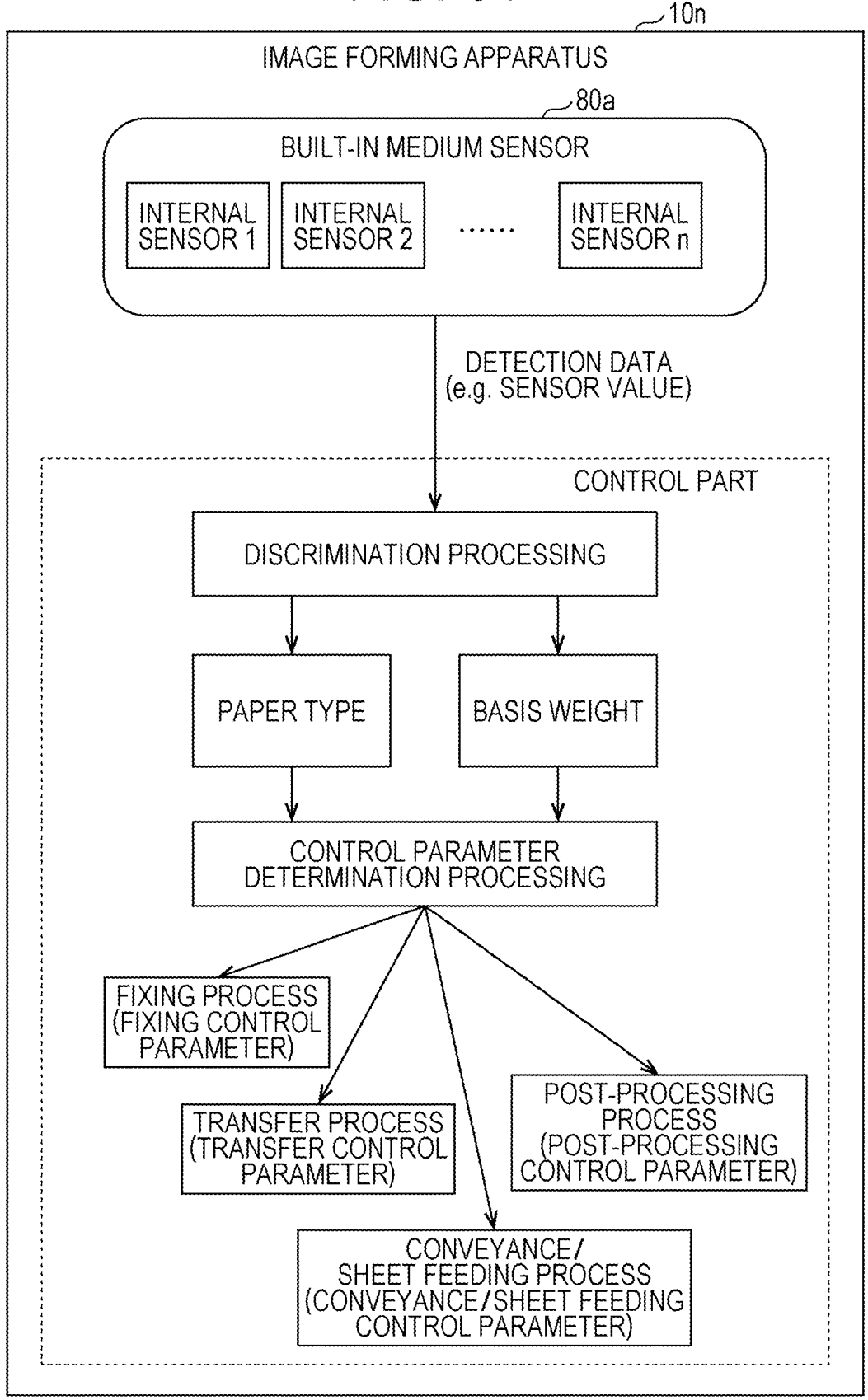
FIG. 34 is a schematic diagram illustrating a control parameter determination scheme II of an image forming apparatus according to Comparative Example 2.
Figure 35:
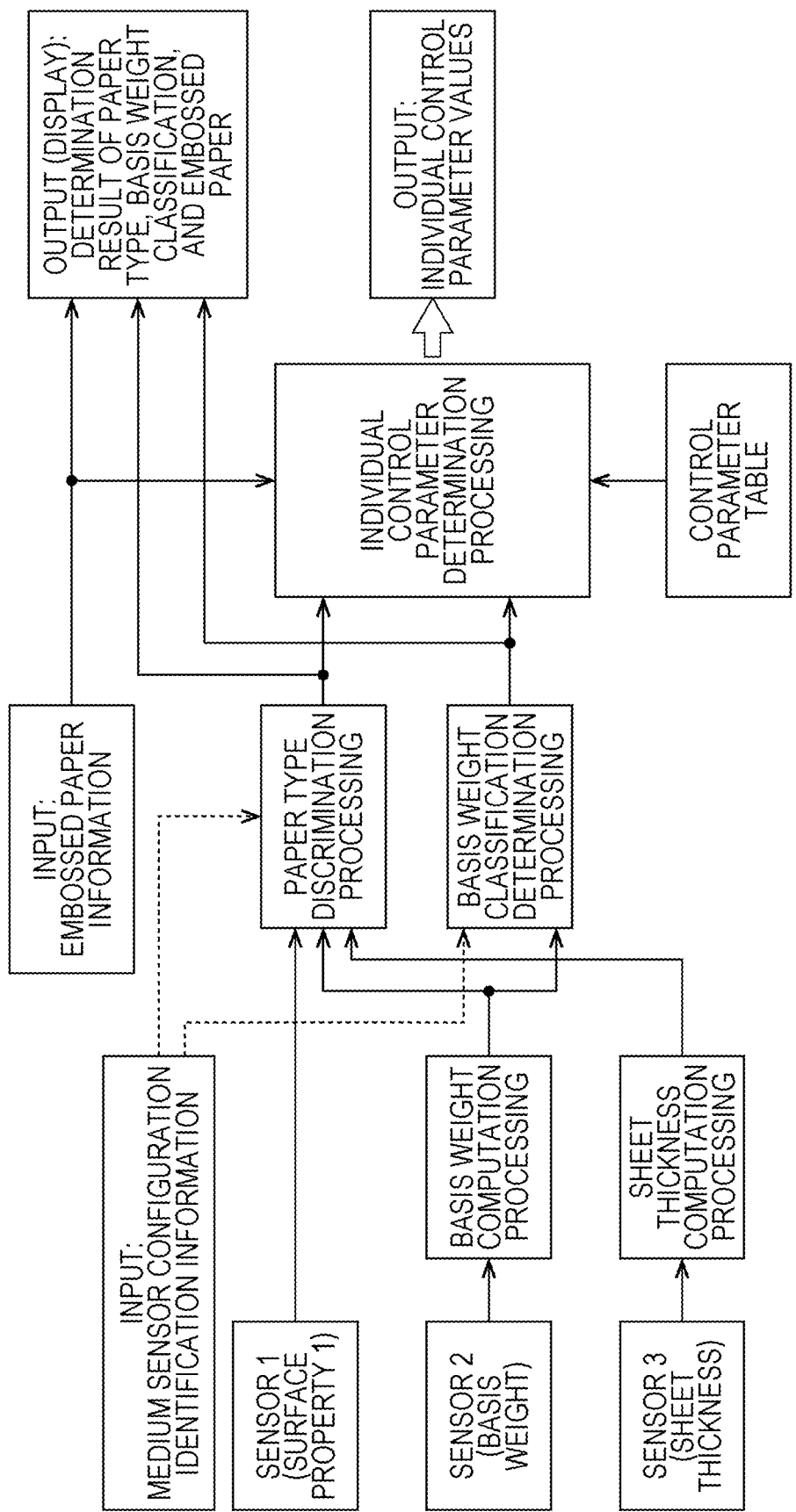
FIG. 35 is a diagram illustrating the control parameter determination scheme II according to Comparative Example 2.

FIG. 34 is a schematic diagram illustrating a control parameter determination scheme II of an image forming apparatus according to Comparative Example 2. FIG. 35 is a diagram illustrating the control parameter determination scheme II according to Comparative Example 2.

In the conventional determination scheme II, a control part of an image forming apparatus 10n performs discrimination processing of a paper type and a basis weight, on the basis of detection data (first detection data or second detection data) obtained from each internal sensor of a medium sensor 80. The control part performs control parameter determination processing on the basis of the paper type and the basis weight classified by the discrimination processing, and determines each control parameter. The control parameter determination processing is basically similar to the determination scheme I except that the paper type and the number of classification of the basis weight are different.

In the example of FIG. 35, embossed paper information is inputted separately from the paper type and the basis weight discriminated on the basis of the detection data. On the basis of the embossed paper information, the paper type information, and the basis weight information inputted by the user, the control part of the image forming apparatus 10n controls, with the determined control parameter value, functional members in the image forming apparatus 10n, that is, a fixing device, a transfer part, and a sheet feeding conveyance part.

<Effects Achieved by Image Forming System of Present Embodiment>

As shown in the above comparative example, in the conventional system, a control parameter is determined by secondarily calculating a value for determining the control parameter by computation from a detected sheet physical property value, or applying the calculated value to a table prepared in advance. In such a system, for example, there is a problem that an error is likely to be applied to a value since a secondary value is calculated by computation, or a problem that the control parameter has to be determined as a value that discretely varies for each predetermined section (range) since a value is determined with reference to a table prepared in advance, which disables determination of an optimal control parameter value.

On the other hand, according to the image forming system 1 of the present embodiment, a value related to a plurality of types of sheet physical properties is acquired, and a parameter related to the sheet processing is determined from the acquired value related to the plurality of types of sheet physical properties on the basis of a program using at least any of a learning function including artificial intelligence or a statistical method. This makes it possible to automatically determine a control parameter directly from detection data without secondarily calculating a sheet physical property value by applying computation to the detection data or applying the calculated value to a table prepared in advance. Therefore, it is possible to derive an optimal control parameter for each sheet regardless of user's knowledge or skill level.

Further, since at least any of the sheet type or the basis weight can also be specified and presented, the user can easily and reliably grasp a result of the automatic determination by a conventionally familiar method, and can recognize whether there is a sheet load error or appropriately take necessary measures such as setting correction.

Further, since it is possible to set which one of the first specification part and the second specification part is to be used to specify the parameter related to the sheet processing, for example, it is possible to respond to various demands of a user who desires to set and adjust control parameters on the basis of own specialized knowledge, a user who lacks specialized knowledge and desires to use the automatic setting, and the like.

In addition, the program is configured by a program based on an algorithm that changes dynamically. This allows a more appropriate control parameter to be derived in accordance with a situation.

Furthermore, the above-described learning function is configured by ensemble learning that generates one learning device by fusing a plurality of learning devices. This allows an appropriate control parameter to be derived more accurately.

Furthermore, the learning function is configured by a neural network. This allows an appropriate control parameter to be more easily derived.

In addition, the image forming system 1 further acquires information regarding an apparatus state of the sheet processing apparatus that performs the sheet processing, and determines a parameter related to the sheet processing from a value related to the plurality of types of sheet physical properties and the information regarding the apparatus state. This allows the control parameter to be determined in consideration also of the apparatus state in addition to the plurality of types of sheet physical properties, and thus a more appropriate control parameter can be derived.

In addition, the image forming system 1 acquires information regarding the apparatus state of the sheet processing apparatus at a predetermined timing, and determines a parameter related to the sheet processing for a plurality of sheets. This makes it possible to continuously derive an appropriate control parameter and secure print quality even in printing processing over a long time or printing processing of a large number of sheets.

In addition, the image forming system 1 acquires information regarding an apparatus state of the sheet processing apparatus at a predetermined timing, and determines a parameter related to the sheet processing for every sheet passing or for every predetermined sheet passing interval, during actual printing, at a time of an initial setting of actual printing preparation. This allows a control parameter to be determined at an appropriate timing in accordance with convenience of the user or the printing processing, required print quality, and the like.

Further, the image forming system 1 executes, on the basis of the program described above, the first processing of specifying the sheet type from the acquired value related to the sheet physical properties, and the second processing of determining the parameter related to the sheet processing without specifying the sheet type from the acquired value related to the sheet physical properties. This makes it possible to directly determine the control parameter from the value related to the sheet physical properties of the sheet by the second processing, and specify and present the sheet type to the user by the first processing. Therefore, while an appropriate control parameter is automatically determined, a result of the automatic processing can be presented to the user in an easy-to-understand form of the sheet type, and a sense of security and a sense of satisfaction can be given to the user.

In addition, priority is given to each value related to the plurality of types of sheet physical properties, and the image forming system 1 determines the parameter related to the sheet processing on the basis of a given priority. This makes it possible to preferentially consider a value of the sheet physical properties having a high degree of contribution of an influence on the print quality, and to more appropriately derive the control parameter.

Further, the priority to be given is set so as to be different between the first processing and the second processing. This makes it possible to give an appropriate priority to a value of each sheet physical property in each piece of processing, and derive an appropriate control parameter and an appropriate sheet physical property.

Further, the value related to the plurality of types of sheet physical properties includes at least any of: a value related to a sheet surface state; a value related to a sheet basis weight; a value related to a sheet thickness; a value related to sheet gloss; a value related to emboss processing; a value related to a sheet moisture amount; a value related to sheet volume resistance; a value related to sheet bending strength; or a value related to a sheet charge amount. This makes it possible to derive an appropriate control parameter in consideration of the plurality of types of sheet physical properties that may affect execution quality of each process.

Further, the parameter related to the sheet processing includes a parameter related to image formation in the image forming apparatus 10. This makes it possible to set an appropriate control parameter related to image formation, and to execute the image forming processing with high quality.

Further, the parameter related to the image formation includes at least any of: a parameter related to the fixing process; a parameter related to the destaticizing process; a parameter related to the transfer process; or a parameter related to the conveyance process. This makes it possible to set, in each process required for the image formation, an appropriate control parameter for each process, and to execute each process with high quality.

In addition, the parameter related to the sheet processing includes a parameter related to the post-processing in the post-processing apparatus 30 or a parameter related to the sheet feeding processing in the sheet feeding apparatus 20. This makes it possible to set an appropriate control parameter related to the post-processing and the sheet feeding processing, and to execute the post-processing and the sheet feeding processing with high quality.

In addition, the parameter related to the post-processing includes at least any of a parameter related to punch processing, a parameter related to stack processing, or a parameter related to bookbinding processing. This makes it possible to set an appropriate control parameter for each function in accordance with the post-processing function, and to execute individual post-processing with high quality.

In addition, the parameter related to the sheet feeding processing includes at least any of: a parameter related to a suction air volume by a suction belt in sheet feeding and related to an assist air volume; or a parameter related to a separation roller pressure and an operating speed of the separation roller. This makes it possible to set an appropriate control parameter in each piece of processing required for sheet feeding, and to execute the sheet feeding processing with high quality.

Further, in the image forming system 1, the parameter determination apparatus may acquire a value related to the plurality of types of sheet physical properties from a sensor provided in the parameter determination apparatus. This makes it possible to derive an appropriate control parameter from the value related to the plurality of types of sheet physical properties with a simple configuration of one apparatus alone.

Further, in the image forming system 1, the parameter determination apparatus may acquire a value related to the plurality of types of sheet physical properties from a sensor connected to the parameter determination apparatus. This allows a sensor to be connected as an external device to the parameter determination apparatus, and an appropriate control parameter can be derived from the value related to the plurality of types of sheet physical properties.

Further, in the image forming system 1, the parameter determination apparatus may be connected to the sheet processing apparatus that performs the sheet processing. This can provide separate configurations in the apparatus that determines the control parameter and the apparatus that uses the control parameter, and a degree of freedom in apparatus configuration design in the image forming system 1 can be increased.

Further, in the image forming system 1, the parameter determination apparatus can be provided in any of other configurations such as the image forming apparatus 10, the sheet feeding apparatus 20, the post-processing apparatus 30, the intermediate conveyance apparatus 35, and the server 90. This can increase a degree of freedom of apparatus configuration design in the image forming system 1.

The configuration of the image forming system 1 described above has been described as a main configuration in describing the features of the above embodiment, and is not limited to the above configuration, and various modifications can be made within the scope of claims. In addition, the configuration included in a general image forming system is not excluded.

For example, the image forming system 1 may include a configuration other than the image forming apparatus 10, the sheet feeding apparatus 20, the post-processing apparatus 30, and the intermediate conveyance apparatus 35, or may not include some of the configurations. Each of the image forming apparatus 10, the sheet feeding apparatus 20, the post-processing apparatus 30, and the intermediate conveyance apparatus 35 may include a component other than the above components, or may not include some of the above components.

In addition, each of the image forming apparatus 10, the sheet feeding apparatus 20, the post-processing apparatus 30, and the intermediate conveyance apparatus 35 may include a plurality of apparatuses, or may include a single apparatus. In addition, the function of each configuration may be implemented by another configuration.

In addition, a processing unit of the flowchart in the above embodiment is divided in accordance with main processing contents in order to facilitate understanding of each piece of processing. The present disclosure is not limited by the way of classifying processing steps. Each piece of processing can also be divided into more processing steps. In addition, one piece of processing step may execute more pieces of processing.

Means and methods to perform various kinds of processing in the system according to the above embodiment can also be realized by either a dedicated hardware circuit or a programmed computer. The program may be provided by, for example, a computer-readable recording medium such as a flexible disk and a CD-ROM, or may be provided online via a network such as the Internet. In this case, the program recorded in the computer-readable recording medium is usually transferred to and stored in a storage part such as a hard disk. In addition, the program may be provided as independent application software, or may be incorporated into software of the apparatus as one function of the system.

Although embodiments of the present disclosure have been described and illustrated in detail, the disclosed embodiments are made for purposes of illustration and example only and not limitation. The scope of the present disclosure should be interpreted by terms of the appended claims.

As used herein, the words "can" and "may" are used in a permissive (i.e., meaning having the potential to), rather than mandatory sense (i.e., meaning must). The words "include," "includes," "including," and the like mean including, but not limited to. Similarly, the singular form of "a" and "the" include plural references unless the context clearly dictates otherwise. And the term "number" shall mean one or an integer greater than one (i.e., a plurality).

What is claimed is:

1. A parameter determination apparatus, comprising:
   a first hardware processor that acquires at least one value related to a plurality of types of sheet physical properties;
   a second hardware processor that specifies at least any of a sheet type or a basis weight for user presentation based on a first acquired value related to a sheet physical property, and a priority given to each value related to the plurality of types of sheet physical properties; and
   a third hardware processor that specifies a parameter related to sheet processing based on the first acquired value related to the sheet physical property,
   wherein the third hardware processor specifies a parameter related to sheet processing directly from the first acquired value related to the sheet physical property not through a process of specifying at least any of the sheet type or the basis weight.

2. The parameter determination apparatus according to claim 1, wherein:
   the first hardware processor further acquires information regarding an apparatus state of a sheet processing apparatus that performs the sheet processing, and
   the third hardware processor specifies a parameter related to the sheet processing based on acquired information related to an apparatus state and the first acquired value related to the sheet physical property.

3. The parameter determination apparatus according to claim 2, wherein the second hardware processor specifies a parameter related to the sheet processing based on acquired information regarding an apparatus state and at least any of the sheet type or the basis weight that has been specified.

4. The parameter determination apparatus according to claim 3, further comprising:
   a fourth hardware processor that sets which of the second hardware processor and the third hardware processor part is to be used to specify a parameter related to the sheet processing.

5. The parameter determination apparatus according to claim 1, further comprising:
   a display part that displays at least any of a sheet type or a basis weight specified by the second hardware processor.

6. The parameter determination apparatus according to claim 2, wherein:
   the first hardware processor acquires information regarding an apparatus state of the sheet processing apparatus at a predetermined timing, and
   the third hardware processor specifies a parameter related to the sheet processing for a plurality of sheets.

7. The parameter determination apparatus according to claim 2, wherein:
   the first hardware processor acquires information regarding an apparatus state of the sheet processing apparatus at a predetermined timing, and
   the third hardware processor determines a parameter related to the sheet processing for every sheet passing or for every predetermined sheet passing interval, during actual printing, at a time of an initial setting of actual printing preparation.

8. The parameter determination apparatus according to claim 1, wherein:
   a priority used when the second hardware processor specifies at least any of a sheet type or a basis weight is different from a priority used when the third hardware processor specifies a parameter related to sheet processing.

9. The parameter determination apparatus according to claim 1, wherein:
   a value related to the plurality of types of sheet physical properties includes at least any of:
   a value related to a sheet surface state; a value related to a sheet basis weight; a value related to a sheet thickness; a value related to sheet gloss; a value related to emboss processing; a value related to a sheet moisture amount; a value related to sheet volume resistance; a value related to sheet bending strength; or a value related to a sheet charge amount.

10. The parameter determination apparatus according to claim 1, wherein a parameter related to the sheet processing includes a parameter related to image formation in an image forming apparatus that is an apparatus that performs the sheet processing.

11. The parameter determination apparatus according to claim 10, wherein a parameter related to the image formation includes at least any of: a parameter related to a fixing process; a parameter related to a destaticizing process; a parameter related to a transfer process; or a parameter related to a conveyance process.

12. The parameter determination apparatus according to claim 1, wherein a parameter related to the sheet processing includes a parameter related to post-processing in a post-processing apparatus that is an apparatus that performs the sheet processing, or a parameter related to sheet feeding processing in a sheet feeding apparatus that is an apparatus that performs the sheet processing.

13. The parameter determination apparatus according to claim 12, wherein a parameter related to the post-processing includes at least any of: a parameter related to punch processing; a parameter related to stack processing; a parameter related to stapling processing; a parameter related to cutting processing; a parameter related to creasing and folding processing; a parameter related to perforation processing; or a parameter related to bookbinding processing.

14. The parameter determination apparatus according to claim 12, wherein a parameter related to the sheet feeding processing includes at least any of: a parameter related to a suction air volume by a suction belt in sheet feeding and related to an assist air volume; or a parameter related to a separation roller pressure and an operating speed of a separation roller.

15. The parameter determination apparatus according to claim 1, wherein the first hardware processor is a sensor included in the parameter determination apparatus.

16. The parameter determination apparatus according to claim 1, wherein the first hardware processor acquires the at least one value related to the plurality of types of sheet physical properties from a sensor connected to the parameter determination apparatus.

17. The parameter determination apparatus according to claim 1, wherein a sheet processing apparatus that performs the sheet processing is connected.

18. An image forming apparatus, comprising:
  the parameter determination apparatus according to claim 1; and
  an image forming part that forms an image on a sheet.

19. A post-processing apparatus, comprising:
  the parameter determination apparatus according to claim 1; and
  a post-processing part that performs post-processing on a sheet.

20. A sheet feeding apparatus, comprising:
  the parameter determination apparatus according to claim 1; and
  a sheet feeding part that feeds a sheet.

21. A parameter determination method, comprising:
  acquiring at least one value related to a plurality of types of sheet physical properties;
  specifying at least any of a sheet type or a basis weight based on a first acquired value related to a sheet physical property;
  specifying a parameter related to sheet processing based on the first acquired value related to the sheet physical property and a priority given to each value related to the plurality of types of sheet physical properties; and
  specifying a parameter related to sheet processing directly from the first acquired value related to the sheet physical property not through a process of specifying at least any of the sheet type or the basis weight.

22. A parameter determination apparatus, comprising:
  a first hardware processor that acquires at least one value related to a plurality of types of sheet physical properties;
  a second hardware processor that specifies at least any of a sheet type or a basis weight based on a first acquired value related to a sheet physical property; and
  a third hardware processor that specifies a parameter related to sheet processing without specifying at least any of the sheet type or the basis weight, based on the first acquired value related to the sheet physical property,
  wherein a priority is given to each value related to the plurality of types of sheet physical properties, and
  a priority used when the second hardware processor specifies at least any of a sheet type or a basis weight is different from a priority used when the third hardware processor specifies a parameter related to sheet processing.

* * * * *